(12) United States Patent
Pearson et al.

(10) Patent No.: US 7,491,760 B2
(45) Date of Patent: *Feb. 17, 2009

(54) POLYMER COMPOSITIONS CONTAINING AN ULTRAVIOLET LIGHT ABSORBING COMPOUND

(75) Inventors: Jason Clay Pearson, Kingsport, TN (US); Douglas Stephens McWilliams, Kingsport, TN (US); Gether Irick, Jr., Gray, TN (US); Max Allen Weaver, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 445 days.

This patent is subject to a terminal disclaimer.

(21) Appl. No.: 11/204,461

(22) Filed: Aug. 16, 2005

(65) Prior Publication Data

US 2005/0288400 A1   Dec. 29, 2005

(51) Int. Cl.
*C08K 5/3495* (2006.01)
(52) U.S. Cl. .................... 524/100; 524/99; 524/124; 524/136; 524/138
(58) Field of Classification Search .................. 524/99, 524/100, 124, 136, 138
See application file for complete search history.

(56) References Cited

U.S. PATENT DOCUMENTS

| 3,169,121 A | 2/1965 | Goldberg |
| 3,207,814 A | 9/1965 | Goldberg |
| 3,218,372 A | 11/1965 | Okamura et al. |
| 3,953,539 A | 4/1976 | Kawase et al. |
| 4,025,492 A | 5/1977 | Binsack et al. |
| 4,028,527 A | 6/1977 | Thagard |
| 4,088,709 A | 5/1978 | Seymour et al. |
| 4,136,089 A | 1/1979 | Bier et al. |
| 4,156,069 A | 5/1979 | Prevorsek et al. |
| 4,176,224 A | 11/1979 | Bier et al. |
| 4,188,314 A | 2/1980 | Fox et al. |
| 4,194,038 A | 3/1980 | Baker et al. |
| 4,208,527 A | 6/1980 | Horlbeck et al. |
| 4,238,593 A | 12/1980 | Duh |
| 4,331,586 A | 5/1982 | Hardy |
| 4,374,961 A | 2/1983 | Kudo et al. |
| 4,391,954 A | 7/1983 | Scott |
| 4,393,158 A | 7/1983 | Miller |
| 4,401,804 A | 8/1983 | Wooten et al. |
| 4,429,077 A | 1/1984 | Karrer et al. |
| 4,430,484 A | 2/1984 | Quinn |
| 4,452,932 A | 6/1984 | Brunelle |
| 4,452,933 A | 6/1984 | McCready |
| 4,456,717 A | 6/1984 | Elmers et al. |
| 4,465,820 A | 8/1984 | Miller et al. |
| 4,532,290 A | 7/1985 | Jaquiss et al. |
| 4,587,328 A | 5/1986 | Goldberg |
| 4,619,956 A | 10/1986 | Susi |
| 4,786,692 A | 11/1988 | Allen et al. |
| 4,879,355 A | 11/1989 | Light et al. |
| 4,956,407 A | 9/1990 | Funasaki et al. |
| 4,957,953 A | 9/1990 | Kikkawa et al. |
| 4,981,898 A | 1/1991 | Bassett |
| 4,983,653 A * | 1/1991 | Fukuda et al. ................. 524/91 |
| 4,994,549 A * | 2/1991 | Chiolle et al. ............... 528/272 |
| 5,010,146 A | 4/1991 | Kohsaka et al. |
| 5,011,877 A | 4/1991 | Morris et al. |
| 5,116,905 A | 5/1992 | Belfoure et al. |
| 5,134,181 A | 7/1992 | Masina |
| 5,180,762 A | 1/1993 | Canova |
| 5,194,523 A | 3/1993 | Small, Jr. et al. |
| 5,207,967 A | 5/1993 | Small, Jr. et al. |
| 5,239,020 A | 8/1993 | Morris |
| 5,254,610 A | 10/1993 | Small, Jr. et al. |
| 5,283,295 A | 2/1994 | Light et al. |
| 5,354,791 A | 10/1994 | Gallucci |
| 5,420,212 A | 5/1995 | Light |
| 5,441,997 A | 8/1995 | Walsh et al. |
| 5,461,120 A | 10/1995 | Mason et al. |
| 5,478,896 A | 12/1995 | Scott |
| 5,606,007 A | 2/1997 | Sakashita et al. |
| 5,608,027 A * | 3/1997 | Crosby et al. ................. 528/51 |
| 5,679,733 A | 10/1997 | Malik et al. |
| 5,684,071 A * | 11/1997 | Mogami et al. ............. 524/100 |
| 5,714,530 A | 2/1998 | Waterman |

(Continued)

FOREIGN PATENT DOCUMENTS

EP    0 272 417    6/1988

(Continued)

OTHER PUBLICATIONS

Anni Berger-Schunn, "Practical Color Measurement," 1994, pp. 39-56, 91-98, Wiley, NY.

(Continued)

*Primary Examiner*—Peter Szekely
(74) *Attorney, Agent, or Firm*—B. J. Boshears; Louis N. Moreno; Bernard J. Graves, Jr.

(57) ABSTRACT

This invention relates to a polymer composition comprising (A) at least one polyester prepared by the reaction of at least one diol with at least one dicarboxylic acid/or dialkyl ester thereof in the presence of a metallic catalyst; (B) a salt comprising at least one suitable phosphorus-containing acid and at least one suitable basic organic compound, such as a hindered amine light stabilizer; (C) at least one ultraviolet light absorbing compound and optionally at least one phenolic antioxidant. A second embodiment of the present invention pertains to a blend of (A) at least one polyester prepared by the reaction of at least one diol with at least one dicarboxylic acid/or dialkyl ester thereof in the presence of a metallic catalyst; (B) a salt comprising at least one suitable phosphorus-containing acid and at least one suitable basic organic compound; (C) at least one ultraviolet light absorbing compound and, optionally, at least one phenolic antioxidant; and (D) at least one polycarbonate.

59 Claims, No Drawings

U.S. PATENT DOCUMENTS

| | | | |
|---|---|---|---|
| 5,719,217 | A | 2/1998 | Gugumus |
| 5,721,298 | A | 2/1998 | Waterman |
| 5,744,526 | A | 4/1998 | Goossens et al. |
| 5,744,554 | A | 4/1998 | Pfaendner et al. |
| 5,859,116 | A * | 1/1999 | Shih .................... 524/493 |
| 5,907,026 | A | 5/1999 | Factor et al. |
| 5,922,816 | A | 7/1999 | Hamilton |
| 5,942,585 | A | 8/1999 | Scott et al. |
| 5,965,261 | A | 10/1999 | Webster |
| 5,965,643 | A | 10/1999 | Gugumus |
| 5,981,690 | A * | 11/1999 | Lustig et al. ............ 528/279 |
| 6,005,059 | A | 12/1999 | Scott et al. |
| 6,011,124 | A | 1/2000 | Scott et al. |
| 6,037,424 | A | 3/2000 | Scott et al. |
| 6,043,322 | A | 3/2000 | Scott et al. |
| 6,051,164 | A | 4/2000 | Samuels |
| 6,077,890 | A | 6/2000 | Hudson et al. |
| 6,103,796 | A | 8/2000 | Stanick et al. |
| 6,107,375 | A | 8/2000 | Krishman et al. |
| 6,114,420 | A | 9/2000 | Zedda et al. |
| 6,221,556 | B1 | 4/2001 | Gallucci et al. |
| 6,254,950 | B1 | 7/2001 | Rogers et al. |
| 6,306,939 | B1 | 10/2001 | Gupta et al. |
| 6,310,140 | B1 | 10/2001 | Raetzsch et al. |
| 6,323,291 | B1 | 11/2001 | Mason et al. |
| 6,333,113 | B2 | 12/2001 | Sugie et al. |
| 6,348,591 | B1 | 2/2002 | Gupta et al. |
| 6,455,616 | B1 | 9/2002 | Cogen |
| 6,469,083 | B1 | 10/2002 | Opalko |
| 6,476,158 | B1 | 11/2002 | England et al. |
| 6,500,887 | B1 | 12/2002 | Tobita et al. |
| 6,509,399 | B2 | 1/2003 | Gupta et al. |
| 6,545,073 | B1 | 4/2003 | Blount |
| 6,569,957 | B2 | 5/2003 | Williams et al. |
| 6,586,527 | B2 * | 7/2003 | Vollenberg et al. .......... 525/166 |
| 6,653,474 | B1 | 11/2003 | Kersjes et al. |
| 6,727,303 | B2 | 4/2004 | Ono et al. |
| 6,780,917 | B2 | 8/2004 | Hashimoto et al. |
| 6,855,758 | B2 * | 2/2005 | Murschall et al. .......... 524/195 |
| 2002/0086953 | A1 | 7/2002 | Williams et al. |
| 2002/0128357 | A1 | 9/2002 | Gossens et al. |
| 2004/0143041 | A1 | 7/2004 | Pearson et al. |

FOREIGN PATENT DOCUMENTS

| | | |
|---|---|---|
| EP | 0 294 862 | 12/1988 |
| EP | 0 295 730 | 12/1988 |
| EP | 0 466 137 A2 | 1/1992 |
| EP | 0 483 488 A1 | 5/1992 |
| EP | 0 537 837 A1 | 4/1993 |
| EP | 0 543 125 | 5/1993 |
| EP | 0 661 342 A1 | 7/1995 |
| EP | 0 675 159 A1 | 10/1995 |
| EP | 1 304 351 | 4/2003 |
| GB | 1466154 | 3/1977 |
| GB | 1466261 | 3/1977 |
| JP | 04-059852 | 6/1990 |
| JP | 04-011660 | 1/1992 |
| JP | 04-059852 | 2/1992 |
| JP | 10-001602 | 1/1998 |
| JP | 10-298439 | 11/1998 |
| WO | WO 02/053633 A2 | 7/2002 |
| WO | WO 2004/065472 A1 | 8/2004 |

OTHER PUBLICATIONS

"Plastics Adhesive Handbook," 5th Ed, 2001, pp. 98-108, Hanser Gradner Publs., Inc., Cincinnati, OH.

Hiemenz, "Polymer Chemistry," 1984, pp. 488-495, Marcel Dekker, NY.

Pospisil et al., "Handbook of Polymer Degradation," 2nd ED, 2000, pp. 241-242, S. Halim Hamid Ed., Marcel Dekker, NY.

Manas Chanda, "Advanced Polymer Chemistry," 2000, pp. 742-755 and 791-796, Marcel Dekker, NY.

Wilfong, "Linear Polyesters," *Journal of Polymer Science*, 1961, pp. 385-410, 54.

USPTO Office Action dated Nov. 3, 2005, for U.S. Appl. No. 11/204,864.

USPTO Office Action dated Oct. 6, 2004, for U.S. Appl. No. 10/379,783.

USPTO Office Action dated May 4, 2005, for U.S. Appl. No. 10/379,783.

USPTO Office Action dated Dec. 7, 2004, for U.S. Appl. No. 10/379,649.

USPTO Office Action dated Aug. 3, 2004, for U.S. Appl. No. 10/379,649.

USPTO Office Action dated Aug. 5, 2003, for U.S. Appl. No. 10/382,013.

USPTO Office Action dated Aug. 2, 2004, for U.S. Appl. No. 10/393,475.

USPTO Office Action dated Dec. 7, 2004, for U.S. Appl. No. 10/393,475.

USPTO Office Action dated Oct. 25, 2005, for U.S. Appl. No. 10/392,575.

Copending U.S. Appl. No. 11/204,864, filed Aug. 16, 2005.
Copending U.S. Appl. No. 11/204,869, filed Aug. 16, 2005.
Copending U.S. Appl. No. 11/204,460, filed Aug. 16, 2005.
Copending U.S. Appl. No. 10/639,712, filed Mar. 5, 2003.
Copending U.S. Appl. No. 11/204,870, filed Aug. 16, 2005.
Copending U.S. Appl. No. 10/772,121, filed Feb. 4, 2004.
Copending U.S. Appl. No. 11/204,867, filed Aug. 16, 2005.
Copending U.S. Appl. No. 10/392,575, filed Mar. 20, 2003.
U.S. Appl. No. 11/171,772, Pearson et al., Not published.

USPTO office action dated Mar. 17, 2006 for copending U.S. Appl. No. 10/772,121.

USPTO office action dated Jul. 20, 2006 for copending U.S. Appl. No. 10/392,575.

USPTO Office Action dated Jul. 28, 2006 for copending U.S. Appl. No. 11/204,864.

USPTO Office Action dated Sep. 8, 2006 for copending U.S. Appl. No. 10/772,121.

USPTO office action dated Sep. 25, 2006 for copending U.S. Appl. No. 10/639,712.

USPTO office action dated Nov. 16, 2006 for copending U.S. Appl. No. 11/204,460.

USPTO office action dated Feb. 15, 2007 for copending U.S. Appl. No. 10/772,121.

USPTO Office Action dated Mar. 26, 2007 for copending U.S. Appl. No. 10/392,575.

USPTO Office Action dated Apr. 19, 2007 for copending U.S. Appl. No. 11/204,864.

USPTO Office Action dated May 16, 2007 for copending U.S. Appl. No. 10/639,712.

* cited by examiner

POLYMER COMPOSITIONS CONTAINING AN ULTRAVIOLET LIGHT ABSORBING COMPOUND

RELATED APPLICATIONS

This application claims priority to and the benefit of the following applications; U.S. patent Ser. No. 60/452,320 filed Mar. 5, 2003, incorporated herein by reference; and U.S. patent Ser. No. 10/393,475 filed Mar. 20, 2003, incorporated herein by reference.

FIELD OF THE INVENTION

This invention relates to a polymer composition comprising (A) at least one polyester prepared by the reaction of at least one diol with at least one dicarboxylic acid/or dialkyl ester thereof in the presence of a metallic catalyst; (B) a salt comprising at least one suitable phosphorus-containing acid and at least one suitable basic organic compound, such as a hindered amine light stabilizer; (C) at least one ultraviolet light absorbing compound and optionally, at least one phenolic antioxidant; (D) optionally, at least one polycarbonate.

BACKGROUND OF THE INVENTION

Methods for deactivating metallic catalyst residues in polyester and polyester-polycarbonate compositions are known in the art; however, it is desirable to find improved methods for deactivating such residues. It is also desirable to find methods for deactivating catalyst residues that provide compositions with greater hydrolytic stability, that are less detrimental to process equipment, provide better color, and less batch-to-batch variation in color.

It is known in the art that certain phosphorus-containing compounds are useful for deactivating metallic catalysts residues. Reference is made, for example, to U.S. Pat. No. 3,218,372 (Okamura et al.), U.S. Pat. No. 4,532,290 (Jaquiss et al.), U.S. Pat. No. 4,088,709 (Seymour et al.), U.S. Pat. No. 4,401,804 (Wooten et al.), U.S. Pat. No. 5,922,816 (Hamilton) and European Patents 0543125 (Van Helmond), 0294862 (Verhoeven), 0295730 (Verhoeven). Examples of such phosphorus-containing compounds include phosphoric acid, certain organic phosphorus compounds such as distearylpentaerythritol diphosphite, mono-, di-, and trihydrogen phosphate compounds, or di- and triester phosphate compounds, phosphite compounds, certain inorganic phosphorus compounds such as monosodium phosphate, zinc or calcium phosphates, poly(ethylene)hydrogen phosphate, phosphites and phosphates used in combination with elementary sulfur, silyl phosphates, phosphorus compounds used in combinations with metal sulphides or metal sulphates. U.S. Pat. No. 4,452,933 (Russell) discloses the use of hydroxy- or amino-substituted carboxylic acids such as methyl salicylate, maleic acid, glycine, or dibutyl tartrate to inactivate metal catalyst residues. U.S. Pat. No. 4,452,932 (Brunelle) discloses the use of dehydroacetic acid and a hydroxy-aromatic compounds such as o-hydroxybenzophenone for inactivating metal catalyst residues. It also is known that certain polyols such as mannitol can be used to improve the color of polyester and polycarbonate blends as described in European Patent 0272417 (Nelson).

U.S. Pat. No. 4,619,956 discloses the combination of 2,2,6,6-tetraalkyl-piperidine hindered amine light stabilizers (HALS) and/or their addition salts with triazine ultraviolet absorbers for stabilizing thermoset acrylic and alkyd coatings. U.S. Pat. No. 5,714,530 discloses the utility of combining non-polymeric 2,2,6,6,-tetraalkylpiperidine HALS and/or their acid addition salts with triazine ultraviolet light absorbers for stabilizing certain polymer compositions. U.S. Pat. No. 6,051,164 discloses the use of a polymer stabilizing system comprising from about 50 to about 5,000 ppm of at least one ortho hydroxyl tris-aryl triazine light absorber and from about 500 ppm to about 1.25 percent of at least one oligomeric, polymeric or high molecular weight HALS having a molecular weight of at least about 500, wherein the weight ratio of HALS to triazine light absorber is from about 3:1 to about 20:1.

Certain of these phosphorus-containing compounds e.g., phosphoric acid, phosphorous acid, and polyphosphoric acid, can react with processing equipment to produce a dark colored polymer and can lead to the formation of black specks or particles. It is believed that the dark color is the due to corrosion of the process equipment. Addition of strong acids to the polymer compositions also reduces the hydrolytic stability as a result of acid catalyzed hydrolysis. Additionally, phosphite antioxidants can be hydrolyzed to acidic species thereby corroding process equipment or reducing the hydrolytic stability of the polymer composition. It is desirable to provide an additive or mixture of additives that can be used to deactivate metal catalyst residues and other metal impurities and thereby improve the color of polyester-polycarbonate compositions, reduce the corrosion of process equipment, and suppress transesterification.

SUMMARY OF THE INVENTION

We have discovered that the presence of certain salts in polyesters and blends of polyesters and polycarbonates that contain ultraviolet light absorbers and, optionally, phenolic antioxidants, result in polymer compositions that exhibit improved color, are less detrimental to process equipment and provide less batch-to-batch variation in color. The salts useful in the present invention are reaction products of a suitable inorganic acid, such as a phosphorous acid, with a suitable basic organic compound, such as hindered amine light stabilizers (HALS).

Thus, the present invention provides a polymer composition comprising:

(A) at least one polyester prepared by the reaction of at least one diol with at least one dicarboxylic acid or dialkyl ester thereof in the presence of a metallic catalyst;

(B) at least one salt prepared by the reaction of one or more acidic phosphorus-containing compounds with one or more basic organic compounds which contain nitrogen;

(C) at least one ultraviolet light absorbing compound and optionally, at least one phenolic antioxidant; and (D) optionally, at least one polycarbonate.

DETAILED DESCRIPTION OF THE INVENTION

The present invention provides a polymer composition comprising:

(A) at least one polyester prepared by the reaction of at least one diol with at least one dicarboxylic acid or dialkyl ester thereof in the presence of a metallic catalyst; and (B) a salt prepared by the reaction of one or more acidic phosphorus-containing compounds with one or more basic organic compounds preferably containing nitrogen, wherein the phosphorus-containing compounds are selected from compounds having the formulas:

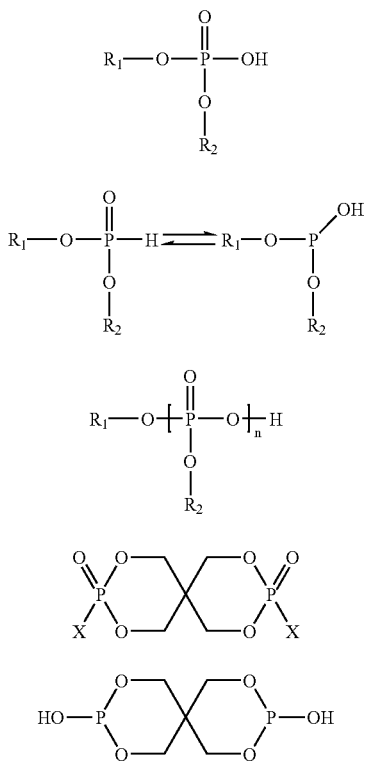
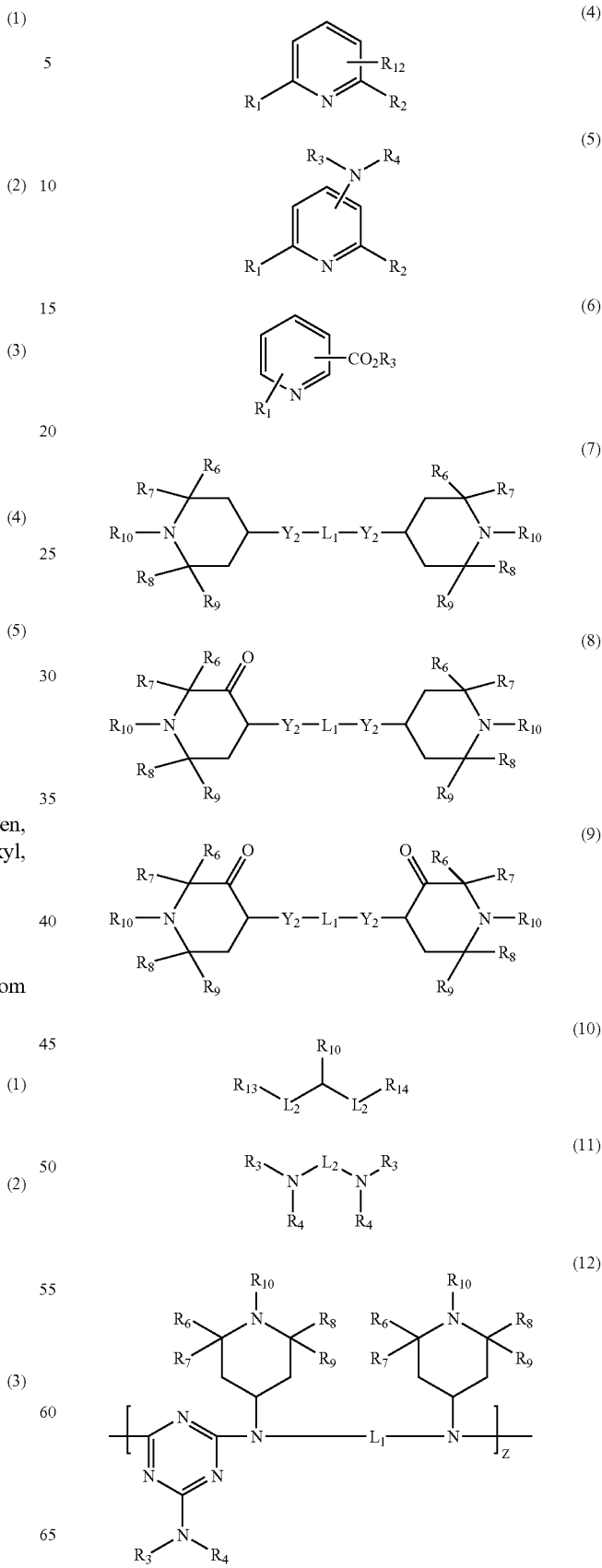
wherein
$R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
n is 2 to 500; and
X is selected from hydrogen and hydroxy;
and wherein the basic organic compounds are selected from compounds having the formulas:
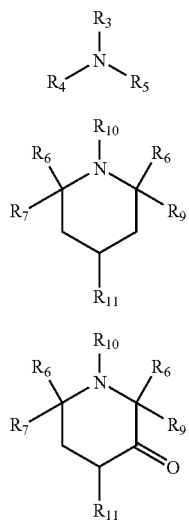

-continued
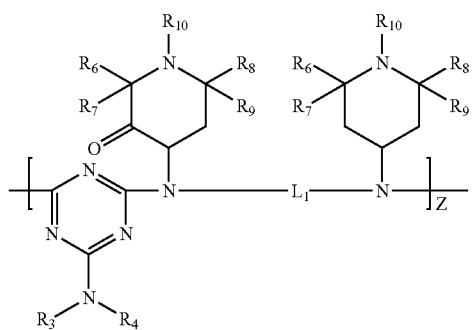
(13)
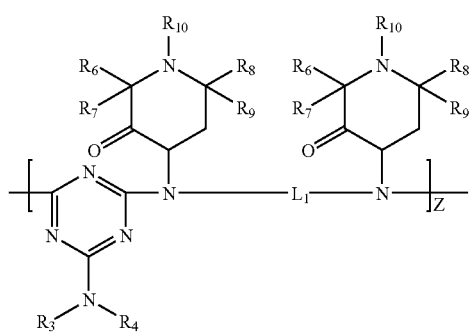
(14)
$$\underset{R_{15}}{\overset{R_1}{N}}-\!\!\!-\!(CH_2)_{n1}\!\!-\!\!\underset{}{\overset{R_{16}}{N}}\!\!\!-\!\!R_2$$
(15)
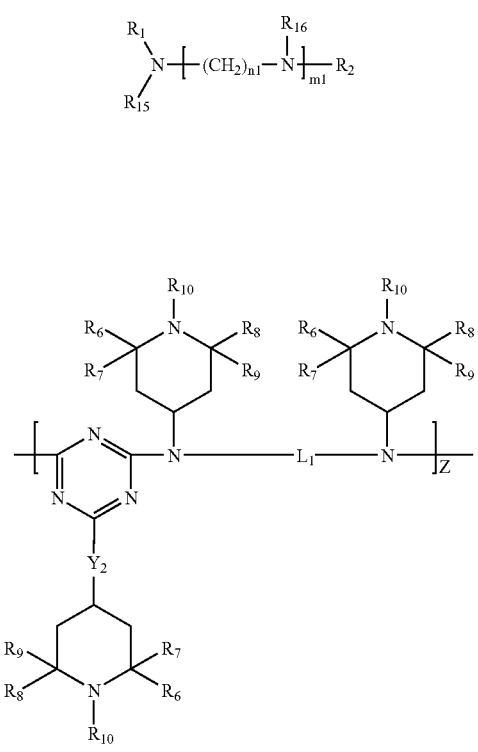
(16)
-continued
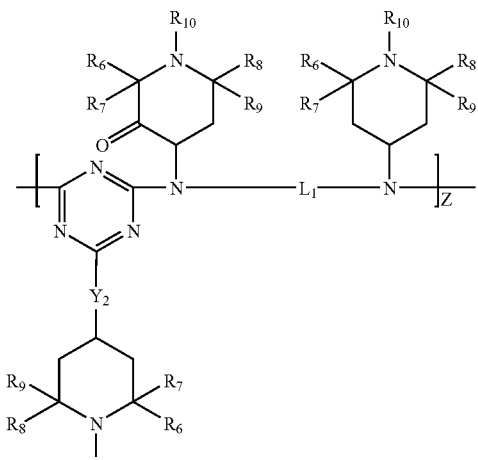
(17)
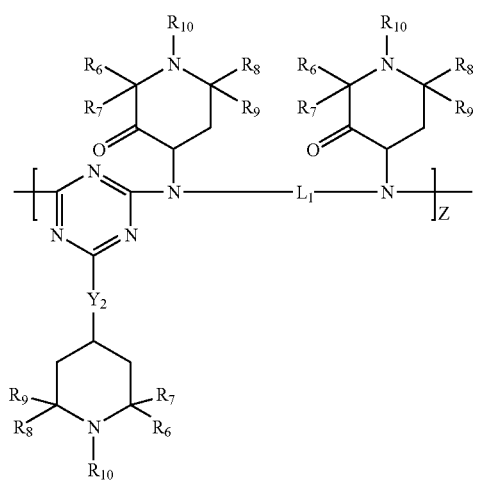
(18)
(19)
(20)

-continued

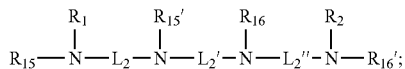
(21)

wherein $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_3$, $R_4$, and $R_5$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$, $R_4$, and $R_5$ is a substituent other than hydrogen; $R_3$ and $R_4$ or $R_4$ and $R_5$ may collectively may represent a divalent group forming a ring with the nitrogen atom to which they are attached, e.g., morpholino, piperidino and the like;

$R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl;

$R_{10}$ is selected from hydrogen, —$OR_6$, $C_1$-$C_{22}$-alkyl, substituted $C_1$-$C_{22}$-alkyl, $C_3$-$C_8$-cycloalkyl, substituted $C_3$-$C_8$-cycloalkyl;

$R_{11}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$—$R_3$ or a succinimido group having the formula

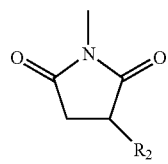

$R_{12}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl and may be located at the 2, 3 or 4 positions on the aromatic ring of the nitrogen-containing compounds of formula (4);

the —$N(R_3)(R_4)$ group may be located at the 2, 3 or 4 positions on the pyridine ring of the nitrogen-containing compounds of formula (5);

the —$CO_2R_3$ and $R_1$ groups may be located at any of the 2, 3, 4, 5, 6 positions of the pyridine ring of the nitrogen-containing compounds of formula (6);

$L_1$ is a divalent linking group selected from $C_2$-$C_{22}$-alkylene, —($CH_2CH_2$—$Y_1$)$_{1-3}$—$CH_2CH_2$—, $C_3$-$C_8$-cycloalkylene, arylene, or —$CO$-$L_2$-$OC$—;

$L_2$, $L_2'$ and $L_2''$ are independently selected from $C_1$-$C_{22}$-alkylene, arylene, —($CH_2CH_2$—$Y_1$)$_{1-3}$—$CH_2CH_2$— and $C_3$-$C_8$-cycloalkylene;

$Y_1$ is selected from —$OC(O)$—, —$NHC(O)$—, —$O$—, —$S$—, —$N(R_1)$—;

$Y_2$ is selected from —$O$— or —$N(R_1)$—;

$R_{13}$ and $R_{14}$ are independently selected from —$O$—$R_2$, and —$N(R_2)_2$;

Z is a positive integer of up to about 20, preferably up to about 6;

m1 is selected from 0 to about 10;

n1 is a positive integer selected from 2 to about 12;

$R_{15}$, $R_{15}'$, $R_{16}$ and $R_{16}'$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and radical A wherein radical A is selected from the following structures:

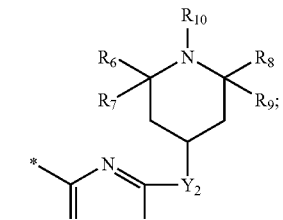

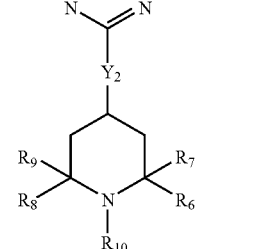

and

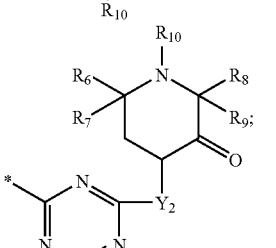

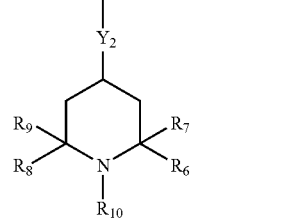

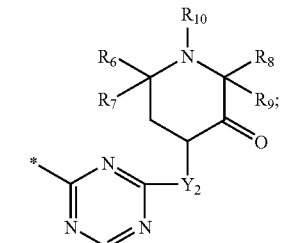

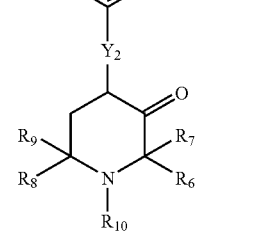

Radical A structures wherein * designates the position of attachment;

wherein at least one of $R_{15}$, $R_{15}'$, $R_{16}$ and $R_{16}'$ is also a Radical A; and wherein the ratio of the number of phosphorus atoms in the acidic phosphorus-containing compound to the number of basic nitrogen atoms in the basic organic compound is about 0.05 to about 2, preferably from about 0.25 to about 1.1; and (C) at least one ultraviolet light absorber and optionally, at least one phenolic antioxidant selected from compounds having the formulas:
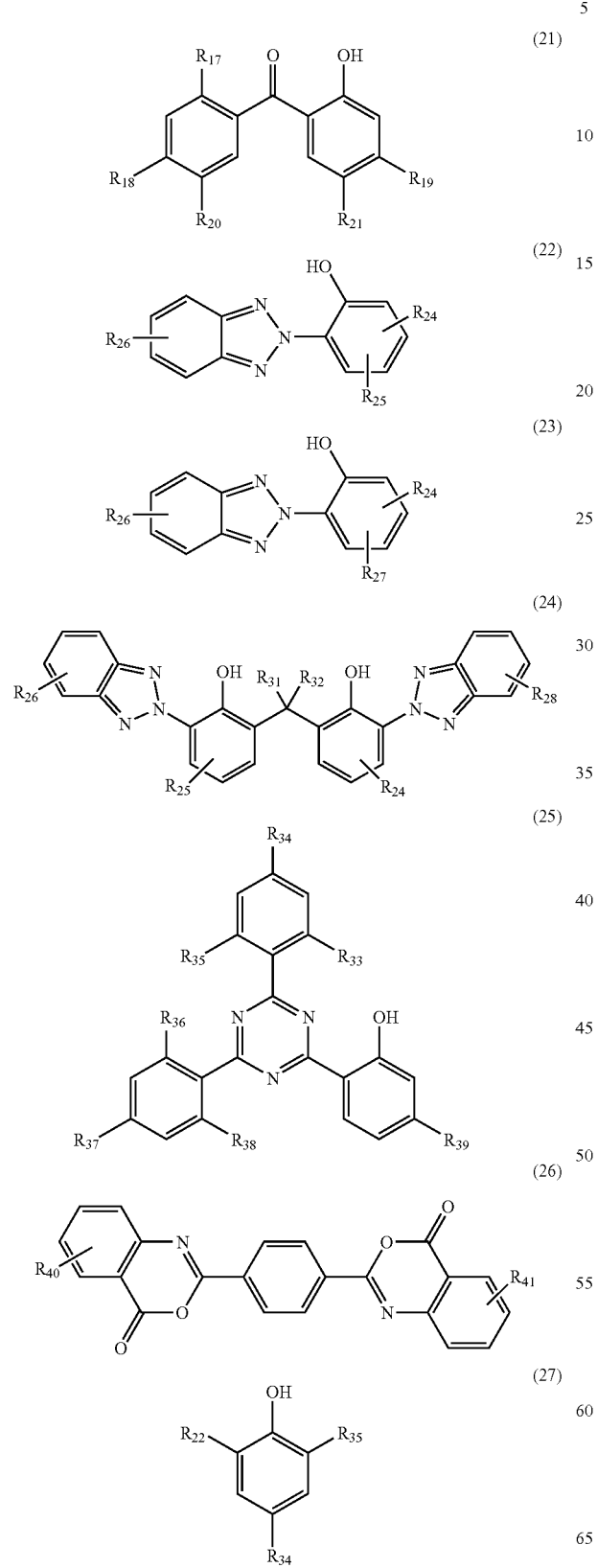
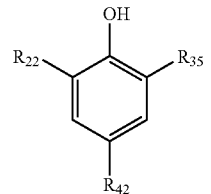
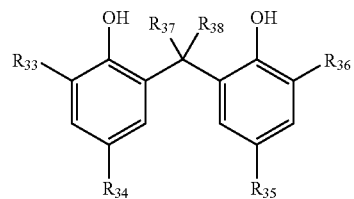
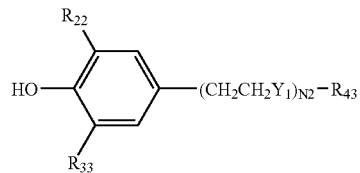
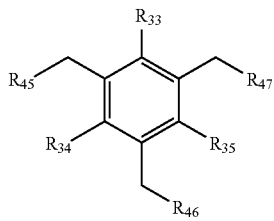
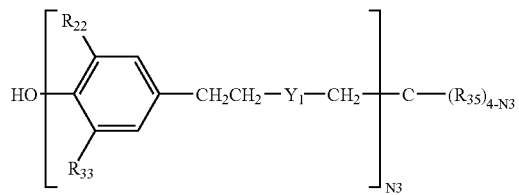
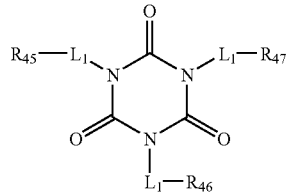
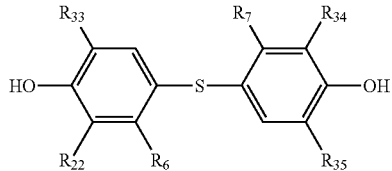

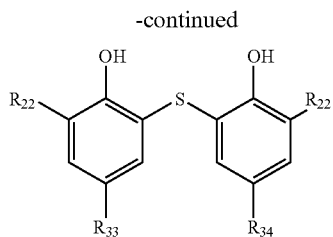

(35)

wherein $R_{17}$, $R_{18}$, and $R_{19}$ are independently selected from hydrogen, hydroxy, $C_1$-$C_{22}$-alkyl, substituted $C_1$-$C_{22}$-alkyl, $C_3$-$C_8$-cycloalkyl, substituted $C_3$-$C_8$-cycloalkyl and $OR_{22}$;

$R_{20}$ and $R_{21}$ are independently selected from hydrogen and —$SO_3R_{23}$;

$R_{22}$ is selected from $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{23}$ is selected from hydrogen, sodium, potassium, lithium, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{24}$ and $R_{25}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and may be located at the 3', 4', 5' or 6' positions on the aromatic ring;

$R_{26}$ and $R_{28}$ are independently selected from hydrogen, halogen, $C_1$-$C_{22}$-alkyl, substituted $C_1$-$C_{22}$-alkyl, $C_3$-$C_8$-cycloalkyl, substituted $C_3$-$C_8$-cycloalkyl, and may be located at the 4, 5, 6 or 7 positions on the aromatic ring; wherein $R_{27}$ is selected from —(CH$_2$CH$_2$—Y$_1$)$_{N2}$—CH$_2$CH$_2$—R$_{29}$, a group having the formula

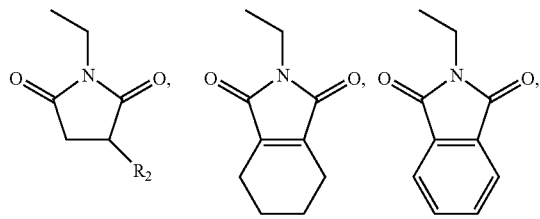

and may be located at the 3', 4', 5' or 6' positions on the aromatic ring;

$R_{29}$ is selected from hydrogen, hydroxy and —$CO_2R_{30}$;

$R_{30}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, aryl, and heteroaryl;

$R_{31}$ and $R_{32}$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{33}$, $R_{34}$, $R_{35}$, $R_{36}$, $R_{37}$, and $R_{38}$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{39}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$OR_{30}$;

$R_{40}$ and $R_{41}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and may be located at the 5, 5', 6, 6', 7, 7', 8 or 8' positions on the aromatic ring, respectively;

$R_{42}$ is —(CH$_2$CH$_2$—Y$_1$)$_{N2}$—R$_{29}$;

$R_{43}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$R_{44}$;

$R_{44}$ is a group having the formula

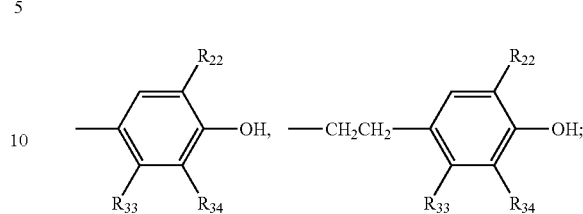

$L_1$ is a divalent linking group selected from $C_2$-$C_{22}$-alkylene, —(CH$_2$CH$_2$—Y$_1$)$_{1-3}$—CH$_2$CH$_2$—, $C_3$-$C_8$-cycloalkylene, arylene, or —CO-$L_2$-OC—;

$L_2$ is selected from $C_1$-$C_{22}$-alkylene, arylene, —(CH$_2$CH$_2$—Y$_1$)$_{1-3}$—CH$_2$CH$_2$— and $C_3$-$C_8$-cycloalkylene;

$Y_1$ is selected from —OC(O)—, —NHC(O)—, —O—, —S—, —N(R$_1$)—;

N2 is a positive integer selected from 1 to about 20;

N3 is an positive integer from 1 to 4.

Whenever and R group, L group, Y group, Z group, M group or N group is defined herein, the definition for a particular group remains the same throughout this description regardless of whether it is used for multiple formulas or types of compounds unless otherwise specified.

The term "$C_1$-$C_{22}$-alkyl" denotes a saturated hydrocarbon radical which contains one to twenty-two carbons and which may be straight or branched-chain. Such $C_1$-$C_{22}$ alkyl groups can be methyl, ethyl, propyl, butyl, pentyl, hexyl, heptyl, octyl, isopropyl, isobutyl, tertbutyl, neopentyl, 2-ethylheptyl, 2-ethylhexyl, and the like. The term "substituted $C_1$-$C_{22}$-alkyl" refers to $C_1$-$C_{22}$-alkyl radicals as described above which may be substituted with one or more substituents selected from hydroxy, halogen, cyano, aryl, heteroaryl, $C_3$-$C_8$-cycloalkyl, substituted $C_3$-$C_8$-cycloalkyl, $C_1$-$C_6$-alkoxy, $C_2$-$C_6$ alkanoyloxy and the like.

The term "$C_3$-$C_8$-cycloalkyl" is used to denote a cycloaliphatic hydrocarbon radical containing three to eight carbon atoms. The term "substituted $C_3$-$C_8$-cycloalkyl" is used to describe a $C_3$-$C_8$-cycloalkyl radical as detailed above containing at least one group selected from $C_1$-$C_6$-alkyl, $C_1$-$C_6$-alkoxy, hydroxy, halogen, and the like.

The term "aryl" is used to denote an aromatic radical containing 6, 10 or 14 carbon atoms in the conjugated aromatic ring structure and these radicals substituted with one or more groups selected from $C_1$-$C_6$-alkyl; $C_1$-$C_6$-alkoxy; phenyl, and phenyl substituted with $C_1$-$C_6$-alkyl; $C_1$-$C_6$-alkoxy; halogen and the like; $C_3$-$C_8$-cycloalkyl; halogen; hydroxy, cyano, trifluoromethyl and the like. Typical aryl groups include phenyl, naphthyl, phenylnaphthyl, anthryl (anthracenyl) and the like. The term "heteroaryl" is used to describe conjugated cyclic radicals containing at least one hetero atom selected from sulfur, oxygen, nitrogen or a combination of these in combination with from two to about ten carbon atoms and these heteroaryl radicals substituted with the groups mentioned above as possible substituents on the aryl radical. Typical heteroaryl radicals include: 2- and 3-furyl, 2- and 3-thienyl, 2- and 3-pyrrolyl, 2-, 3-, and 4-pyridyl, benzothiophen-2-yl; benzothiazol-2-yl, benzoxazol-2-yl, benzimidazol-2-yl, 1,3,4-oxadiazol-2-yl, 1,3,4-thiadiazol-2-yl, 1,2,4-thiadiazol-5-yl, isothiazol-5-yl, imidazol-2-yl, quinolyl and the like.

The terms "$C_1$-$C_6$-alkoxy" and "$C_2$-$C_6$-alkanoyloxy" are used to represent the groups —O—$C_1$-$C_6$-alkyl and —OCOC$_1$-C$_6$-alkyl, respectively, wherein "C$_1$-C$_6$-alkyl" denotes a saturated hydrocarbon that contains 1-6 carbon atoms, which may be straight or branched-chain, and which may be further substituted with one or more groups selected from halogen, methoxy, ethoxy, phenyl, hydroxy, acetyloxy and propionyloxy. The term "halogen" is used to represent fluorine, chlorine, bromine, and iodine; however, chlorine and bromine are preferred.

The term "C$_2$-C$_{22}$-alkylene" is used to denote a divalent hydrocarbon radical that contains from two to twenty-two carbons and which may be straight or branched chain and which may be substituted with one or more substituents selected from hydroxy, halogen, C$_1$-C$_6$-alkoxy, C$_2$-C$_6$-alkanolyloxy and aryl. The term "C$_3$-C$_8$-cycloalkylene" is used to denote divalent cycloaliphatic radicals containing three to eight carbon atoms and these are optionally substituted with one or more C$_1$-C$_6$-alkyl groups. The term "arylene" is used to denote 1,2-, 1,3-, and 1,4-phenylene radicals and these optionally substituted with C$_1$-C$_6$-alkyl, C$_1$-C$_6$-alkoxy and halogen.

The salt of component (B) of the novel compositions provided by the present invention may be prepared by bringing together the acidic phosphorus-containing compound and the basic nitrogen-containing organic compound in a suitable manner. A suitable manner is any procedure that involves contacting the acidic phosphorus-containing acid with the basic organic compound. For example, the acidic phosphorus-containing compound and the basic nitrogen-containing organic compound may be dissolved in appropriate solvents and the solutions mixed followed by precipitation of the reaction product; mixing the phosphorus-containing acid and the basic organic compound without solvent; and the like.

The ratio of the number of phosphorus atoms in the acidic phosphorus-containing compound to the number of basic nitrogen atoms in the basic organic compound may be in the range of about 0.05 to about 2, preferably from about 0.25 to about 1.1. Compositions that contain a large excess of unreacted phosphorus-containing acidic compounds may result in corrosion of process equipment during concentrate manufacture and have a negative effect on the hydrolytic stability of the polymer.

The salt or salts constituting component (B) of our novel compositions typically is present in concentrations ranging from about 0.01 to about 0.25 weight percent based on the total weight of the composition, i.e., the total weight of the component (A) polyester, the salt and any additional components present such as a polycarbonate, stabilizers and pigments and colorants. Concentrations of salt (B) within this range typically are effective to improve the color of polyesters or polyester-polycarbonate compositions that contain UV absorbers and or phenolic antioxidants. The concentration of the salt(s) preferably is about 0.05 to 0.15 weight percent (same basis). The polyester of component (A) typically contains catalyst metal residues in concentrations of less than about 200 parts per million be weight (ppmw), e.g., about 10 to 200 ppmw. Metal catalyst residue concentrations of about 20 to 100 ppmw are more typical. Corrosion of metal process equipment is an additional source of metal contaminants in polyester component (A). For example, 304 and 316 stainless steels contain iron, manganese, chromium and nickel.

The acidic phosphorus-containing compounds preferably are phosphorous acid, phosphoric acid and polyphosphoric acid, most preferably phosphorous acid.

Examples of suitable basic organic compounds include alkyl amines such as triethylamine and 2,2,6,6-tetramethylpiperidine, pyridine and substituted pyridines, piperidine and substituted piperidines, morpholine and substituted morpholines and the like. The preferred basic organic compounds are hindered amine light stabilizers (HALS) such as: Cyasorb UV-3346 (Cytec Industries, CAS# 82451-48-7), Cyasorb UV-3529 (Cytec Industries, CAS# 19309840-7), Cyasorb UV-3641 (Cytec Industries, CAS# 106917-30-0), Cyasorb UV-3581 (Cytec Industries, CAS# 79720-19-7), Cyasorb UV-3853 (Cytec Industries, CAS# 167078-06-0), Cyasorb UV-3853S (Cytec Industries, CAS# 24860-22-8), Tinuvin 622 (Ciba Specialty Chemicals, CAS# 65447-77-0), Tinuvin 770 (Ciba Specialty Chemicals, CAS# 52829-07-9), Tinuvin 144 (Ciba Specialty Chemicals, CAS# 63843-89-0), Tinuvin 123 (Ciba Specialty Chemicals, CAS# 129757-67-1), Chimassorb 944 (Ciba Specialty Chemicals, CAS# 71878-19-8), Chimassorb 119 (Ciba Specialty Chemicals, CAS# 106990-43-6), Chimassorb 2020 (Ciba Specialty Chemicals, CAS# 192268-64-7), Lowilite 76 (Great Lakes Chemical Corp., CAS# 41556-26-7), Lowilite 62 (Great Lakes Chemical Corp., CAS# 65447-77-0), Lowilite 94 (Great Lakes Chemical Corp., CAS# 71878-19-8), Uvasil 299LM (Great Lakes Chemical Corp., CAS# 182635-99-0), and Uvasil 299HM (Great Lakes Chemical Corp., CAS# 182635-99-0), Dastib 1082 (Vocht a.s., CAS# 131290-28-3), Uvinul 4049H (BASF Corp., CAS# 109423-00-9), Uvinul 4050H (BASF Corp., CAS# 124172-53-8), Uvinul 5050H (BASF Corp., CAS# 199237-39-3), Mark LA 57 (Asahi Denka Co., Ltd., CAS# 64022-61-3), Mark LA 52 (Asahi Denka Co., Ltd., CAS# 91788-83-9), Mark LA 62 (Asahi Denka Co., Ltd., CAS# 107119-91-5), Mark LA 67 (Asahi Denka Co., Ltd., CAS# 100631-43-4), Mark LA 63 (Asahi Denka Co., Ltd. Co., Ltd. Co., CAS# 115055-30-6), Mark LA 68 (Asahi Denka Co., Ltd., CAS# 100631-44-5), Hostavin N 20 (Clariant Corp., CAS# 95078-42-5), Hostavin N 24 (Clariant Corp., CAS# 85099-51-1, CAS# 85099-50-9), Hostavin N 30 (Clariant Corp., CAS# 78276-66-1), Diacetam-5 (GTPZAB Gigiena Truda, USSR, CAS# 76505-58-3), Uvasorb-HA 88 (3V Sigma, CAS# 136504-96-6), Goodrite UV-3034 (BF Goodrich Chemical Co., CAS# 71029-16-8), Goodrite UV-3150 (BF Goodrich Chemical Co., CAS# 96204-36-3), Goodrite UV-3159 (BF Goodrich Chemical Co., CAS# 130277-45-1), Sanduvor 3050 (Clariant Corp., CAS# 85099-51-0), Sanduvor PR-31 (Clariant Corp., CAS# 147783-69-5), UV Check AM806 (Ferro Corp., CAS# 154636-12-1), Sumisorb TM-061(Sumitomo Chemical Company, CAS# 84214-94-8), Sumisorb LS-060 (Sumitomo Chemical Company, CAS# 99473-08-2), Uvasil 299 LM (Great Lakes Chemical Corp., CAS# 164648-93-5), Uvasil 299 HM (Great Lakes Chemical Corp., CAS# 164648-93-5), Nylostab S-EED (Clariant Corp., CAS# 42774-15-2). Additional preferred hindered amine light stabilizer may be listed in the *Plastic Additives Handbook 5$^{th}$ Edition* (Hanser Gardner Publications, Inc., Cincinnati, Ohio, USA, 2001).

The hindered amine light stabilizers having above formulas (2), (3), (7), (8), (9), (12), (13), (14), (15), (16), (17), (18), (19), (20), (21) represent the preferred basic compounds. Chimassorb 944 (Ciba Specialty Chemicals, CAS# 71878-19-8), Cyasorb UV-3529 (Cytec Industries, CAS# 193098-40-7), Chimassorb 119 (Ciba Specialty Chemicals, CAS# 106990-43-6) and Tinuvin 770 (Ciba Specialty Chemicals, CAS# 52829-07-9) and any equilavents thereof are specific examples of the preferred basic compounds. A more preferred groups of the basic nitrogen compounds are the hindered amine light stabilizers having above formulas (2), (3), (7), (8), (9), (12), (13), (14), (16), (17), (18) and (19) wherein radical R$_{10}$ is hydrogen or C$_1$-C$_{22}$ alkyl, and formula (15) wherein at least one of R$_{15}$ and R$_{16}$ represents radical A wherein R$_{10}$ is hydrogen or C$_1$-C$_{22}$ alkyl. The most preferred are high molecular weight HALS wherein the molecular weight is greater than about 1000 such as Cyasorb UV-3529 (Cytec Industries, CAS# 193098-40-7). The most preferred HALS correspond to formula (12) set forth above wherein $R_6=R_7=R_8=R_9=R_{10}$=methyl, $(R_3)(R_4)N$— collectively represent morpholino, $L_1$ is $C_1$ to $C_6$ alkylene, and Z is 1 to 6.

The preferred ultraviolet light absorbers of the invention are ones having the formulas of (22), (24), (25), and (26). The more preferred ultraviolet light absorbers of the invention are ones corresponding to formula (25). More particularly, ultraviolet light absorbers having formula (25) preferably have the formula wherein R33, R34, R35, $R_{36}$, $R_{37}$, $R_{38}$=hydrogen and $R_{39}$=—$OR_{22}$). Chimassorb 119® is another preferred HALS embodiment. The structure of Chimassorb 119® has previously been disclosed also in the *Journal of Materials Science* 36 (2001) 4419-4431, incorporated herein by reference. The chemical name for Chimassorb 119® as disclosed in the *Journal of Materials Science* 36 (2001) at 4419-4431 is 1,3, 5-triazine-2,4,6-triamine, N,N'-1,2-ethane-diyl-bis[[[4,6-bis-[butyl-1,2,2,6,6,-pentamethyl-4-piperidinyl)amino]-1,3, 5-triazine-2-yl]amino]-3,1-propanediyl]]bis[N,N"-dibutyl N,N"bis-(1,2,2,6,6,-pentamethyl-4-piperidinyl)-.

The preferred phenolic antioxidants are ones corresponding to formula (32). More particularly, phenolic antioxidants having formula (32) preferably have the formula wherein N3=4, $R_{22}=R_{34}$=—$C(CH_3)_3$ and $Y_1$=—COO—.

The polyester of component (A) includes linear, thermoplastic, crystalline or amorphous polyesters produced by conventional polymerization techniques from one or more diols and one or more dicarboxylic acids or ester-forming equivalent thereof such as a dicarboxylate ester. The polyesters normally are molding or fiber grade and have an inherent viscosity (I.V.) of about 0.4 to about 1.2 dL/g measured at 25° C. in a 60/40 ratio by weight of phenol/tetrachloroethane. Typical polyesters of component (A) comprise:

(1) diacid residues comprising at least 50 mole percent terephthalic acid residues, 1,4-cyclohexanedicarboxylic acid residues or a mixture thereof; and
(2) diol residues comprising at least 50 mole percent of ethylene glycol residues, cyclohexanedimethanol residues, or a mixture thereof;

wherein the total of the diacid residues is equal to 100 mole percent and the total of the diol residues also is equal to 100 mole percent. The polyesters of component (A) typically contain up to about 200 ppmw of metal impurity, e.g., 10 to 200 ppmw Ti, Co and/or Mn residues.

The diol residues of the component (A) polyesters may be derived from one or more of the following diols: 2,6-decahydronaphthalenedimethanol, ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-, 1,3- and 1,4-cyclohexanedimethanol, 2,2,4,4-tetramethyl-1,3-cyclobutanediol, bis[4-(2-hydroxyethoxy)phenyl]sulfone, 1,4:3,6-dianhydro-sorbitol, 4,4'-isopropylidenedicyclohexanol, Z-8-bis(hydroxymethyl)-tricyclo-[5.2.1.0]-decane wherein Z represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

The diacid residues of the component (A) polyesters may be derived from a variety of aliphatic, alicyclic, and aromatic dicarboxylic acids. Examples of the dicarboxylic acids from which the diacid residues may be obtained include 2,6-decahydronaphthalenedicarboxylic acid, terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. The diacid residues may be obtained from the dicarboxylic acid or ester forming derivatives thereof such as esters of the dicarboxylic acid, e.g., dimethyl dicarboxylate esters, acid halides and, in some cases, anhydrides.

One or more branching agents also may be useful in making the polyesters formed within the context of the invention. Although not required, it is preferred that the optional branching agent is present in polyester component (A) in an amount of less than 5 mole percent wherein the total mole percent of the dicarboxylic acid component equals 100 mole percent and the total mole percent of the diol component equals 100 mole %. The branching agent may provide branching in the acid unit portion of the polyester, or in the glycol unit portion, or it can be a hybrid. Some of these branching agents have already been described herein. However, illustrative of such branching agents are polyfunctional acids, polyfunctional glycols and acid/glycol hybrids. Examples include tri- or tetra-carboxylic acids, such as trimesic acid, pyromellitic acid and lower alkyl esters thereof and the like, and tetrols such as pentaerythritol. Also triols such as trimethylopropane or dihydroxy carboxylic acids and hydroxydicarboxylic acids and derivatives, such as dimethyl hydroxy terephthalate, and the like are useful within the context of this invention. Trimellitic anhydride is a preferred branching agent. The branching agents may be used either to branch the polyester itself or to branch the polyester/polycarbonate blend of the invention.

It is preferred that polyester component (A) comprise about 30 to 100 mole percent 1,4-cyclohexanedimethanol residues wherein the total mole percentages of diol residues of the polyester equals 100 mole percent. In this embodiment, it is also preferred that polyester component (A) comprises 0 to about 70 mole percent ethylene glycol residues. While the diacid residues present in this embodiment may be derived from any diacid, it is preferred that the diacid residues comprise terephthalic acid, isophthalic acid and/or 1,4-cyclohexanedicarboxylic acid residues. When terephthalic acid residues are present, polyester component (A) comprises about 65 to 100 mole percent terephthalic acid residues and about 0 to 35 mole percent isophthalic acid residues.

Thus, one group of preferred polyesters have an inherent viscosity of about 0.4 to 1.2, preferably 0.4 to 0.8, dL/g measured at 25° C. in a 60/40 ratio by weight of phenol/tetrachloroethane and comprise:

(1) diacid residues comprising about 80 to 100 mole percent terephthalic acid residues and about 0 to 20 mole percent isophthalic acid residues; and
(2) diol residues comprising about 40 to 100 mole percent, preferably 55 to 80 mole percent, 1,4-cyclohexanedimethanol residues and 0 to about 60 mole percent, preferably about 20 to 45 mole percent of ethylene glycol residues, wherein the total of the diacid residues is equal to 100 mole percent and the total of the diol residues also is equal to 100 mole percent.

Another group of preferred polyesters have an inherent viscosity of about 0.4 to 1.2, preferably about 0.4 to 0.8, dL/g measured at 25° C. in a 60/40 ratio by weight of phenol/tetrachloroethane and comprise:

(1) diacid residues comprising about 65 to 83 mole percent, preferably about 70 to 80 mole percent, terephthalic acid residues and about 35 to 17 mole percent, preferably 30 to 20 mole percent, isophthalic acid residues; and (2) diol residues comprising about 80 to 100 mole percent, preferably 90 to 100 mole percent, 1,4-cyclohexanedimethanol residues and about 0 to about 20 mole percent, preferably 0 to 10 mole percent, ethylene glycol residues;

wherein the total of the diacid residues is equal to 100 mole percent and the total of the diol residues also is equal to 100 mole percent.

Yet another group of preferred polyesters have an inherent viscosity of about 0.4 to 1.2, preferably about 0.4 to 0.8, dL/g measured at 25° C. in a 60/40 ratio by weight of phenol/tetrachloroethane and comprise:

(1) diacid residues comprising about 80 to 100 mole percent, more preferably 90 to 100 mole percent 1,4-cyclohexanedicarboxylic acid residues and about 0 to 20 mole percent; and (2) diol residues comprising about 80 to 100 mole percent, preferably 90 to 100 mole percent, 1,4-cyclohexanedimethanol residues and about 0 to about 20 mole percent, preferably 0 to 10 mole percent, ethylene glycol residues;

wherein the total of the diacid residues is equal to 100 mole percent and the total of the diol residues also is equal to 100 mole percent.

In yet another preferred embodiment, the polyesters have an inherent viscosity of about 0.4 to 1.2, preferably about 0.4 to 0.8, dL/g measured at 25° C. in a 60/40 ratio by weight of phenol/tetrachloroethane and comprise:

(1) diacid residues comprising about 80 to 100 mole percent, more preferably 90 to 100 mole percent terephthalic acid residues and about 0 to 20 mole percent, more preferably 0 to 10 mole percent isophthalic acid residues; and (2) diol residues comprising about 25 to 37 mole percent, preferably 28 to 34 mole percent, 1,4-cyclohexanedimethanol residues and about 75 to about 63 mole percent, preferably about 72 to 66 mole percent, ethylene glycol residues;

wherein the total of the diacid residues is equal to 100 mole percent and the total of the diol residues also is equal to 100 mole percent.

The linear polyesters may be prepared according to polyester-forming procedures and conditions well known in the art. For example, a mixture of one or more dicarboxylic acids, preferably aromatic dicarboxylic acids, or ester forming derivatives thereof, and one or more diols may be heated in the presence of an esterification catalyst and/or polyesterification catalysts at temperatures in the range of about 150 to about 300° C. and pressures in the range of from of atmospheric to about 0.2 Torr. Normally, the dicarboxylic acid or derivative thereof is esterified or transesterified with the diol(s) at atmospheric pressure and at a temperature at the lower end of the specified range. Polycondensation then is affected by increasing the temperature and lowering the pressure while excess diol is removed from the mixture. A preferred temperature range for a polyester condensation is about 260 to about 300° C.

Typical catalyst or catalyst systems for polyester condensation are well known in the art. For example, the catalysts disclosed in U.S. Pat. Nos. 4,025,492; 4,136,089; 4,176,224; 4,238,593; and 4,208,527, incorporated herein by reference, are deemed suitable in this regard. Further, R. E. Wilfong, Journal of Polymer Science, 54 385 (1961) sets forth typical catalysts which are useful in polyester condensation reactions. The most preferred catalysts are complexes of titanium, manganese and cobalt. It is understood that phosphorus-containing molecules can be added in addition to metal catalysts. Polymer compositions that employ antimony or its metal complexes as a catalyst may become unsuitably darkened by adding a phosphorus-containing molecule, such as phosphorous acid or salts of phosphorous acid, e.g., the salts of component (B) of the present invention, during melt blending and extruding.

The term "polycarbonate" as used herein embraces those polycarbonates comprising repeating units or residues of the formula

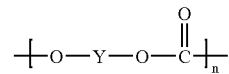

wherein Y is a divalent aromatic or aliphatic radical derived from a dihydroxyaromatic compound or a dihydroxyaliphatic compound of the formula HO—Y—OH. Typical dihydroxyaromatic compounds are 2,2-bis-(4-hydroxyphenyl)propane, also known as bisphenol A; bis(4-hydroxyphenyl)methane; 2,2-bis(4-hydroxy-3-methylphenyl)propane; 4,4-bis(4-hydroxyphenyl)heptane; 2,2-(3,5,3',5'-tetrachloro-4,4'-dihydroxyphenyl)propane; 2,2-(3,5,3',5'-tetrabromo-4,4'-dihydroxyphenol)propane; 3,3'-dichloro-3,3'-dichloro-4,4'-dihydroxydiphenyl)methane; 2,2'-dihydroxyphenylsulfone, and 2,2'-dihydroxyl phenylsulfide. Most preferably, HO—Y—OH is 2,2-bis-(4-hydroxyphenyl)propyl, in which case, the polycarbonate is a "bisphenol A polycarbonate". Examples of dihydroxyaliphatic compounds include 1,4-cyclohexanedimethanol, 1,2-propanediol, 1,3-propanediol, 1,4-butanediol, 2,2-dimethyl-1,3-propanediol, 1,6-hexanediol, 2,6-decahydronaphthalenedimethanol, 1,2-cyclohexanediol, 1,4-cyclohexanediol, 1,2-cyclohexanedimethanol, 1,3-cyclohexanedimethanol, isosorbide, 4,4'-isopropylidenedicyclohexanol, 2,2,4,4-tetramethylcyclobutane-1,2-diol, Z,8-bis(hydroxymethyl)-tricyclo-[5.2.1.0]-decane wherein Z represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms. Branched polycarbonates are also useful in the present invention.

The polycarbonates comprising component (D) of the above-described embodiment of the present invention may be prepared according to known procedures by reacting the dihydroxyaromatic compound with a carbonate precursor such as phosgene, a haloformate or a carbonate ester, a molecular weight regulator, an acid acceptor and a catalyst. Methods for preparing polycarbonates are known in the art and are described, for example, in U.S. Pat. No. 4,452,933, which is hereby incorporated by reference herein.

Examples of suitable carbonate precursors include carbonyl bromide, carbonyl chloride, and mixtures thereof; diphenyl carbonate; a di(halophenyl)-carbonate, e.g., di(trichlorophenyl)carbonate, di(tribromophenyl)carbonate, and the like; di(alkylphenyl)carbonate, e.g., di(tolyl)carbonate; di(naphthyl)carbonate; di(chloronaphthyl)carbonate, or mixtures thereof; and bis-haloformates of dihydric phenols.

Examples of suitable molecular weight regulators include phenol, cyclohexanol, methanol, alkylated phenols, such as octylphenol, para-tertiary-butyl-phenol, and the like. The preferred molecular weight regulator is phenol or an alkylated phenol.

The acid acceptor may be either an organic or an inorganic acid acceptor. A suitable organic acid acceptor is a tertiary amine and includes such materials as pyridine, triethylamine, dimethylaniline, tributylamine, and the like. The inorganic acid acceptor can be either a hydroxide, a carbonate, a bicarbonate, or a phosphate of an alkali or alkaline earth metal.

The catalysts that can be used are those that typically aid the polymerization of the monomer with phosgene. Suitable catalysts include tertiary amines such as triethylamine, tripropylamine, N,N-dimethylaniline, quanternary ammonium compounds such as, for example, tetraethylammonium bromide, cetyl triethyl ammonium bromide, tetra-n-heptylammonium iodide, tetra-n-propyl ammonium bromide, tetramethyl ammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

The polycarbonate of component (D) also may be a copolyestercarbonate such as those described in U.S. Pat. Nos. 3,169,121; 3,207,814; 4,194,038; 4,156,069; 4,430,484, 4,465,820, and 4,981,898, all of which are incorporated by reference herein.

Copolyestercarbonates useful in this invention are available commercially. They are typically obtained by the reaction of at least one dihydroxyaromatic compound with a mixture of phosgene and at least one dicarboxylic acid chloride, especially isophthaloyl chloride, terephthaloyl chloride, or both.

The ratio of polyester component (A) to polycarbonate component (D) is not a critical feature of the present invention, and may be determined by the individual practitioner of this invention. Typically, the weight ratio of polyester (A) to polycarbonate (D) will range from about 99:1 to about 1:99, preferably from about 75:25 to about 25:75, and most preferably is about 75:25 to about 50:50.

The present invention provides polyesters and blends of polyesters and polycarbonates that exhibit improved color. Although not being bound by any particular theory, the improvement in color may be the result of deactivating the metal catalyst residues within the polyester. It is believed that metal catalyst residues, e.g., Ti, Mn and Co residues, may form colored complexes with phenolic moieties such as those found within polycarbonates, within the structure of many ultraviolet light absorbers and all phenolic antioxidants. The acidic phosphorus-containing compound salts of suitable basic organic compounds [Component (B)] may deactivate metal catalyst residues thereby preventing the formation of colored metal-phenol complexes and inhibiting transesterification between the polyester and polycarbonate.

Another embodiment of the present invention is a polymer concentrate comprising:
(A) at least one polyester prepared by the reaction of at least one diol with at least one dicarboxylic acid or dialkyl ester thereof in the presence of a metallic catalyst; and
(B) up to about 10 weight percent, preferably about 5 to 10 weight percent, based on the total weight of the polyester of at least one salt prepared by the reaction of one or more acidic phosphorus-containing compounds and one or more basic organic compounds which contain nitrogen.

The compositions of the present invention also may contain one or more compounds selected from the group consisting of (E) water, (F) colorants and pigments such as organic colorants, inorganic colorants and or white pigments such as $TiO_2$, ZnO and baryta, (G) other additives such as impact modifiers, plasticizers, halogenated flame-retardants, fillers, nonhalogenated flame-retardants, synergists, processing aids, phosphite stabilizers, phosphonite stabilizers and other stabilizers known to one skilled in the art; and H) a recycled polymer.

The terms "phenolic antioxidants" and "hindered phenol" are primary antioxidants that are known to those skilled in the art and may be represented by the structures listed on pages 98-108 in the *Plastic Additives Handbook 5th Edition* (Hanser Gardner Publications, Inc., Cincinnati, Ohio, USA, 2001), incorporated herein by reference in its entirety. Some common phenolic antioxidants are as follows: Irganox 1010 (Ciba Specialty Chemicals, CAS# 6683-19-8), Irganox 1330 (Ciba Specialty Chemicals, CAS# 1709-70-2) and Irganox 3114 (Ciba Specialty Chemicals, CAS# 27676-62-6) with Irganox 1010 being preferred.

The terms "phosphite stabilizers" and "phosphonite stabilizers" refer to secondary antioxidants that are known to those skilled in the art and may be represented by the structures listed on pages 109-112 in the *Plastic Additives Handbook 5th Edition* (Hanser Gardner Publications, Inc., Cincinnati, Ohio, USA, 2001), incorporated herein by reference in its entirety. Some common phosphite stabilizers are as follows: Ultranox 626 (GE Specialty Chemicals, CAS# 26741-53-7), Irgafos 168 (Ciba Specialty Chemicals, CAS# 31570-04-4), Weston 619 (GE Specialty Chemicals, CAS# 3806-34-6) and Doverphos S-9228 (Dover Chemicals, CAS# 154862-43-8).

The term "halogenated flame-retardants" is defined as compounds that can contain one or more of the following: fluorine, chlorine, bromine, and iodine, which act in such a way as to decrease the flammability of the polymer composition. More preferred are compounds that contain bromine such as brominated polycarbonate, brominated polystyrene, and the like.

The salts of the phosphorus-containing acids and suitable basic organic compounds are believed to substantially deactivate the metallic catalyst residues present in polyester component (A) so that the residues lose their ability to form colored complexes with UV absorbers. Salts of phosphorus-containing acids and basic organic compounds, as defined herein, may reduce the amount of corrosion to process equipment as compared to some of the hydrolysis products of commercial phosphites, phosphorous acid, phosphoric acid, and polyphosphoric acid, thereby improving the color of the polymer composition and improving the lifetime of the process equipment.

The compositions provided by the present invention are useful for improving the properties of heavy-gauge sheet, cap layers for extruded sheet, cap layers for extruded films, thermoformable sheeting products, injection molded products, thin films, thick films, articles made using thin films, articles using from thick films, articles made using heavy gauge sheet, multilayer films, twin-wall sheet, triple wall sheet and the like.

Sulfuric acid and sulfurous acid also will make salts with the nitrogen-containing compounds disclosed herein that are effective at improving the color of polyester and polyester-polycarbonate compositions that contain UV absorbers and/ or phenolic antioxidants. Typically, the improvement in color is not as dramatic as that observed for the salts made using phosphorus-containing acids such as phosphoric acid or phosphorous acid according to the present invention.

EXAMPLES

This invention can be further illustrated by the following examples of preferred embodiments thereof, although it will be understood that these examples are included merely for purposes of illustration and are not intended to limit the scope of the invention unless otherwise specifically indicated. Unless otherwise indicated, all weight percentages are based on the total weight of the polymer composition and all molecular weights are weight average molecular weights. Also, all percentages are by weight unless otherwise indicated.

Experimental Conditions: Four polymer compositions were evaluated. The polycarbonate was bisphenol A. Polyester A comprisied of 74 mole percent terephthalic acid residues, 26 mole percent isophthalic acid residues and 100 mole percent 1,4-cyclohexanedimethanol residues having an inherent viscosity of about 0.74 and containing approximately 100 ppmw titanium metal, Polyester B comprised of 100 mole percent terephthalic acid residues, 69 mole percent ethylene glycol residues and 31 mole percent 1,4-cyclohexanedimethanol residues having an inherent viscosity of about 0.74, containing approximately 12 ppmw titanium metal, 45 ppmw manganese metal and 70 ppmw phosphorus in the form of a phosphate ester (Merpol A). All polyester-polycarbonate compositions were made by extruding a 50/50 by weight blend of (1) polyester A (2) a bisphenol A polycarbonate supplied by Bayer as polycarbonate and (3) the additive specified in the examples using an 18 mm twin-screw extruder (APV Chemical Machinery Inc., Saginaw, Mich. 48601) equipped with a medium mixing screw. All zone temperatures were set to 275° C. except for Zone 1 that was set at 250° C. The inlet port was cooled by circulating water and the screw speed was set to 200 revolution per minute (rpm). An Accu-Rate (ACCU-RATE Inc. Whitewater, Wis.) dry material feeder was used to feed the polymers and additives into the extruder at a set addition rate of 3.0. The extruded rods were cooled by passing through a 1.37 meter (4.5 feet) long ice-water bath then chopped using a Berlyn pelletizer (The Berlyn Corp., Worcester, Mass.) set at a speed of 5-8. All additives were mixed with the polyester and polycarbonate by "bag blending" (shaking the materials together in a bag) unless otherwise stated. The polyester was dried for approximately 24 hours in a vacuum oven (Model 5851, National Appliance Company, Portland, Oreg.) at 70° C. at 120 Torr pressure with a slight ingress of dry nitrogen. The polycarbonate was dried for approximately 24 hours in a vacuum oven (Model 5840, National Appliance Company, Portland, Oreg.) at 100° C. at 120 Torr with a slight ingress of dry nitrogen. Concentrates were prepared from the blend of polymers and the additives and then dried under the same conditions as the polyester was dried. All of the polymers were stored in a vacuum oven under nitrogen until about 5 minutes prior to use, then "bag blended" and added to the feeder. The first 5 minutes of extrudate was not collected in order to ensure the extruder had been adequately purged. When multiple concentrations of the same mixture of additives were extruded, the lower concentrations of additives always were extruded first. The extruder was purged with at least 300 g of a 1:1 mixture of the polyester/polycarbonate blend before the next additive was evaluated. When water was used as an additive, the water was added to the dried polymer pellets, along with any other additive(s), about 3 hours prior to extruding.

The color of the polymer pellets is determined in a conventional manner using a HunterLab UltraScan Colorimeter manufactured by Hunter Associates Laboratory, Inc., Reston, Va. The instrument is operated using HunterLab Universal Software (version 3.8). Calibration and operation of the instrument is according to the HunterLab User Manual and is largely directed by the Universal Software. To reproduce the results on any calorimeter, run the instrument according to its instructions and use the following testing parameters: D65 Light Source (daylight, 6500° K color temperature), Reflectance Mode, Large Area View, Specular Included, CIE 10° Observer, Outputs are CIE L*, a*, b*. The pellets are placed in a holder that is 25 mm deep by 55 mm wide and high. The holder is black with a window on one side. During testing, the clear side of the holder is held at the reflectance port of the colorimeter as is normally done when testing in reflectance mode. An increase in the positive b* value indicates yellowness, while a decrease in the numerical value of b* indicates a reduction in yellowness. Color measurement and practice are discussed in greater detail in Anni Berger-Schunn in *Practical Color Measurement*, Wiley, N.Y. pages 39-56 and 91-98 (1994).

The molecular weight of the polyester and polycarbonate fractions, in the polyester-polycarbonate compositions, was determined using gel permeation chromatography. The sample was analyzed separately for each component of the blend. Each sample was prepared and analyzed once using the polyester method and then prepared and analyzed using the polycarbonate method. Polyester Method: Ten mg of sample was added to a 10 mL volumetric flask followed by 20 microliters of toluene (as a flow marker) then diluted to a volume of 10 mL with an azeotrope of methylene chloride and hexafluoroisopropanol. A stir bar was added and the mixture was stirred on a stir plate until completely dissolved. The sample was analyzed using a Perkin-Elmer series 200 LC binary pump at a flow rate of 1.0 mL/minute., with a Perkin-Elmer ISS 200 Autosampler using a 10 microliter injection loop. The detector was a Perkin-Elmer LC-95 UV/Vis detector set at 285 nm. The columns are Plgel 5 micron guard and a Mixed C from Polymer Laboratories. The polystyrene calibration consists of 15 narrow molecular weight polystyrene standards from Polymer Laboratories ranging from 162 to 3,220,000. The universal calibration parameters were: PS, K=0.1278, a=0.7089; PCT K=0.2357, a=0.8405. The universal calibration parameters were determined by linear regression to yield the correct weight average molecular weight for a set of five PCT samples previously characterized by light scattering.

Polycarbonate Method: The sample was pressed until it turned white to increase the surface area and then allowed to soak in tetrahydrofuran (THF) solvent to leach out the polycarbonate from the sample. Ten mg of sample was added to a 10 mL volumetric flask followed by 20 microliters of toluene (as a flow marker) then diluted to a volume of 10 mL with unstabilized THF. A stir bar was added and the mixture was stirred on a stir plate overnight. The sample was analyzed using a Perkin-Elmer LC 250 binary pump at a flow rate of 1.0 mL/min., with a Perkin-Elmer LC 600 Autosampler using a 20 microliter injection loop. The detector was a Perkin-Elmer LC-235 photodiode array detector set at 265 nm. The columns are Plgel 5 micron guard, a Mixed C from Polymer Laboratories and an Oligopore column from Polymer Laboratories. The polystyrene calibration consists of 15 narrow molecular weight polystyrene standards from Polymer Laboratories ranging from 162 to 3,220,000. The universal calibration parameters were: PS, K=14.000, a=0.7000; PC K=39.900, a=0.7000. The universal calibration parameters for polycarbonate in THF were obtained from the literature.

Preparation of Salt 1

To a clean dry 5 L three neck round-bottomed flask equipped with a mechanical stirrer, thermocouple, heating mantle and addition funnel was added 200.0 g of Tinuvin 770 and 1.0 L of isopropyl alcohol. The mixture was heated to 35° C. and stirred until a homogeneous solution was obtained. To a clean, dry 2 L beaker was added 68.19 g of phosphorous acid and 0.5 L of isopropyl alcohol. The mixture was stirred until a homogeneous solution was obtained. The phosphorous acid solution was added to the addition funnel and delivered to the stirred reaction vessel at a rate of about 50 mL/min. A solid formed as the phosphorous acid solution was added. Stirring was continued at about 30° C. for 1 h upon complete addition of the phosphorous acid solution. The reaction mixture was allowed to cool to room temperature and the product was further precipitated by drowning the reaction mixture into a 4 L beaker equipped with a mechanical stirrer containing 2 L of stirring heptane. The solid material was collected by suction filtration, washed with 500 mL of heptane, and then allowed to dry on the filter paper overnight. The solid cake was broken up, placed into a 12"×7"×2" aluminum pan and dried in a vacuum oven at 70° C. at about 15 mm of Hg with a slight ingress of dry nitrogen for 2 days to give 261.89 g (98% of theory).

Varying amounts of Salt 1 were blended with the polymer consisting of 350 g polyester A or polyester B as described above and was evaluated in Polyester A, Polyester B and polycarbonate in the presence and absence of UV absorbers to determine if the color of the polymer could be improved. One UV absorber was evaluated from each of the four major classes of UV absorbers: Cyasorb UV-3638 (Benzoxazin4-one, having a structure believed to be consistent with structure 26 wherein $R_{40}=R_{41}=$hydrogen), Tinuvin 1577 (Triazine, having a structure believed to be consistent with structure 25 wherein $R_{33}=R_{34}=R_{35}=R_{36}=R_{37}=R_{38}=$hydrogen, $R_{39}=$—$OC_6H_{13}$; Cyasorb 531 (Benzophenone, having a structure believed to be consistent with structure 21 wherein $R_{17}=R_{18}=R_{19}=R_{20}=R_{21}=$hydrogen, $R_{19}=$—$OC_8H_{17}$) Tinuvin 234 (Benzotriazole, having a structure believed to be consistent with structure 22 in $R_{26}=$hydrogen, $R_{24}=$—$C(CH_3)_2$—$C_6H_5$ and located at the 3' position and $R_{25}=$—$C(CH_3)_2$—$C_6H_5$ and located at the 5' position).

contained UV absorbers in polyester A and Polyester B. The most dramatic improvement was obtained by adding Salt 1 in combination with Cyasorb 531 (example 7 and example 8). The addition of UV absorbers to Polyester A typically led to a dramatic increase in the pellet b* but not always. When Salt 1 was added to Polyester A and Tinuvin 234, the pellet b* was greater than when Tinuvin 234 was added alone (example 9 and example 10). In this case, the improvement in color was manifested in the pellet a* color measurement. All of the examples in Polyester B follow the same general trends; adding Salt 1 to Polyester B that contains UV absorbers gives rise to an improvement in either the pellet a* or pellet b* color measurement (Example 11 through Example 20).

Preparation of Salt 2.

To a clean dry 5 L three neck round-bottomed flask equipped with a mechanical stirrer, thermocouple, heating mantle and addition funnel was added Tinuvin 770, as described in Table 4 and 1.5 L of isopropyl alcohol. The mixture was heated to 30° C. and stirred until a homogeneous solution was obtained. To a clean dry 2 L beaker was added phosphorous acid as given in Table 5 and 1 L of isopropyl alcohol. The mixture was stirred until a homogeneous solution was obtained. The phosphorous acid solution was added to the addition funnel and delivered to the stirred reaction vessel at a rate of about 50 mL/min. A solid formed as the phosphorous acid solution was added. Stirring was continued at about 30° C. for 1 h upon complete addition of the phosphorous acid solution. The reaction mixture was allowed to cool to room temperature and the product was further precipitated by adding half of the material to each of two 4 L beakers that contained 1.5 L of rapidly stirred heptane (equipped with a mechanical stirrer). The solid material was collected by suction filtration, washed with 500 mL of heptane, and then allowed to dry on the filter paper overnight. The solid cake

TABLE 1

| Example | Polyester A | Polyester B | Polycarbonate | Salt 1 | Cyasorb UV3638 | Tinuvin 1577 | Cyasorb 531 | Tinuvin 234 |
|---|---|---|---|---|---|---|---|---|
| 1  | 350 g    |       |       |                |            |            |            |            |
| 2  | 349.7 g  |       |       | 350 mg (0.1%)  |            |            |            |            |
| 3  | 346.2 g  |       |       | 350 mg (0.1%)  | 3.5 g (1%) |            |            |            |
| 4  | 346.5 g  |       |       |                | 3.5 g (1%) |            |            |            |
| 5  | 346.2 g  |       |       | 350 mg (0.1%)  |            | 3.5 g (1%) |            |            |
| 6  | 346.5 g  |       |       |                |            | 3.5 g (1%) |            |            |
| 7  | 346.2 g  |       |       | 350 mg (0.1%)  |            |            | 3.5 g (1%) |            |
| 8  | 346.5 g  |       |       |                |            |            | 3.5 g (1%) |            |
| 9  | 346.2 g  |       |       | 350 mg (0.1%)  |            |            |            | 3.5 g (1%) |
| 10 | 346.5 g  |       |       |                |            |            |            | 3.5 g (1%) |
| 11 |          | 350 g |       |                |            |            |            |            |
| 12 |          | 349.7 g |     | 350 mg (0.1%)  |            |            |            |            |
| 13 |          | 346.2 g |     | 350 mg (0.1%)  | 3.5 g (1%) |            |            |            |
| 14 |          | 346.5 g |     |                | 3.5 g (1%) |            |            |            |
| 15 |          | 346.2 g |     | 350 mg (0.1%)  |            | 3.5 g (1%) |            |            |
| 16 |          | 346.5 g |     |                |            | 3.5 g (1%) |            |            |
| 17 |          | 346.2 g |     | 350 mg (0.1%)  |            |            | 3.5 g (1%) |            |
| 18 |          | 346.5 g |     |                |            |            | 3.5 g (1%) |            |
| 19 |          | 346.2 g |     | 350 mg (0.1%)  |            |            |            | 3.5 g (1%) |
| 20 |          | 346.5 g |     |                |            |            |            | 3.5 g (1%) |
| 21 |          |       | 350 g   |                |            |            |            |            |
| 22 |          |       | 349.7 g | 350 mg (0.1%)  |            |            |            |            |
| 23 |          |       | 346.2 g | 350 mg (0.1%)  | 3.5 g (1%) |            |            |            |
| 24 |          |       | 346.5 g |                | 3.5 g (1%) |            |            |            |
| 25 |          |       | 346.2 g | 350 mg (0.1%)  |            |            |            | 3.5 g (1%) |
| 26 |          |       | 346.5 g |                |            |            |            | 3.5 g (1%) |

The data in Tables 1 and 2 shows that adding 0.1 wt % Salt 1 reduces the pellet b* color of Polyester A and Polyester B; Examples 1, 2 and Examples 11, 12, respectively. More dramatic reductions in the pellet b* was seen for samples that was broken up, placed into a 12"×7"×2" aluminum pan and dried in a vacuum oven at 70° C. at about 15 mm of Hg with a slight ingress of dry nitrogen for 2 days to give 521.17 g (97% of theory).

Varying amounts of Salt 2 were blended with the polymer consisting of 350 g polyester A or polyester B as described above. Adding 0.1 wt % of Salt 2 to a sample of Polyester A and 0.5 wt % of Irganox 1010 (phenolic antioxidant, believed to have a structure consistent with structure 32 wherein N3=4, $R_{22}=R_{34}=$—$C(CH_3)_3$ and $Y_1=$—COO—) gave rise to a material with better color than Polyester A (Table 4, example 32 and example 33). This example illustrates that addition of the phosphorus-containing salts, disclosed herein, can provide an improvement in the color of polyester compositions that contain phenolic antioxidants.

The color data for Examples 21 through 26 (Table 2) shows that adding Salt 1 to Polycarbonate that contained UV absorbers provides no color improvement over samples of Polycarbonate that contained the same UV absorbers. It is expected that color improvements would be possible for polycarbonates that contain metal catalyst residues.

Polycarbonate that contains UV absorbers and phenolic antioxidants. A 50/50 blend of Polyester A and Polycarbonate had a pellet b* color of 18.76 and a pellet a* color of 8.17 whereas a 50/50 that was stabilized with 0.1 wt % of Salt 2 had a pellet b* color of 3.12 and a pellet a* color of −0.35. Addition of Salt 2 also led to an increase in the pellet L*. The pellet color (L*, a* and b*) of blends of Polycarbonate and Polyester A that contained UV absorbers and Salt 2 was better than the blend of Polycarbonate and Polyester A (Examples 27-30, Table 4). Additionally an improvement in color (L*, a* and b*) was observed for a blend of Polycarbonate and Polyester A that contained Irganox 1010 and Salt 2 relative to the unstabilized blend (Example 27 vs. Example 31, Table 4).

TABLE 3

| Example | Polyester A | Polycarbonate | Salt 2 | Tinuvin 1577 | Cyasorb 531 | Irganox 1010 |
|---|---|---|---|---|---|---|
| 27 | 250 g | 250 g | | | | |
| 28 | 249.5 g | 249.5 g | 0.5013 g (0.1 wt %) | | | |
| 29 | 244.75 g | 244.75 g | 0.5024 g (0.1 wt %) | 10.0038 g (2 wt %) | | |
| 30 | 244.75 g | 244.75 g | 0.5044 g (0.1 wt %) | | 10.0023 g (2 wt %) | |
| 31 | 248.5 g | 248.5 g | 0.5031 g (0.1 wt %) | | | 2.5047 g (0.5 wt %) |
| 32 | 250.0 g | | | | | |
| 33 | 497.0 g | | 0.5015 g (0.1 wt %) | | | 2.5021 g (0.5 wt %) |

TABLE 2

| Example | Polymer | a*, pellets | b*, pellets | L*, pellets |
|---|---|---|---|---|
| 1 | Polyester A | 0.11 | 3.08 | 69.44 |
| 2 | Polyester A | 0.02 | −0.03 | 70.15 |
| 3 | Polyester A | −0.96 | 1.86 | 70.8 |
| 4 | Polyester A | −0.48 | 5.93 | 69.37 |
| 5 | Polyester A | −2.77 | 6.83 | 70.54 |
| 6 | Polyester A | −1.58 | 12.01 | 68.96 |
| 7 | Polyester A | −1.92 | 4.79 | 70 |
| 8 | Polyester A | 4.21 | 18.17 | 58.14 |
| 9 | Polyester A | −0.51 | 17.26 | 68.11 |
| 10 | Polyester A | 7.41 | 16.18 | 55.21 |
| 11 | Polyester B | −0.26 | 1.33 | 68.81 |
| 12 | Polyester B | −1.06 | 0.87 | 69.33 |
| 13 | Polyester B | −1.54 | 1.85 | 69.26 |
| 14 | Polyester B | −1.18 | 3.26 | 68.82 |
| 15 | Polyester B | −3.59 | 9 | 69.66 |
| 16 | Polyester B | −2.33 | 9.31 | 68.32 |
| 17 | Polyester B | −3.12 | 6.39 | 68.66 |
| 18 | Polyester B | −1.59 | 14.09 | 65.07 |
| 19 | Polyester B | −2.12 | 13 | 66.98 |
| 20 | Polyester B | −0.08 | 16.91 | 65.49 |
| 21 | Polycarbonate | 0.84 | 9.84 | 68.71 |
| 22 | Polycarbonate | 0.53 | 10.71 | 69.76 |
| 23 | Polycarbonate | 0.51 | 11.39 | 69.03 |
| 24 | Polycarbonate | 0.68 | 10.13 | 69.68 |
| 25 | Polycarbonate | 0.45 | 12.63 | 69.1 |
| 26 | Polycarbonate | 1.23 | 11.76 | 65.05 |

The data in Table 3 and Table 4 (examples 27-31) serve to illustrate the improvement in color (L*, a* and b*) that is provided by adding Salt 2 to an alloy of Polyester A and

TABLE 4

| Example | L*, pellets | a*, pellets | b*, pellets |
|---|---|---|---|
| 27 | 56.38 | 8.17 | 18.76 |
| 28 | 69.65 | −0.35 | 3.12 |
| 29 | 71.57 | −3.84 | 13.98 |
| 30 | 70.26 | −1.64 | 10.39 |
| 31 | 70.66 | −0.24 | 5.73 |
| 32 | 68.56 | 0.19 | 2.63 |
| 33 | 68.85 | 0.41 | 1.6 |

The invention has been described in detail with particular reference to preferred embodiments thereof, but it will be understood that variations and modifications can be effected within the spirit and scope of the invention.

We claim:

1. A polymer composition comprising:
   (A) at least one polyester prepared by the reaction of at least one diol with at least one dicarboxylic acid or dialkyl ester thereof in the presence of a metallic catalyst;
   (B) at least one salt prepared by the reaction of one or more acidic phosphorus-containing compounds with one or more basic organic compounds which contain nitrogen; and
   (C) at least one ultraviolet light absorber and, optionally, at least one phenolic antioxidant,
   wherein said one or more basic organic compounds are hindered amine light stabilizers (HALS).

2. A polymer composition according to claim 1 wherein the acidic phosphorus-containing compounds are selected from the group consisting of the compounds having the formulas:

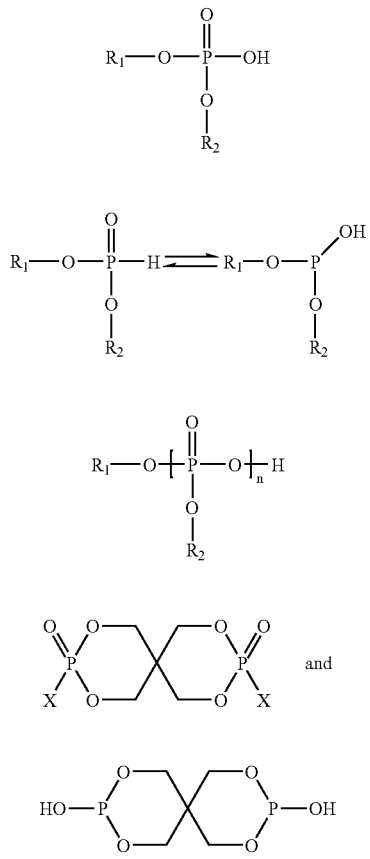

wherein
R$_1$ and R$_2$ are independently selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;
n is 2 to 500; and
X is selected from the group consisting of hydrogen and hydroxy; and
wherein the basic organic compounds are selected from the group consisting of compounds having the formulas:

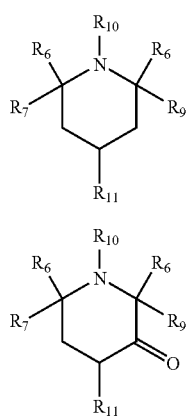

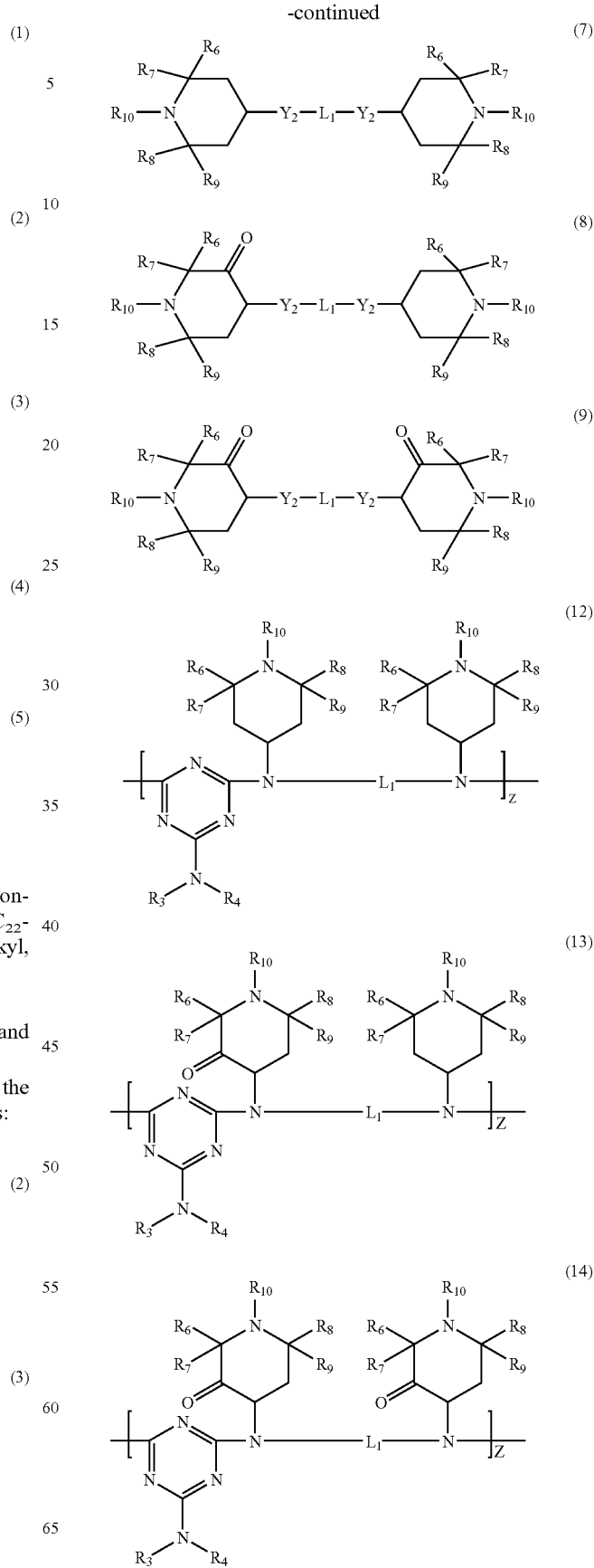

-continued

(16)
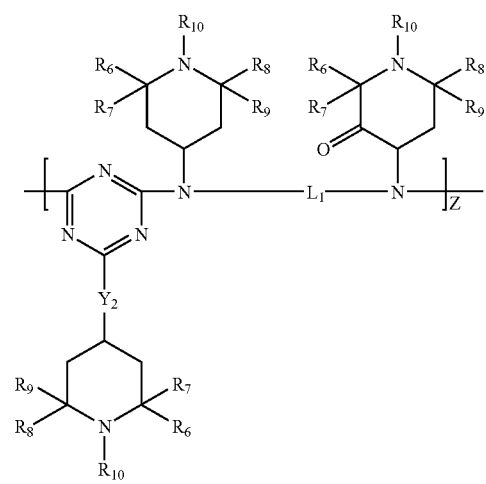

(17)
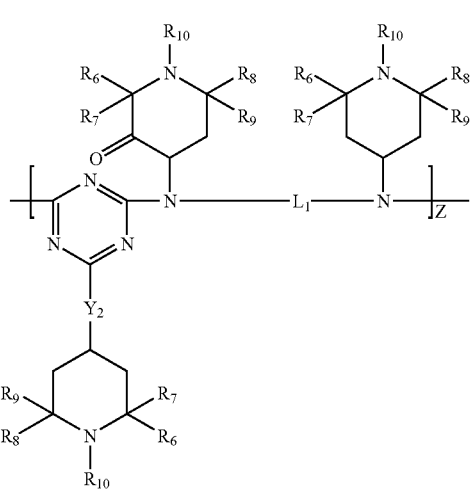

(18)
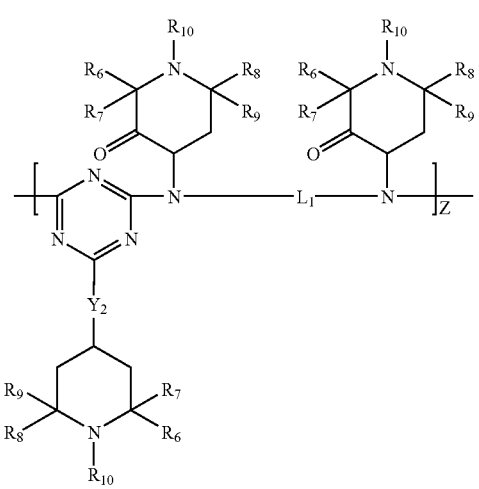

-continued

(19)
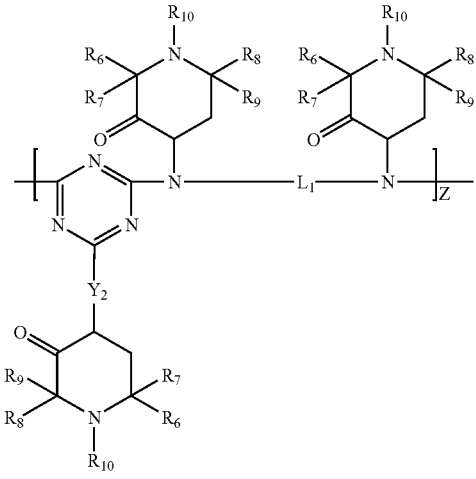
and

(20)
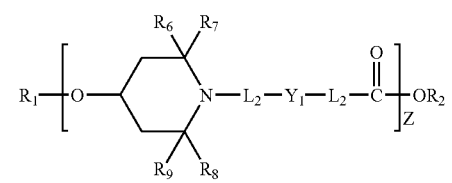

wherein
R₁ and R₂ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

R₃ and R₄, are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of R₃ or R₄, is a substituent other than hydrogen; R₃ and R₄ may collectively may represent a divalent group forming a ring with the nitrogen atom to which they are attached;

R₆, R₇, R₈, and R₉ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

R₁₀ is selected from the group consisting of hydrogen, —OR₆, $C_1$-$C_{22}$-alkyl, substituted $C_1$-$C_{22}$-alkyl, $C_3$-$C_8$-cycloalkyl, and substituted $C_3$-$C_8$-cycloalkyl;

R₁₁ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —Y₁—R₃ and a succinimido group having the formula

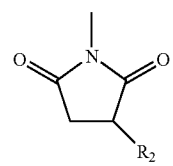

L₁ is a divalent linking group selected from the group consisting of $C_2$-$C_{22}$-alkylene, —(CH₂CH₂—Y₁)₁₋₃—CH₂CH₂—, $C_3$-$C_8$-cycloalkylene, arylene, and —CO-L₂-OC—;

$L_2$ is selected from the group consisting of $C_1$-$C_{22}$-alkylene, arylene, —(CH$_2$CH$_2$—Y$_1$)$_{1-3}$—CH$_2$CH$_2$— and $C_3$-$C_8$-cycloalkylene;

$Y_1$ is selected from the group consisting of —OC(O)—, —NHC(O)—, —O—, —S—, and —N(R$_1$)—;

$Y_2$ is —O— or —N(R$_1$)—;

Z is a positive integer of up to about 20;

m1 is an integer from 0 to about 10;

n1 is a positive integer from 2 to about 12;

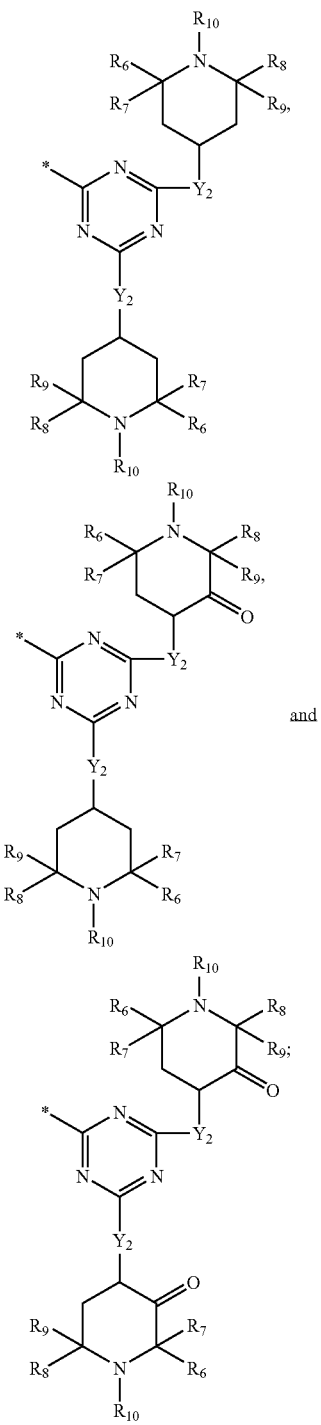

and wherein the ratio of the number of phosphorus atoms in the acidic phosphorus-containing compound to the number of basic nitrogen atoms in the basic organic compound is about 0.05 to about 2; and wherein the at least one phenolic antioxidant is selected from the group consisting of compounds having the formulas:

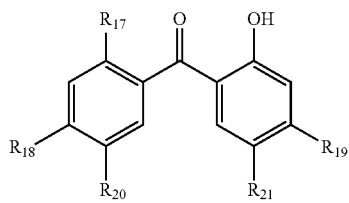
(21)

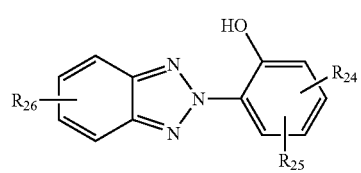
(22)

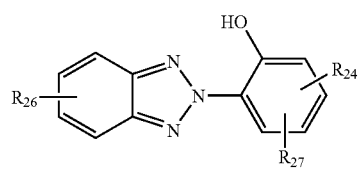
(23)

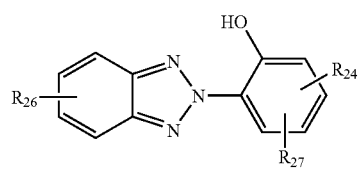
(24)

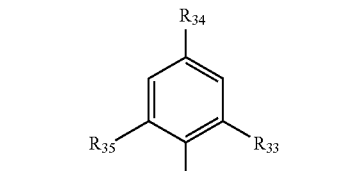
(25)

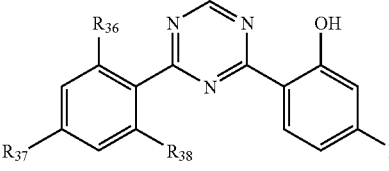
(26)

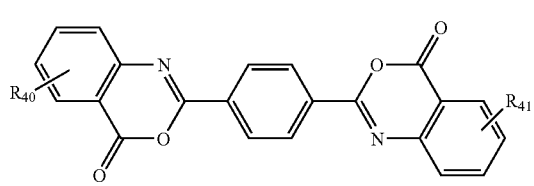

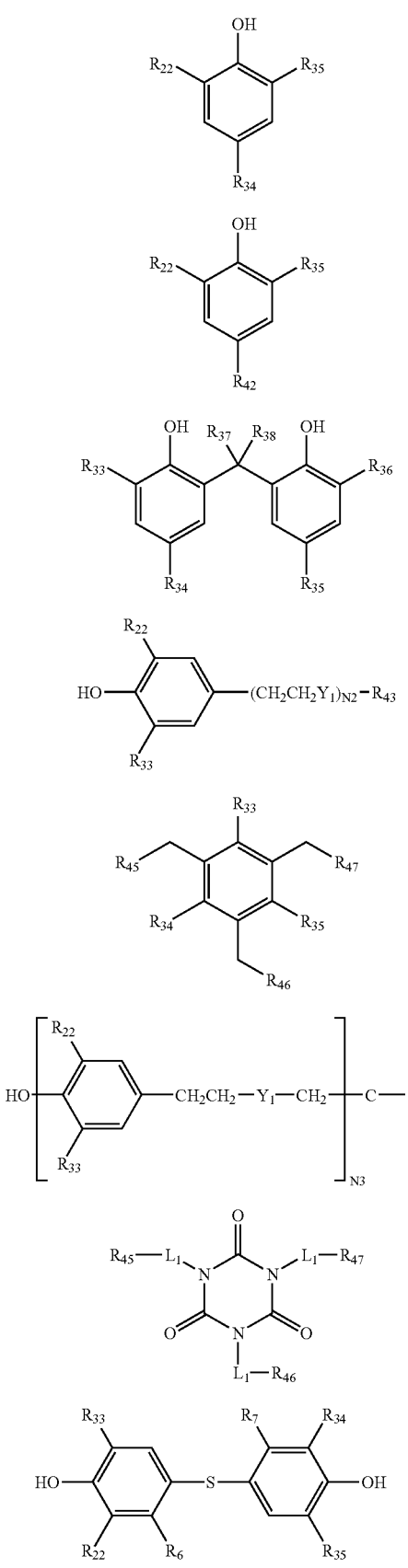

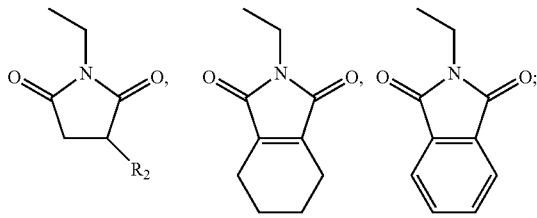

wherein $R_{17}$, $R_{18}$, and $R_{19}$ are independently selected from the group consisting of hydrogen, hydroxy, $C_1$-$C_{22}$-alkyl, substituted $C_1$-$C_{22}$-alkyl, $C_3$-$C_8$-cycloalkyl, substituted $C_3$-$C_8$-cycloalkyl and $OR_{22}$;

$R_{20}$ and $R_{21}$ are independently selected from the group consisting of hydrogen and —$SO_3R_{23}$;

$R_{22}$ is selected from the group consisting of $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{23}$ is selected from the group consisting of hydrogen, sodium, potassium, lithium, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{24}$ and $R_{25}$ are independently selected from the group consisting of hydrogen, $C_1$-$C_{22}$-alkyl, substituted $C_1$-$C_{22}$-alkyl, $C_3$-$C_8$-cycloalkyl and substituted $C_3$-$C_8$-cycloalkyl;

$R_{26}$ and $R_{28}$ are independently selected from the group consisting of hydrogen, halogen, $C_1$-$C_{22}$-alkyl, substituted $C_1$-$C_{22}$-alkyl, $C_3$-$C_8$-cycloalkyl and substituted $C_3$-$C_8$-cycloalkyl;

$R_{27}$ is —$(CH_2CH_2$—$Y_1)_{N2}$—$_{CH2}CH_2$-$R_{29}$ or a group having one of the following formulas $R_{29}$ is selected from the group consisting of hydrogen, hydroxy and —$CO_2R_{30}$;

$R_{30}$ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, aryl, and heteroaryl;

$R_{31}$ and $R_{32}$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{33}$, $R_{34}$, $R_{35}$, $R_{36}$, $R_{37}$, and $R_{38}$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{39}$ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$OR_{30}$;

$R_{40}$ and $R_{41}$ are independently selected from the group consisting of hydrogen, $C_1$-$C_{22}$-alkyl, substituted $C_1$-$C_{22}$-alkyl, $C_3$-$C_8$-cycloalkyl and substituted $C_3$-$C_8$-cycloalkyl;

$R_{42}$ is —$(CH_2CH_2$—$Y_1)_{N2}$—$R_{29}$;

$R_{43}$ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$R_{44}$;

$R_{44}$ is a group having one of the following formulas

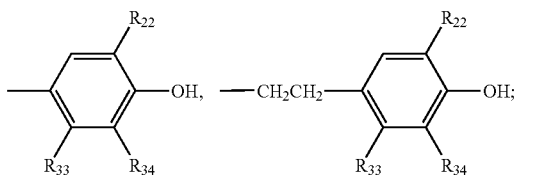

$R_{45}$, $R_{46}$ and $R_{47}$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$R_{44}$ and at least one of $R_{45}$, $R_{46}$ or $R_{47}$ is —$R_{44}$;

$L_1$ is a divalent linking group selected from the group consisting of $C_2$-$C_{22}$-alkylene, —$(CH_2CH_2$—$Y_1)_{1-3}$—$CH_2CH_2$—, $C_3$-$C_8$-cycloalkylene, arylene, and —$CO$-$L_2$-$OC$—;

$L_2$ is selected from the group consisting of $C_1$-$C_{22}$-alkylene, arylene, —$(CH_2CH_2$—$Y_1)_{1-3}$—$CH_2CH_2$— and $C_3$-$C_8$-cycloalkylene;

$Y_1$ is selected from the group consisting of —$OC(O)$—, —$NHC(O)$—, —$O$—, —$S$—, and —$N(R_1)$—;

$N_2$ is a positive integer from 1 to about 20; and $N_3$ is a positive integer from 1 to 4.

3. A polymer compound according to claim 2 wherein the polyester of component (A) comprises:
  (1) diacid residues comprising at least 50 mole percent terephthalic acid residues; and
  (2) diol residues comprising at least 50 mole percent of ethylene glycol residues, cyclohexanedimethanol residues, or a mixture thereof;
wherein the total of the diacid residues is equal to 100 mole percent and the total of the diol residues also is equal to 100 mole percent.

4. A polymer composition according to claim 3 wherein the polyester of component (A) comprises:
  (1) diacid residues comprising at least 50 mole percent terephthalic acid residues; and
  (2) diol residues comprising at least 50 mole percent of ethylene glycol residues, cyclohexanedimethanol residues, or a mixture thereof; and contains up to about 200 ppmw of at least one of Ti, Co or Mn residues,
wherein the total of the diacid residues is equal to 100 mole percent and the total of the diol residues also is equal to 100 mole percent.

5. A polymer composition comprising:
(A) at least one polyester comprising:
  (1) diacid residues comprising at least 50 mole percent terephthalic acid residues; and
  (2) diol residues comprising at least 50 mole percent of ethylene glycol residues, cyclohexanedimethanol residues, or a mixture thereof; and contains from about 10 to about 200 ppmw of at least one of Ti, Co or Mn residues, wherein the total of the diacid residues is equal to 100 mole percent and the total of the diol residues also is equal to 100 mole percent; and (B) about 0.01 to about 0.25 weight percent based on the total weight of the composition of at least one salt prepared by the reaction of one or more phosphorus-containing compounds selected from the group consisting of phosphorus acid, phosphoric acid and polyphosphoric acid with one or more basic organic compounds which contain nitrogen, wherein said one or more basic organic compounds are hindered amine light stabilizers (HALS) having one of the following formulas:

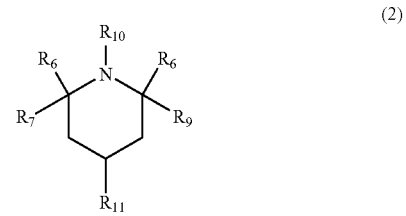

(2)

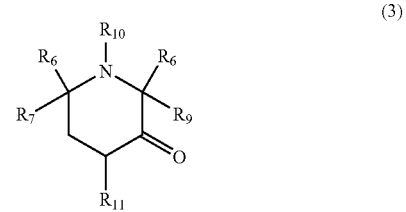

(3)

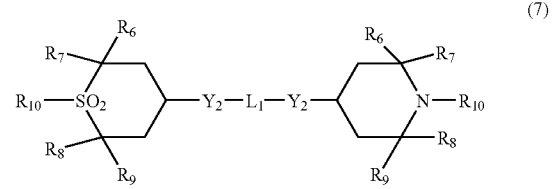

(7)

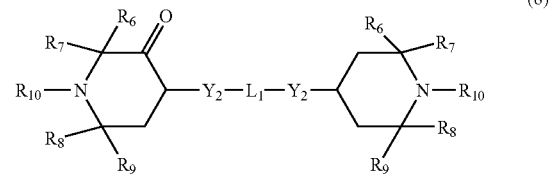

(8)

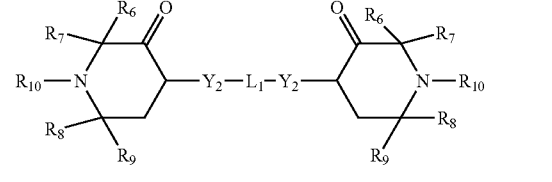

(9)

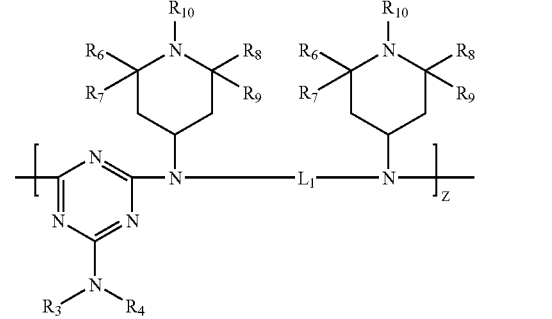

(12)

-continued

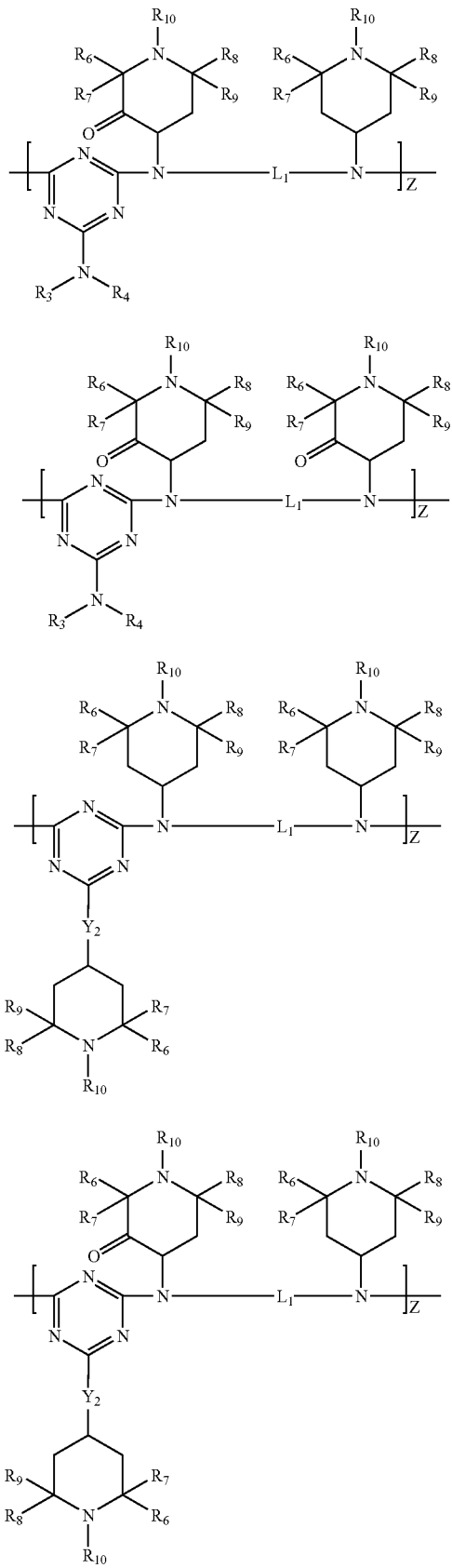

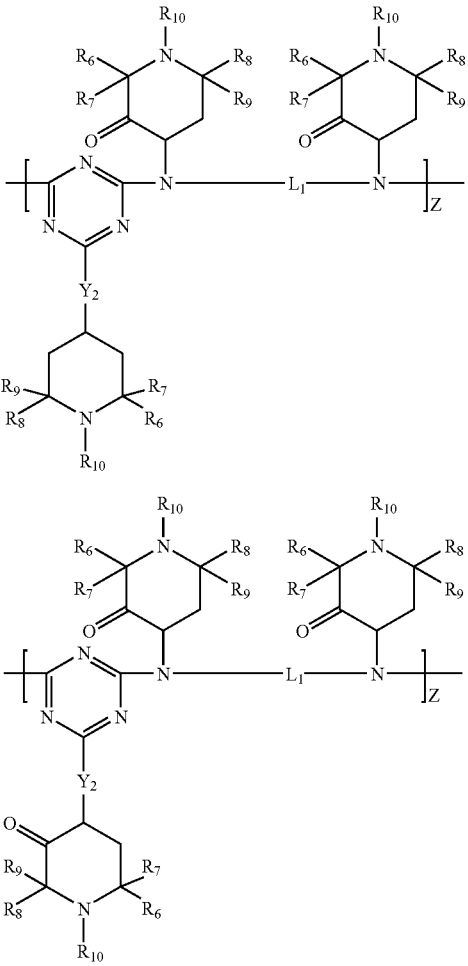

wherein

R$_1$ and R$_2$ are independently selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;

R$_3$ and R$_4$ are independently selected from the group consisting of hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl wherein at least one of R$_3$ and R$_4$ is a substituent other than hydrogen; R$_3$ and R$_4$ may collectively may represent a divalent group forming a ring with the nitrogen atom to which they are attached;

R$_6$, R$_7$, R$_8$, and R$_9$ are independently selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;

R$_{10}$ is selected from the group consisting of hydrogen, —OR$_6$, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{11}$ is selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, aryl, —Y$_1$—R$_3$ and a succinimido group having the formula

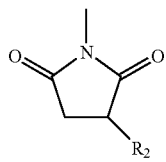

$L_1$ is a divalent linking group selected from the group consisting of $C_2$-$C_{22}$-alkylene, —(CH$_2$CH$_2$—Y$_1$)$_{1-3}$—CH$_2$CH$_2$—, $C_3$-$C_8$-cycloalkylene, arylene, and —CO-L$_2$-OC—;

$L_2$ is selected from the group consisting of $C_1$-$C_{22}$-alkylene, arylene, —(CH$_2$CH$_2$—Y$_1$)$_{1-3}$—CH$_2$CH$_2$— and $C_3$-$C_8$-cycloalkylene;

$Y_1$ is selected from the group consisting of —OC(O)—, —NHC(O)—, —O—, —S—, and —N(R$_1$)—;

$Y_2$ is —O— or —N(R$_1$)—;

Z is a positive integer of up to about 20;

m1 is an integer from 0 to about 10;

n1 is a positive integer selected from 2 to about 12;

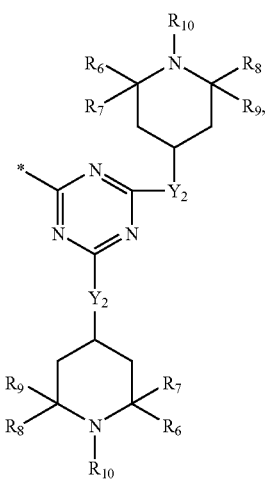

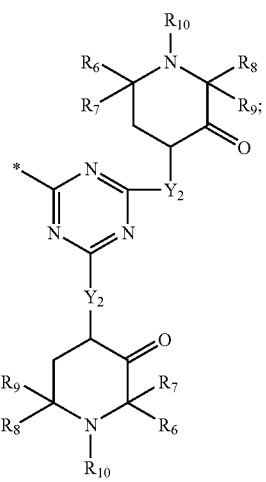

and wherein the ratio of the number of phosphorus atoms in the acidic phosphorus-containing compound to the number of basic nitrogen atoms in the basic organic compound is about 0.25 to about 1.1; and (C) at least one ultraviolet light absorber selected from the group consisting of compounds having the formulas:

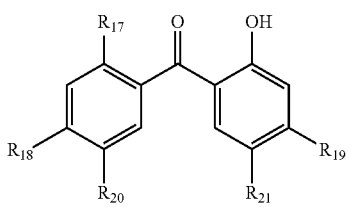
(21)

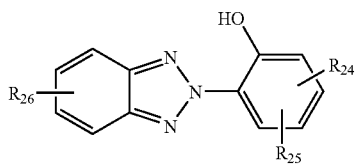
(22)

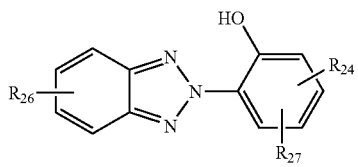
(23)

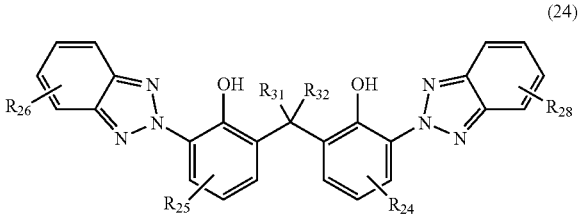
(24)

-continued

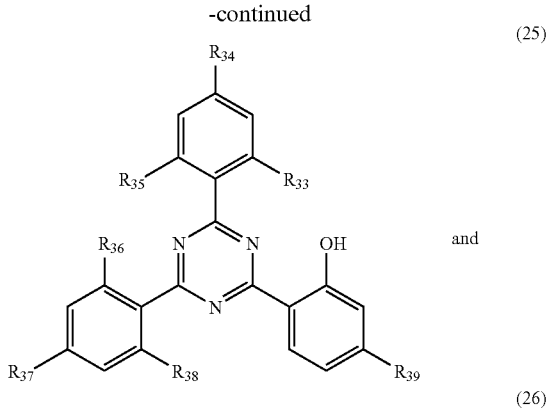

(25)

(26)

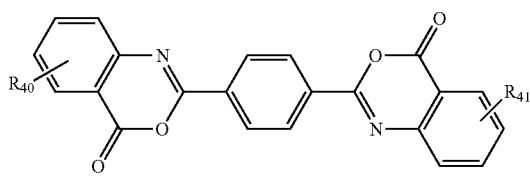

wherein
- $R_{17}$, $R_{18}$, and $R_{19}$ are independently selected from the group consisting of hydrogen, hydroxy, $C_1$-$C_{22}$-alkyl, substituted $C_1$-$C_{22}$-alkyl, $C_3$-$C_8$-cycloalkyl, substituted $C_3$-$C_8$-cycloalkyl and $OR_{22}$;
- $R_{20}$ and $R_{21}$ are independently selected from the group consisting of hydrogen and —$SO_3R_{23}$;
- $R_{22}$ is selected from the group consisting of $C_1$-$C_{22}$-alkyl, substituted $C_1$-$C_{22}$-alkyl, $C_3$-$C_8$-cycloalkyl, and substituted $C_3$-$C_8$-cycloalkyl;
- $R_{23}$ is selected from the group consisting of hydrogen, sodium, potassium, lithium, $C_1$-$C_{22}$-alkyl, substituted $C_1$-$C_{22}$-alkyl, $C_3$-$C_8$-cycloalkyl, and substituted $C_3$-$C_8$-cycloalkyl;
- $R_{24}$ and $R_{25}$ are independently selected from the group consisting of hydrogen, $C_1$-$C_{22}$-alkyl, substituted $C_1$-$C_{22}$-alkyl, $C_3$-$C_8$-cycloalkyl and substituted $C_3$-$C_8$-cycloalkyl;
- $R_{26}$ and $R_{28}$ are independently selected from the group consisting of hydrogen, halogen, $C_1$-$C_{22}$-alkyl, substituted $C_1$-$C_{22}$-alkyl, $C_3$-$C_8$-cycloalkyl and substituted $C_3$-$C_8$-cycloalkyl;
- $R_{27}$ is —$(CH_2CH_2$—$Y_1)_{N2}$—$CH_2CH_2$—$R_{29}$ or a group having one of the following formulas

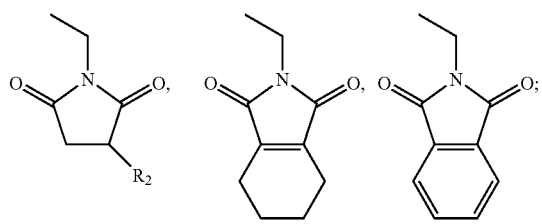

- $R_{29}$ is selected from the group consisting of hydrogen, hydroxy and —$CO_2R_{30}$;
- $R_{30}$ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, aryl, and heteroaryl;
- $R_{31}$ and $R_{32}$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;
- $R_{33}$, $R_{34}$, $R_{35}$, $R_{36}$, $R_{37}$, and $R_{38}$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;
- $R_{39}$ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$OR_{30}$;
- $R_{40}$ and $R_{41}$ are independently selected from the group consisting of hydrogen, $C_1$-$C_{22}$-alkyl, substituted $C_1$-$C_{22}$-alkyl, $C_3$-$C_8$-cycloalkyl and substituted $C_3$-$C_8$-cycloalkyl;
- $Y_1$ is selected from the group consisting of —OC(O)—, —NHC(O)—, —O—, —S—, and —N($R_1$)—; and
- $N_2$ is a positive integer from 1 to about 20.

6. A composition according to claim 5 wherein the polyester of component (A) has an inherent viscosity of about 0.4 to 1.2 dL/g measured at 25° C. in a 60/40 ratio by weight of phenol/tetrachloroethane and comprises:
   (1) diacid residues comprising about 80 to 100 mole percent terephthalic acid residues and about 0 to 20 mole percent isophthalic acid residues; and
   (2) diol residues comprising about 40 to 100 mole percent 1,4-cyclohexanedimethanol residues and about 0 to 60 mole percent ethylene glycol,
   wherein the total of the diacid residues is equal to 100 mole percent and the total of the diol residues also is equal to 100 mole percent; and
   wherein the composition comprises about 0.05 to about 0.15 weight percent based on the total weight of the composition of at least one salt derived from the reaction of phosphorous acid and a basic organic compound having the structure of formulas (2), (3), (7), (8), (9), (12), (13), (14), (16), (17), (18) or (19) wherein $R_{10}$ is hydrogen or alkyl and the ratio of the number of phosphorus atoms in the acidic phosphorus-containing compound to the number of basic nitrogen atoms in the basic organic compound is about 0.25 to about 1.1.

7. The composition of claim 6 wherein the polyester of component (A) has an inherent viscosity of about 0.4 to 0.8 dL/g measured at measured at 25° C. in a 60/40 ratio by weight of phenol/tetrachloroethane and comprises:
   (1) diacid residues comprising about 80 to 100 mole percent terephthalic acid residues and about 0 to 20 mole percent isophthalic acid residues; and
   (2) diol residues comprising about 55 to 80 mole percent 1,4-cyclohexanedimethanol residues and 20 to about 45 mole percent ethylene glycol residues,
   wherein the total of the diacid residues is equal to 100 mole percent and the total of the diol residues also is equal to 100 mole percent.

8. The composition of claim 5 wherein the polyester of component (A) has an inherent viscosity of about 0.4 to 0.8 dL/g measured at measured at 25° C. in a 60/40 ratio by weight of phenol/tetrachloroethane and comprises:
   (1) diacid residues comprising about 65 to 83 mole percent terephthalic acid residues and about 35 to 17 mole percent isophthalic acid residues; and
   (2) diol residues comprising about 80 to 100 mole percent 1,4-cyclohexanedimethanol residues and 0 to about 20 mole percent ethylene glycol residues,
   wherein the total of the diacid residues is equal to 100 mole percent and the total of the diol residues also is equal to 100 mole percent; and wherein the composition comprises about 0.05 to about 0.15 weight percent based on the total weight of the composition of at least one salt derived from the reaction of phosphorous acid and a basic organic compound having the structure of formulas (2), (3), (7), (8), (9), (12), (13), (14), (16), (17), (18) or (19) wherein $R_{10}$ is hydrogen or alkyl and the ratio of the number of phosphorus atoms in the acidic phosphorus-containing compounds to number of basic nitrogen atoms in the basic organic compound is about 0.25 to about 1.1.

9. The composition of claim 8 wherein the polyester of component (A) has an inherent viscosity of about 0.4 to 0.8 dL/g measured at measured at 25° C. in a 60/40 ratio by weight of phenol/tetrachloroethane and comprises:
   (1) diacid residues comprising about 70 to 80 mole percent terephthalic acid residues and about 30 to 20 mole percent isophthalic acid residues; and
   (2) diol residues comprising about 90 to 100 mole percent 1,4-cyclohexanedimethanol residues and 0 to about 10 mole percent ethylene glycol residues,
   wherein the total of the diacid residues is equal to 100 mole percent and the total of the diol residues also is equal to 100 mole percent.

10. The composition of claim 6 wherein the polyester of component (A) has an inherent viscosity of about 0.4 to 0.8 dL/g measured at measured at 25° C. in a 60/40 ratio by weight of phenol/tetrachloroethane and comprises:
    (1) diacid residues comprising about 80 to 100 mole percent terephthalic acid residues and about 0 to 20 mole percent isophthalic acid residues; and
    (2) diol residues comprising about 80 to 100 mole percent 1,4-cyclohexanedimethanol residues and 0 to about 20 mole percent ethylene glycol residues,
    wherein the total of the diacid residues is equal to 100 mole percent and the total of the diol residues also is equal to 100 mole percent.

11. The composition of claim 10 wherein the polyester of component (A) has an inherent viscosity of about 0.4 to 0.8 dL/g measured at measured at 25° C. in a 60/40 ratio by weight of phenol/tetrachloroethane and comprises:
    (1) diacid residues comprising about 90 to 100 mole percent terephthalic acid residues and about 0 to 10 mole percent isophthalic acid residues; and
    (2) diol residues comprising about 90 to 100 mole percent 1,4-cyclohexanedimethanol residues and 0 to about 10 mole percent ethylene glycol residues,
    wherein the total of the diacid residues is equal to 100 mole percent and the total of the diol residues also is equal to 100 mole percent.

12. A polymer composition comprising:
    (A) at least one polyester having an inherent viscosity of about 0.4 to 1.2 dL/g measured at 25° C. in a 60/40 ratio by weight of phenol/tetrachloroethane and comprises
       (1) diacid residues comprising at least 50 mole percent terephthalic acid residues; and
       (2) diol residues comprising at least 50 mole percent of ethylene glycol residues, cyclohexanedimethanol residues, or a mixture thereof; and contains from about 10 to about 200 ppmw of at least one of Ti, Co or Mn residues, wherein the total of the diacid residues is equal to 100 mole percent and the total of the diol residues also is equal to 100 mole percent; and
    (B) about 0.01 to about 0.25 weight percent based on the total weight of the composition of at least one salt prepared by the reaction of phosphorous acid with one or more basic organic compounds which contain nitrogen, wherein said one or more basic organic compounds are hindered amine light stabilizers (HALS) having one of the following the formulas:

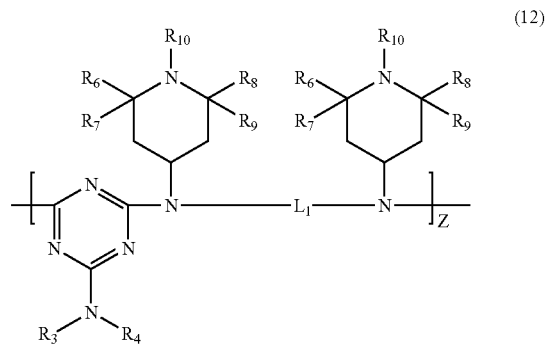

(12)

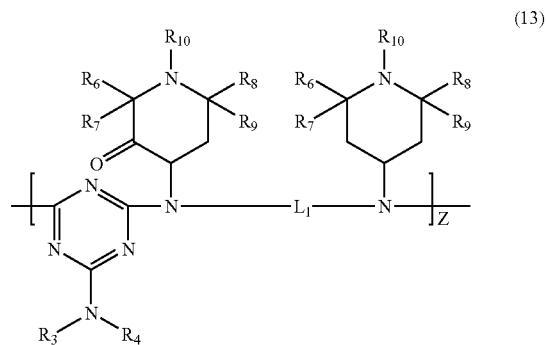

(13)

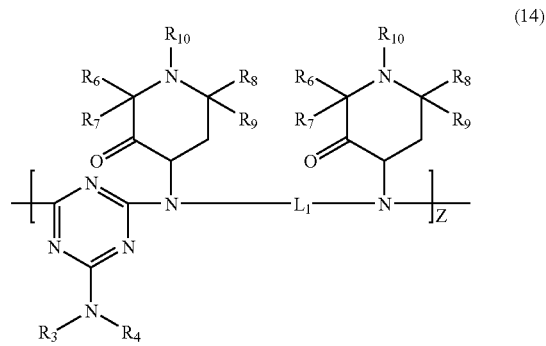

(14)

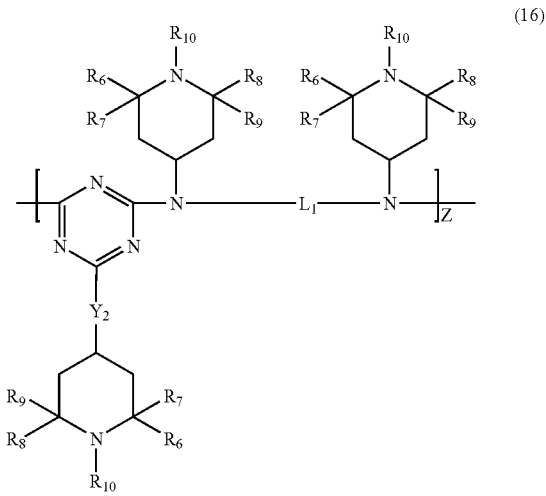

(16)

-continued

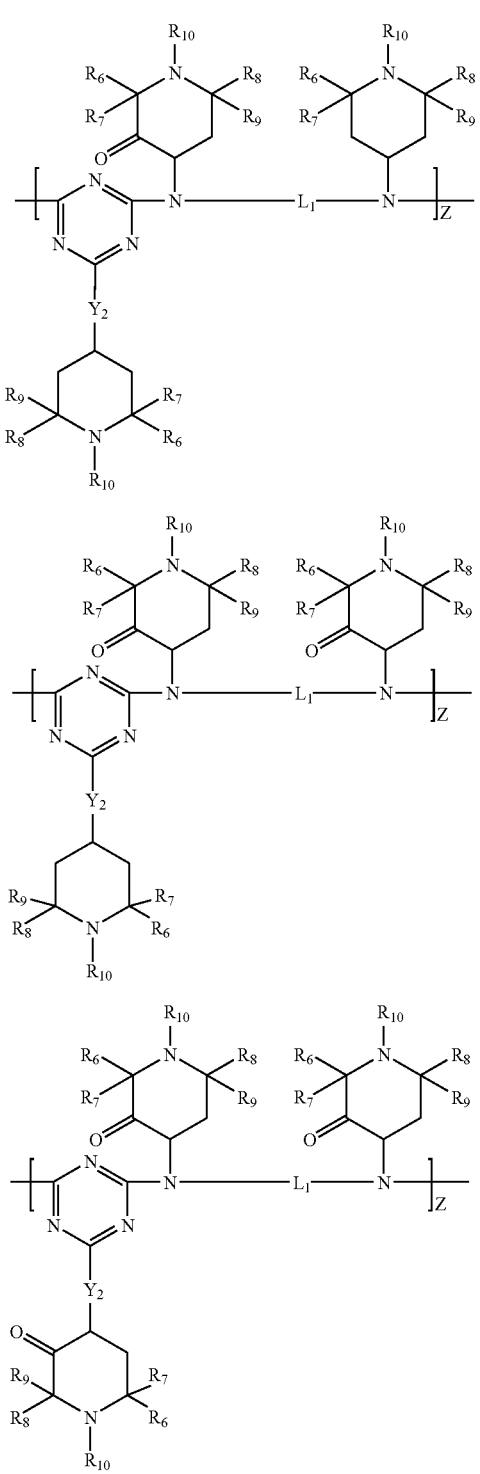

wherein
R₁ and R₂ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
R₃ and R₄ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of R₃ and R₄ is a substituent other than hydrogen; R₃ and R₄ may collectively may represent a divalent group forming a ring with the nitrogen atom to which they are attached;
R₆, R₇, R₈, and R₉ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
R₁₀ is selected from the group consisting of hydrogen, —OR₆, $C_1$-$C_{22}$-alkyl, substituted $C_1$-$C_{22}$-alkyl, $C_3$-$C_8$-cycloalkyl, and substituted $C_3$-$C_8$-cycloalkyl;
L₁ is a divalent linking group selected from the group consisting of $C_2$-$C_{22}$-alkylene, —(CH₂CH₂—Y₁)₁₋₃—CH₂CH₂—, $C_3$-$C_8$-cycloalkylene, arylene, and —CO-L₂-OC—; L₂ is selected from the group consisting of $C_1$-$C_{22}$-alkylene, arylene, —(CH₂CH₂—Y₁)₁₋₃—CH₂CH₂— and $C_3$-$C_8$-cycloalkylene;
Y₁ is selected from the group consisting of —OC(O)—, —NHC(O)—, —O—, —S—, and —N(R₁)—;
Y₂ is —O— or —N(R₁)—;
Z is a positive integer of up to about 20;
m1 is an integer from 0 to about 10;
n1 is a positive integer from 2 to about 12;

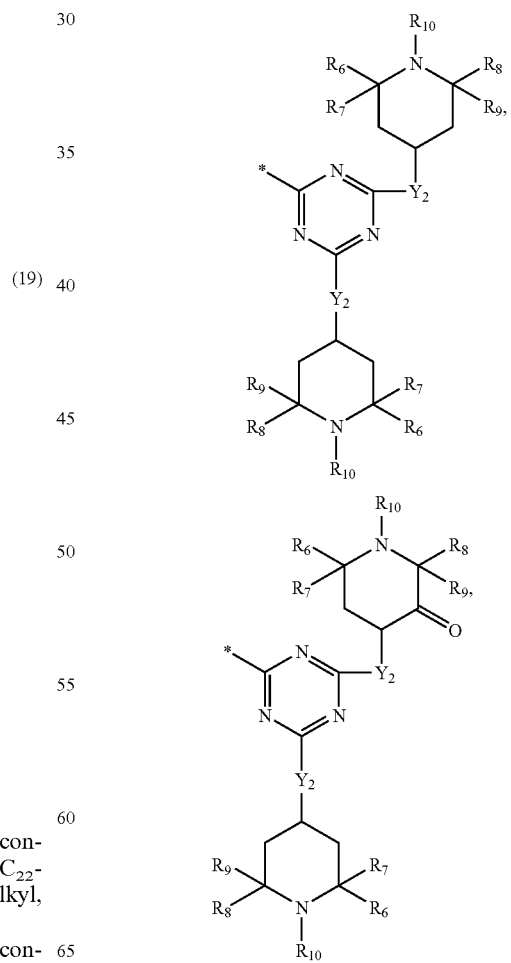

and

-continued

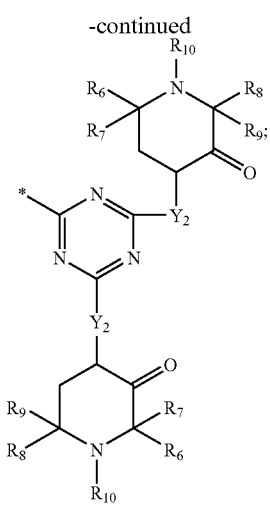

and wherein the ratio of the number of phosphorus atoms in the acidic phosphorus-containing compound to the number of basic nitrogen atoms in the basic organic compound is about 0.25 to about 1.1; and (C) at least one ultraviolet light absorber selected from the group consisting of compounds having the formulas:

(24)

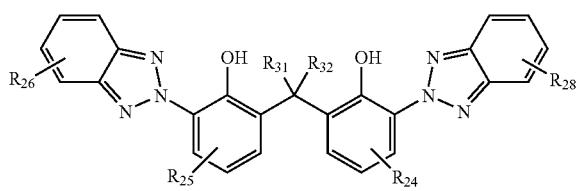

(25)

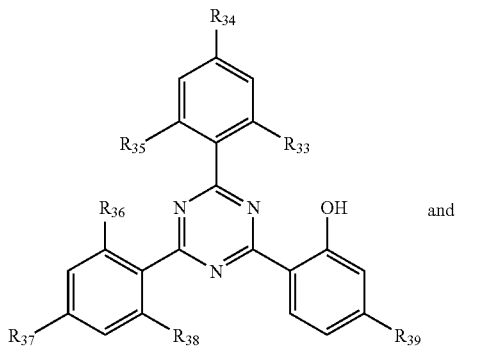
and (26)

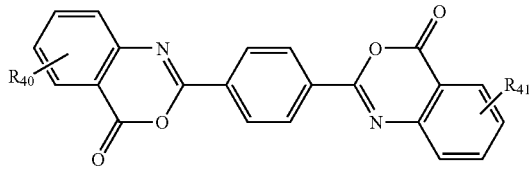

wherein $R_{24}$ and $R_{25}$ are independently selected from the group consisting of hydrogen, $C_1$-$C_{22}$-alkyl, substituted $C_1$-$C_{22}$-alkyl, $C_3$-$C_8$-cycloalkyl and substituted $C_3$-$C_8$-cycloalkyl;

$R_{26}$ and $R_{28}$ are independently selected from the group consisting of hydrogen, halogen, $C_1$-$C_{22}$-alkyl, substituted $C_1$-$C_{22}$-alkyl, $C_3$-$C_8$-cycloalkyl and substituted $C_3$-$C_8$-cycloalkyl;

$R_{30}$ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, aryl, and heteroaryl;

$R_{31}$ and $R_{32}$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{33}$, $R_{34}$, $R_{35}$, $R_{36}$, $R_{37}$, and $R_{38}$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{39}$ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$OR_{30}$; and $R_{40}$ and $R_{41}$ are independently selected from the group consisting of hydrogen, $C_1$-$C_{22}$-alkyl, substituted $C_1$-$C_{22}$-alkyl, $C_3$-$C_8$-cycloalkyl and substituted $C_3$-$C_8$-cycloalkyl.

13. A composition of claim 12 wherein the polyester of component (A) has an inherent viscosity of about 0.4 to 0.8 dL/g measured at measured at 25° C. in a 60/40 ratio by weight of phenol/tetrachloroethane and comprises:
(1) diacid residues comprising about 80 to 100 mole percent terephthalic acid residues and about 0 to 20 mole percent isophthalic acid residues; and
(2) diol residues comprising about 55 to 80 mole percent 1,4-cyclohexanedimethanol residues and 20 to about 45 mole percent ethylene glycol residues,
wherein the total of the diacid residues is equal to 100 mole percent and the total of the diol residues also is equal to 100 mole percent; and
wherein the composition comprises about 0.05 to about 0.15 weight percent based on the total weight of the composition of the at least one salt wherein $R_{10}$ is hydrogen or alkyl and the ratio of the number of phosphorus atoms in the phosphorous acid to number of basic nitrogen atoms in the basic organic compound is about 0.25 to about 1.1.

14. A composition of claim 12 wherein the polyester of component (A) has an inherent viscosity of about 0.4 to 0.8 dL/g measured at measured at 25° C. in a 60/40 ratio by weight of phenol/tetrachloroethane and comprises:
(1) diacid residues comprising about 70 to 80 mole percent terephthalic acid residues and about 30 to 20 mole percent isophthalic acid residues; and
(2) diol residues comprising about 90 to 100 mole percent 1,4-cyclohexanedimethanol residues and 0 to about 10 mole percent ethylene glycol residues,
wherein the total of the diacid residues is equal to 100 mole percent and the total of the diol residues also is equal to 100 mole percent; and
wherein the composition comprises about 0.05 to about 0.15 weight percent based on the total weight of the composition of the at least one salt where $R_{10}$ is hydrogen or alkyl and the ratio of the number of phosphorus atoms in the phosphorous acid to number of basic nitrogen atoms in the basic organic compound is about 0.25 to about 1.1.

15. A composition of claim 12 wherein the polyester of component (A) has an inherent viscosity of about 0.4 to 0.8 dL/g measured at measured at 25° C. in a 60/40 ratio by weight of phenol/tetrachloroethane and comprises:

(1) diacid residues comprising about 90 to 100 mole percent terephthalic acid residues and about 0 to 10 mole percent isophthalic acid residues; and
(2) diol residues comprising about 90 to 100 mole percent 1,4-cyclohexanedimethanol residues and 0 to about 10 mole percent ethylene glycol residues,
wherein the total of the diacid residues is equal to 100 mole percent and the total of the diol residues also is equal to 100 mole percent; and
wherein the composition comprises about 0.05 to about 0.15 weight percent based on the total weight of the composition of the at least one salt where $R_{10}$ is hydrogen or alkyl and the ratio of the number of phosphorus atoms in the phosphorous acid to number of basic nitrogen atoms in the basic organic compounds is about 0.25 to about 1.1.

16. A polymer composition comprising:
(A) at least one polyester having an inherent viscosity of about 0.4 to 1.2 dL/g measured at 25° C. in a 60/40 ratio by weight of phenol/tetrachloroethane and comprises
   (1) diacid residues comprising at least 50 mole percent terephthalic acid residues; and
   (2) diol residues comprising at least 50 mole percent of ethylene glycol residues, cyclohexanedimethanol residues, or a mixture thereof; and contains from about 10 to about 200 ppmw of at least one of Ti, Co or Mn residues,
wherein the total of the diacid residues is equal to 100 mole percent and the total of the diol residues also is equal to 100 mole percent; and
(B) about 0.05 to about 0.15 weight percent based on the total weight of the composition of at least one salt prepared by the reaction of phosphorous acid with one or more basic organic compounds which contain nitrogen,
wherein said one or more basic organic compounds are hindered amine light stabilizers (HALS) having the formula:

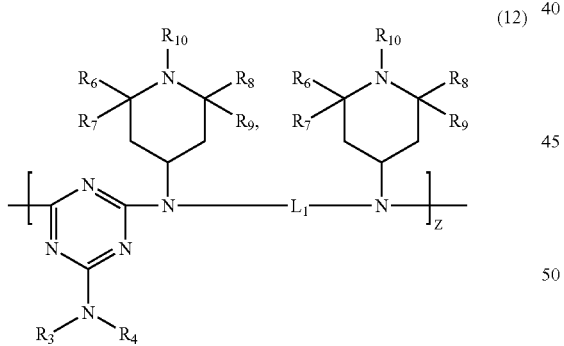

(12)

wherein
$R_3$ and $R_4$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$ and $R_4$ is a substituent other than hydrogen; $R_3$ and $R_4$ collectively represent a divalent group forming a ring with the nitrogen atom to which they are attached;
$R_6$, $R_7$, $R_8$, and $R_9$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
$R_{10}$ is hydrogen or $C_1$-$C_{22}$-alkyl;

$L_1$ is a divalent linking group selected from the group consisting of $C_2$-$C_{22}$-alkylene; —(CH$_2$CH$_2$—Y$_1$)$_{1-3}$— CH$_2$CH$_2$—; $C_3$-$C_8$-cycloalkylene; arylene; and —CO-L$_2$-OC—, and
Z is a positive integer of up to about 20;
$L_2$ is selected from the group consisting of $C_1$-$C_{22}$-alkylene, arylene, —(CH$_2$CH$_2$—Y$_1$)$_{1-3}$—CH$_2$CH$_2$— and $C_3$-$C_8$-cycloalkylene; and
$Y_1$ is selected from the group consisting of —OC(O)—, —NHC(O)—, —O—, —S—, and —N($R_1$)—; and
(C) at least one ultraviolet light absorber having the formula:

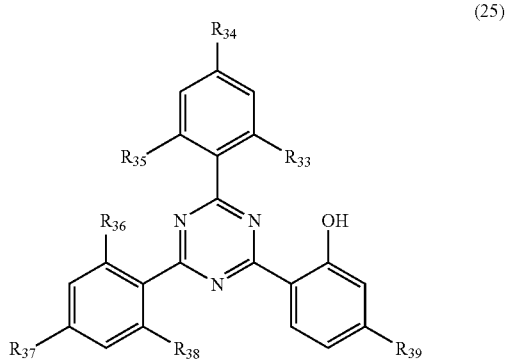

(25)

wherein
$R_{30}$ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, aryl, and heteroaryl;
$R_{33}$, $R_{34}$, $R_{35}$, $R_{36}$, $R_{37}$, and $R_{38}$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl; and
$R_{39}$ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —OR$_{30}$; and
wherein the number of phosphorus atoms in the phosphorous acid to the number of nitrogen atoms in the basic organic compound is about 0.2 to about 0.6.

17. A composition of claim 16 wherein the polyester of component (A) has an inherent viscosity of about 0.4 to 0.8 dL/g measured at measured at 25° C. in a 60/40 ratio by weight of phenol/tetrachloroethane and comprises:
(1) diacid residues comprising about 80 to 100 mole percent terephthalic acid residues and about 0 to 20 mole percent isophthalic acid residues; and
(2) diol residues comprising about 55 to 80 mole percent 1,4-cyclohexanedimethanol residues and 20 to about 45 mole percent ethylene glycol residues,
wherein the total of the diacid residues is equal to 100 mole percent and the total of the diol residues also is equal to 100 mole percent; and
wherein the composition comprises about 0.05 to about 0.15 weight percent based on the total weight of the composition of the at least one salt wherein $R_6$=$R_7$=$R_8$=$R_9$=$R_{10}$=methyl; $L_1$ is hexamethylene; and ($R_3$)($R_4$)N— collectively represent a morpholino group.

18. A composition of claim 16 wherein the polyester of component (A) has an inherent viscosity of about 0.4 to 0.8 dL/g measured at measured at 25° C. in a 60/40 ratio by weight of phenol/tetrachloroethane and comprises:

(1) diacid residues comprising about 70 to 80 mole percent terephthalic acid residues and about 30 to 20 mole percent isophthalic acid residues; and
(2) diol residues comprising about 90 to 100 mole percent 1,4-cyclohexanedimethanol residues and 0 to about 10 mole percent ethylene glycol residues, wherein the total of the diacid residues is equal to 100 mole percent and the total of the diol residues also is equal to 100 mole percent; and wherein the composition comprises about 0.05 to about 0.15 weight percent based on the total weight of the composition of the at least one salt wherein $R_6=R_7=R_8=R_9=R_{10}$=methyl; $L_1$ is hexamethylene; and $(R_3)(R_4)N$— collectively represent a morpholino group.

19. A composition of claim 16 wherein the polyester of component (A) has an inherent viscosity of about 0.4 to 0.8 dL/g measured at measured at 25° C. in a 60/40 ratio by weight of phenol/tetrachloroethane and comprises:
(1) diacid residues comprising about 90 to 100 mole percent terephthalic acid residues and about 0 to 10 mole percent isophthalic acid residues; and
(2) diol residues comprising about 90 to 100 mole percent 1,4-cyclohexanedimethanol residues and 0 to about 10 mole percent ethylene glycol residues, wherein the total of the diacid residues is equal to 100 mole percent and the total of the diol residues also is equal to 100 mole percent.

20. The polymer composition of claims 16, 17, 18 or 19 wherein the ultraviolet light absorbing compound of formula (25) is defined by: $R_{33}=R_{34}=R_{35}=R_{36}=R_{37}=R_{38}$=hydrogen, and $R_{39}$=—$OC_8H_{17}$.

21. A polymer composition comprising:
(A) at least one polyester prepared by the reaction of at least one diol with at least one dicarboxylic acid or dialkyl ester thereof in the presence of a metallic catalyst;
(B) at least one salt prepared by the reaction of one or more acidic phosphorus-containing compounds with one or more basic organic compounds which contain nitrogen;
(C) at least one ultraviolet light absorber and optionally at least one phenolic antioxidant; and
(D) at least one polycarbonate,
wherein said one or more basic organic compounds are hindered amine light stabilizers (HALS).

22. A polymer composition according to claim 21 wherein the acidic phosphorus-containing compounds have one of the following formulas:

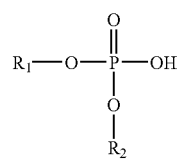

(1)

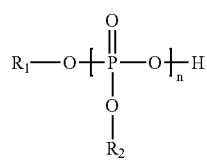

(3)

-continued

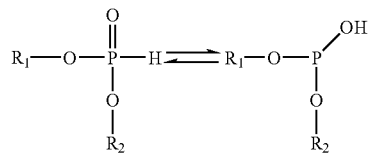

(2)

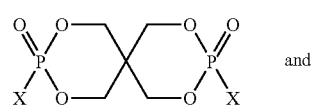

(4)

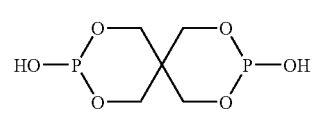

(5)

wherein
$R_1$ and $R_2$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

n is 2 to 500; and

X is hydrogen or hydroxy; and wherein the basic organic compounds have one of the following formulas:

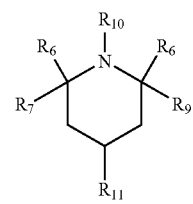

(2)

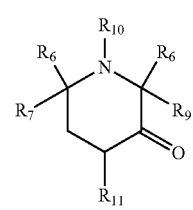

(3)

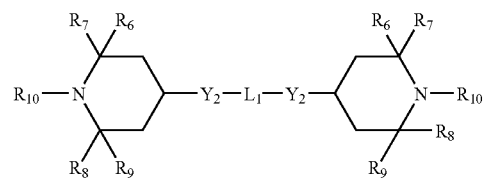

(7)

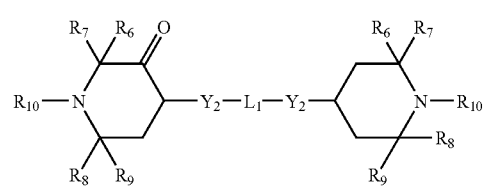

(8)

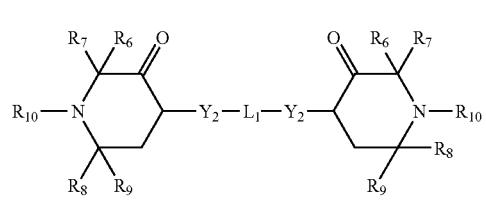 (9)
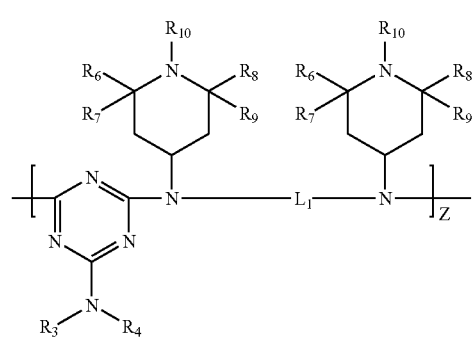 (12)
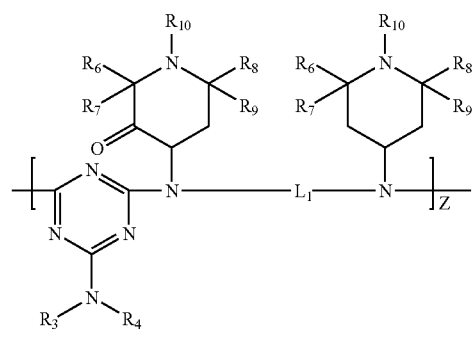 (13)
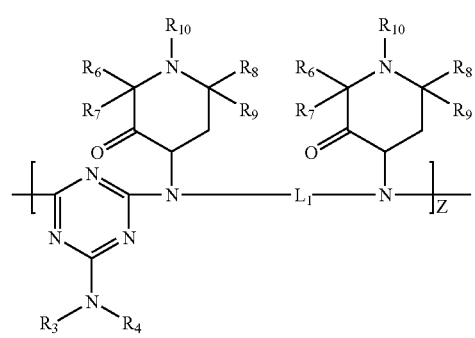 (14)
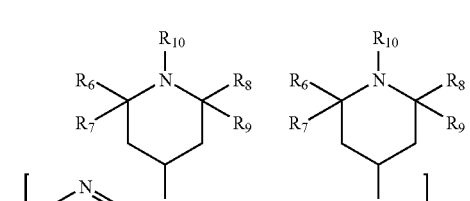 (16)
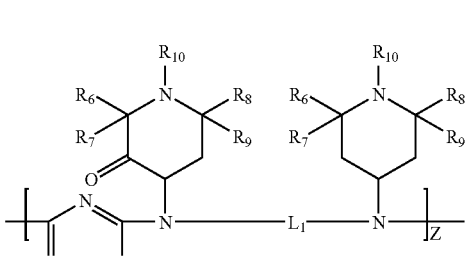 (17)
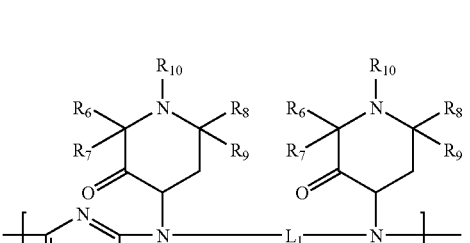 (18)

-continued (19)

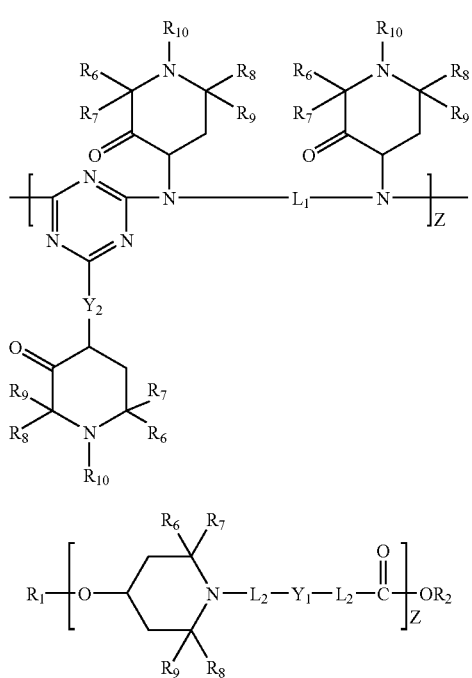

(20)

wherein
- $R_1$ and $R_2$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- $R_3$, and $R_4$, are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$, or $R_4$, is a substituent other than hydrogen; $R_3$ and $R_4$ may collectively may represent a divalent group forming a ring with the nitrogen atom to which they are attached;
- $R_6$, $R_7$, $R_8$, and $R_9$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- $R_{10}$ is selected from the group consisting of hydrogen, —$OR_6$, $C_1$-$C_{22}$-alkyl, substituted $C_1$-$C_{22}$-alkyl, $C_3$-$C_8$-cycloalkyl, and substituted $C_3$-$C_8$-cycloalkyl;
- $R_{11}$ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$—$R_3$ or and a succinimido group having the formula

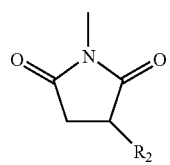

- $L_1$ is a divalent linking group selected from the group consisting of $C_2$-$C_{22}$-alkylene, —(CH$_2$CH$_2$—$Y_1$)$_{1-3}$— CH$_2$CH$_2$—, $C_3$-$C_8$-cycloalkylene, arylene, and —CO-$L_2$-OC—;
- $L_2$ is selected from the group consisting of $C_1$-$C_{22}$-alkylene, arylene, —(CH$_2$CH$_2$—$Y_1$)$_{1-3}$—CH$_2$CH$_2$— and $C_3$-$C_8$-cycloalkylene;
- $Y_1$ is selected from the group consisting of —OC(O)—, —NHC(O)—, —O—, —S—, and —N($R_1$)—;
- $Y_2$ is —O— or —N($R_1$)—;
- Z is a positive integer of up to about 20;
- m1 is an integer from 0 to about 10;
- n1 is a positive integer from 2 to about 12;

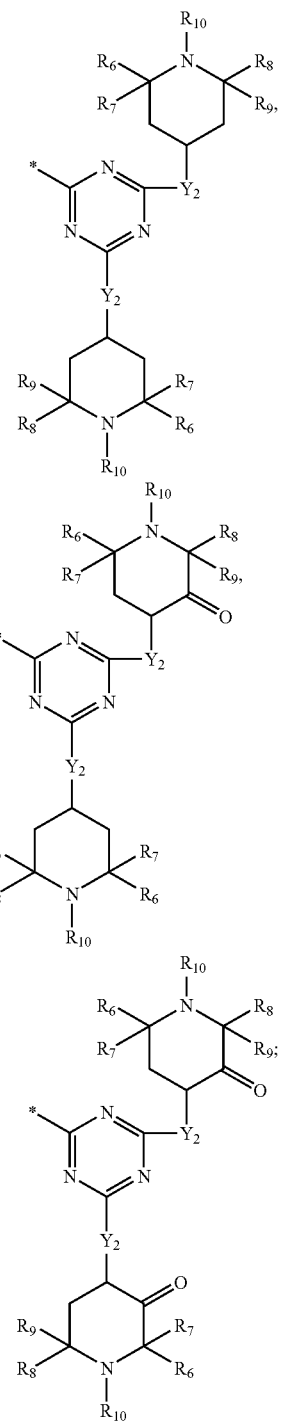

and and
wherein the ratio of the number of phosphorus atoms in the acidic phosphorus-containing compound to the number of basic nitrogen atoms in the basic organic compound is about 0.05 to about 2; and
(C) at least one ultraviolet light absorber or phenolic antioxidant or both selected from the group consisting of compounds having one of the formulas:
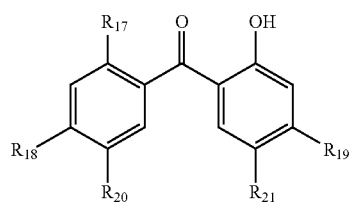
(21)
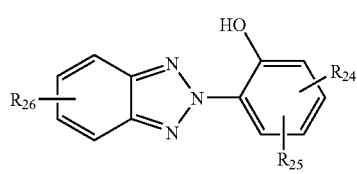
(22)
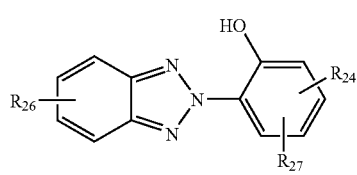
(23)
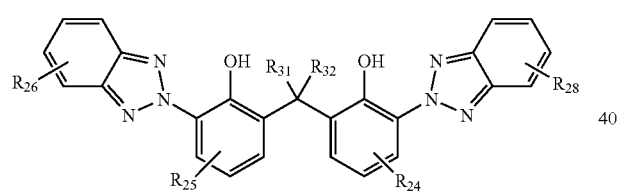
(24)
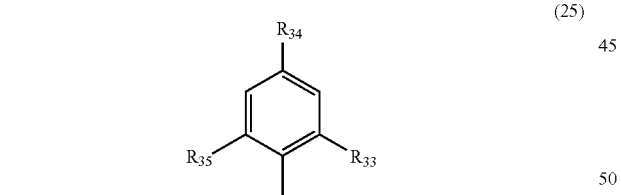
(25)
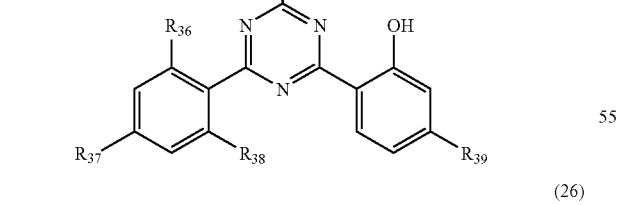
(26)
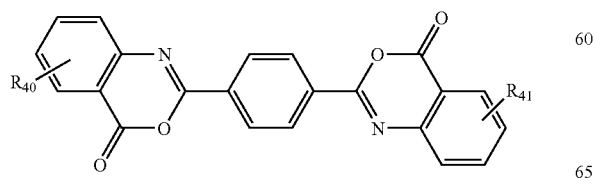
-continued
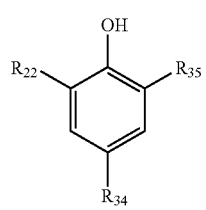
(27)
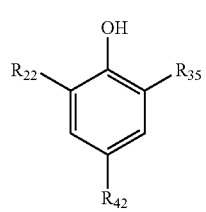
(28)
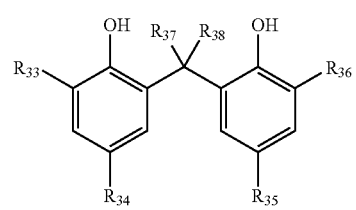
(29)
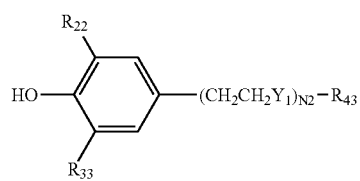
(30)
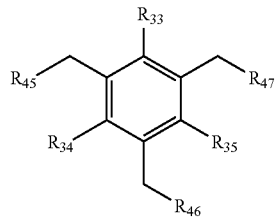
(31)
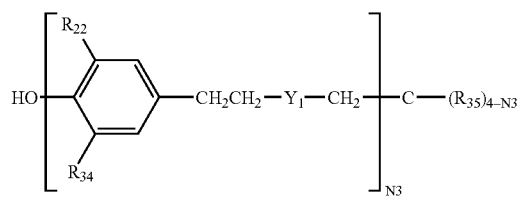
(32)
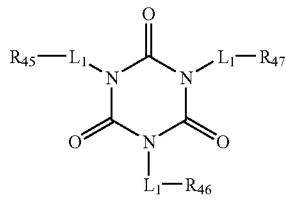
(33)

-continued

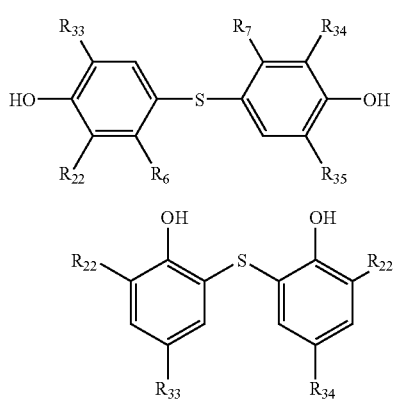

wherein

- $R_{17}$, $R_{18}$, and $R_{19}$ are independently selected from the group consisting of hydrogen, hydroxy, $C_1$-$C_{22}$-alkyl, substituted $C_1$-$C_{22}$-alkyl, $C_3$-$C_8$-cycloalkyl, substituted $C_3$-$C_8$-cycloalkyl and $OR_{22}$;
- $R_{20}$ and $R_{21}$ are independently selected from the group consisting of hydrogen and —$SO_3R_{23}$;
- $R_{22}$ is selected from the group consisting of $C_1$-$C_{22}$-alkyl, substituted $C_1$-$C_{22}$-alkyl, $C_3$-$C_8$-cycloalkyl, and substituted $C_3$-$C_8$-cycloalkyl;
- $R_{23}$ is selected from the group consisting of hydrogen, sodium, potassium, lithium, $C_1$-$C_{22}$-alkyl, substituted $C_1$-$C_{22}$-alkyl, $C_3$-$C_8$-cycloalkyl, and substituted $C_3$-$C_8$-cycloalkyl;
- $R_{24}$ and $R_{25}$ are independently selected from the group consisting of hydrogen, $C_1$-$C_{22}$-alkyl, substituted $C_1$-$C_{22}$-alkyl, $C_3$-$C_8$-cycloalkyl and substituted $C_3$-$C_8$-cycloalkyl;
- $R_{26}$ and $R_{28}$ are independently selected from the group consisting of hydrogen, halogen, $C_1$-$C_{22}$-alkyl, substituted $C_1$-$C_{22}$-alkyl, $C_3$-$C_8$-cycloalkyl and substituted $C_3$-$C_8$-cycloalkyl;
- $R_{27}$ is —$(CH_2CH_2—Y_1)_{N2}$—$CH_2CH_2$—$R_{29}$ or a group having one of the following formulas

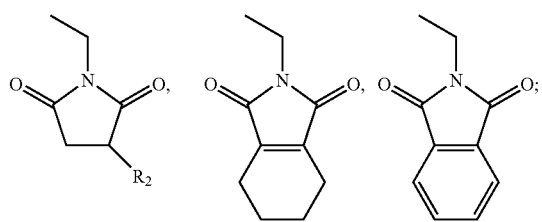

- $R_{29}$ is selected from the group consisting of hydrogen, hydroxy and —$CO_2R_{30}$;
- $R_{30}$ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, aryl, and heteroaryl;
- $R_{31}$ and $R_{32}$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;
- $R_{33}$, $R_{34}$, $R_{35}$, $R_{36}$, $R_{37}$, and $R_{38}$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;
- $R_{39}$ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$OR_{30}$;
- $R_{40}$ and $R_{41}$ are independently selected from the group consisting of hydrogen, $C_1$-$C_{22}$-alkyl, substituted $C_1$-$C_{22}$-alkyl, $C_3$-$C_8$-cycloalkyl and substituted $C_3$-$C_8$-cycloalkyl;
- $R_{42}$ is —$(CH_2CH_2—Y_1)_{N2}$—$R_{29}$;
- $R_{43}$ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$R_{44}$;
- $R_{44}$ is a group having one of the following formulas

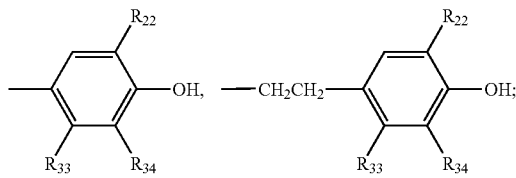

- $R_{45}$, $R_{46}$ and $R_{47}$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$R_{44}$ and at least one of $R_{45}$, $R_{46}$ or $R_{47}$ is —$R_{44}$;
- $L_1$ is a divalent linking group selected from the group consisting of $C_2$-$C_{22}$-alkylene, —$(CH_2CH_2—Y_1)_{1-3}$—$CH_2CH_2$—, $C_3$-$C_8$-cycloalkylene, arylene, and —CO-$L_2$-OC—;
- $L_2$ is selected from the group consisting of $C_1$-$C_{22}$-alkylene, arylene, —$(CH_2CH_2—Y_1)_{1-3}$—$CH_2CH_2$— and $C_3$-$C_8$-cycloalkylene;
- $Y_1$ is selected from the group consisting of —OC(O)—, —NHC(O)—, —O—, —S—, and —N($R_1$)—;
- $N_2$ is a positive integer from 1 to about 20; and
- $N_3$ is an positive integer from 1 to 4.

23. A polymer compound according to claim 22 wherein the polyester of component (A) comprises:
(1) diacid residues comprising at least 50 mole percent terephthalic acid residues; and
(2) diol residues comprising at least 50 mole percent of ethylene glycol residues, cyclohexanedimethanol residues, or a mixture thereof;
wherein the total of the diacid residues is equal to 100 mole percent and the total of the diol residues also is equal to 100 mole percent.

24. A polymer composition according to claim 23 wherein the polyester of component (A) comprises:
(1) diacid residues comprising at least 50 mole percent terephthalic acid residues; and
(2) diol residues comprising at least 50 mole percent of ethylene glycol residues, cyclohexanedimethanol residues, or a mixture thereof; and contains up to about 200 ppmw of at least one of Ti, Co or Mn residues,
wherein the total of the diacid residues is equal to 100 mole percent and the total of the diol residues also is equal to 100 mole percent.

25. A polymer composition comprising:
(A) at least one polyester comprising:
(1) diacid residues comprising at least 50 mole percent terephthalic acid residues; and (2) diol residues comprising at least 50 mole percent of ethylene glycol residues, cyclohexanedimethanol residues, or a mixture thereof; and contains from about 10 to about 200 ppmw of at least one of Ti, Co or Mn residues, wherein the total of the diacid residues is equal to 100 mole percent and the total of the diol residues also is equal to 100 mole percent; and (B) about 0.01 to about 0.25 weight percent based on the total weight of the composition of at least one salt prepared by the reaction of one or more phosphorus-containing compounds selected from the group consisting of phosphorus acid, phosphoric acid and polyphosphoric acid with one or more basic organic compounds which contain nitrogen, wherein said one or more basic organic compounds are hindered amine light stabilizers (HALS) having one of the following formulas:

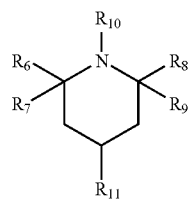
(2)

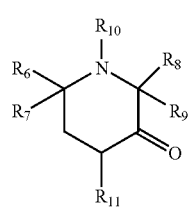
(3)

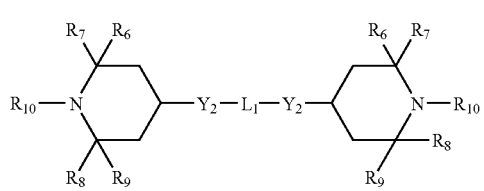
(7)

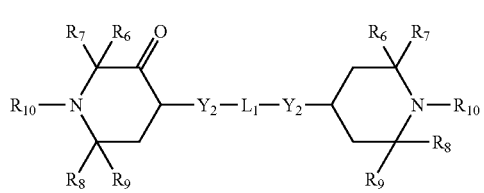
(8)

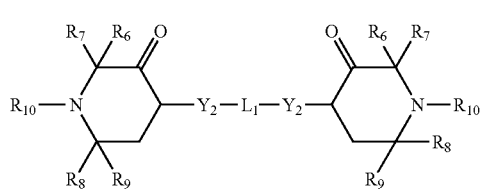
(9)

-continued

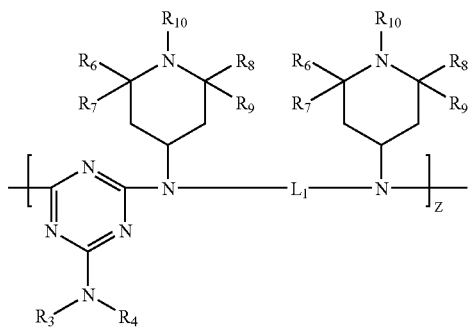
(12)

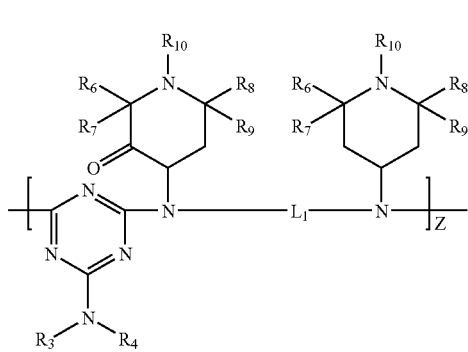
(13)

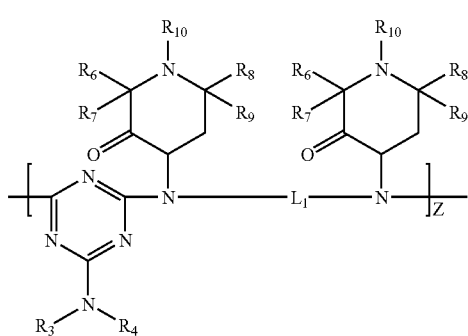
(14)

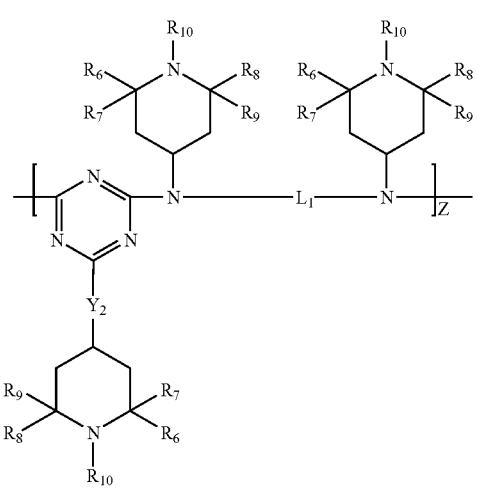
(16)

-continued

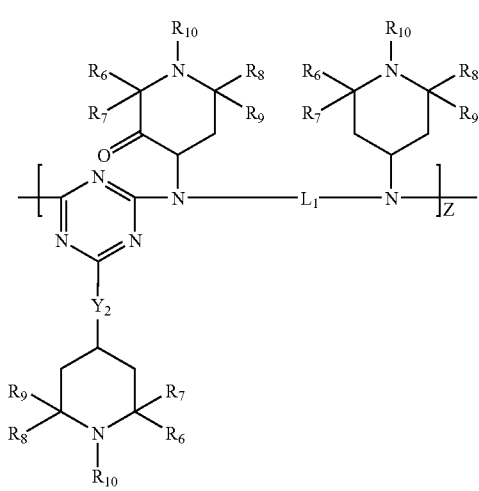

(17)

(18)

(19)

wherein

R$_1$ and R$_2$ are independently selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;

R$_3$ and R$_4$ are independently selected from the group consisting of hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl wherein at least one of R$_3$ and R$_4$ is a substituent other than hydrogen; R$_3$ and R$_4$ may collectively may represent a divalent group forming a ring with the nitrogen atom to which they are attached;

R$_6$, R$_7$, R$_8$, and R$_9$ are independently selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;

R$_{10}$ is selected from the group consisting of hydrogen, —OR$_6$, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{11}$ is selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, aryl, —Y$_1$—R$_3$ and a succinimido group having the formula

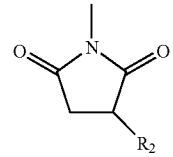

L$_1$ is a divalent linking group selected from the group consisting of C$_2$-C$_{22}$-alkylene, —(CH$_2$CH$_2$—Y$_1$)$_{1-3}$—CH$_2$CH$_2$—, C$_3$-C$_8$-cycloalkylene, arylene, and —CO-L$_2$-OC—;

L$_2$ is selected from the group consisting of C$_1$-C$_{22}$-alkylene, arylene, —(CH$_2$CH$_2$—Y$_1$)$_{1-3}$—CH$_2$CH$_2$—and C$_3$-C$_8$-cycloalkylene;

Y$_1$ is selected from the group consisting of —OC(O)—, —NHC(O)—, —O—, —S—, and —N(R$_1$)—;

Y$_2$ is —O— or —N(R$_1$)—;

Z is a positive integer of up to about 20;

m1 is an integer from 0 to about 10;

n1 is a positive integer from 2 to about 12;

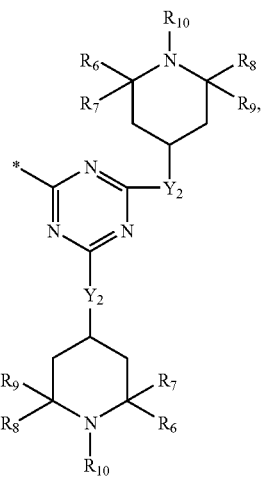

-continued (structure with R6, R7, R8, R9, R10 piperidine groups connected via triazine with Y2 linkers)

and (similar structure variant)

wherein the ratio of the number of phosphorus atoms in the acidic phosphorus-containing compound to the number of basic nitrogen atoms in the basic organic compound is about 0.25 to about 1.1; and (C) at least one ultraviolet light absorber selected from the group consisting of compounds having the formulas:

(21) benzophenone derivative with R17, R18, R19, R20, R21 substituents

(22) benzotriazole with R24, R25, R26

(23) benzotriazole with R24, R26, R27

(24) bis-benzotriazole methylene-bridged with R24, R25, R26, R28, R31, R32

(25) triazine with R33, R34, R35, R36, R37, R38, R39

(26) bis-benzoxazinone with R40, R41 wherein $R_{17}$, $R_{18}$, and $R_{19}$ are independently selected from the group consisting of hydrogen, hydroxy, $C_1$-$C_{22}$-alkyl, substituted $C_1$-$C_{22}$-alkyl, $C_3$-$C_8$-cycloalkyl, substituted $C_3$-$C_8$-cycloalkyl and $OR_{22}$;

$R_{20}$ and $R_{21}$ are independently selected from the group consisting of hydrogen and —$SO_3R_{23}$;

$R_{22}$ is selected from the group consisting of $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{23}$ is selected from the group consisting of hydrogen, sodium, potassium, lithium, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{24}$ and $R_{25}$ are independently selected from the group consisting of hydrogen, $C_1$-$C_{22}$-alkyl, substituted $C_1$-$C_{22}$-alkyl, $C_3$-$C_8$-cycloalkyl and substituted $C_3$-$C_8$-cycloalkyl;

$R_{26}$ and $R_{28}$ are independently selected from the group consisting of hydrogen, halogen, $C_1$-$C_{22}$-alkyl, substituted $C_1$-$C_{22}$-alkyl, $C_3$-$C_8$-cycloalkyl and substituted $C_3$-$C_8$-cycloalkyl;

$R_{27}$ is —$(CH_2CH_2—Y_1)_{N2}$—$CH_2CH_2$—$R_{29}$ or a group having one of the following formulas

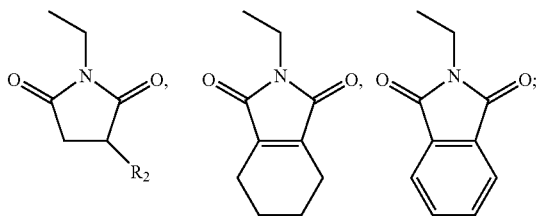

R$_{29}$ is selected from the group consisting of hydrogen, hydroxy and —CO$_2$R$_{30}$;

R$_{30}$ is selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, aryl, and heteroaryl;

R$_{31}$ and R$_{32}$ are independently selected from the group consisting of hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{33}$, R$_{34}$, R$_{35}$, R$_{36}$, R$_{37}$, and R$_{38}$ are independently selected from the group consisting of hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{39}$ is selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl and —OR$_{30}$;

R$_{40}$ and R$_{41}$ are independently selected from the group consisting of hydrogen, C$_1$-C$_{22}$-alkyl, substituted C$_1$-C$_{22}$-alkyl, C$_3$-C$_8$-cycloalkyl and substituted C$_3$-C$_8$-cycloalkyl;

Y$_1$ is selected from the group consisting of —OC(O)—, —NHC(O)—, —O—, —S—, and —N(R$_1$)—; and N$_2$ is a positive integer from 1 to about 20; and (D) at least one polycarbonate.

26. A composition according to claim 25 wherein the polyester of component (A) has an inherent viscosity of about 0.4 to 1.2 dL/g measured at 25° C. in a 60/40 ratio by weight of phenol/tetrachloroethane and comprises:
(1) diacid residues comprising about 80 to 100 mole percent terephthalic acid residues and about 0 to 20 mole percent isophthalic acid residues; and
(2) diol residues comprising about 40 to 100 mole percent 1,4-cyclohexanedimethanol residues and about 0 to 60 mole percent ethylene glycol,
wherein the total of the diacid residues is equal to 100 mole percent and the total of the diol residues also is equal to 100 mole percent; and
wherein the composition comprises about 0.05 to about 0.15 weight percent based on the total weight of the composition of at least one salt derived from the reaction of phosphorous acid and a basic organic compound having the structure of formulas (2), (3), (7), (8), (9), (12), (13), (14), (16), (17), (18) or (19) wherein R$_{10}$ is hydrogen or alkyl and the ratio of the number of phosphorus atoms in the acidic phosphorus-containing compound to the number of basic nitrogen atoms in the basic organic compound is about 0.25 to about 1.1.

27. The composition of claim 26 wherein the polyester of component (A) has an inherent viscosity of about 0.4 to 0.8 dL/g measured at measured at 25° C. in a 60/40 ratio by weight of phenol/tetrachloroethane and comprises:
(1) diacid residues comprising about 80 to 100 mole percent terephthalic acid residues and about 0 to 20 mole percent isophthalic acid residues; and
(2) diol residues comprising about 55 to 80 mole percent 1,4-cyclohexanedimethanol residues and 20 to about 45 mole percent ethylene glycol residues,
wherein the total of the diacid residues is equal to 100 mole percent and the total of the diol residues also is equal to 100 mole percent.

28. The composition of claim 25 wherein the polyester of component (A) has an inherent viscosity of about 0.4 to 0.8 dL/g measured at measured at 25° C. in a 60/40 ratio by weight of phenol/tetrachloroethane and comprises:
(1) diacid residues comprising about 65 to 83 mole percent terephthalic acid residues and about 35 to 17 mole percent isophthalic acid residues; and
(2) diol residues comprising about 80 to 100 mole percent 1,4-cyclohexanedimethanol residues and 0 to about 20 mole percent ethylene glycol residues,
wherein the total of the diacid residues is equal to 100 mole percent and the total of the diol residues also is equal to 100 mole percent; and
wherein the composition comprises about 0.05 to about 0.15 weight percent based on the total weight of the composition of at least one salt derived from the reaction of phosphorous acid and a basic organic compound having the structure of formulas (2), (3), (7), (8), (9), (12), (13), (14), (16), (17), (18) or (19) wherein R$_{10}$ is hydrogen or alkyl and the ratio of the number of phosphorus atoms in the acidic phosphorus-containing compounds to number of basic nitrogen atoms in the basic organic compound is about 0.25 to about 1.1.

29. The composition of claim 28 wherein the polyester of component (A) has an inherent viscosity of about 0.4 to 0.8 dL/g measured at measured at 25° C. in a 60/40 ratio by weight of phenol/tetrachloroethane and comprises:
(1) diacid residues comprising about 70 to 80 mole percent terephthalic acid residues and about 30 to 20 mole percent isophthalic acid residues; and
(2) diol residues comprising about 90 to 100 mole percent 1,4-cyclohexanedimethanol residues and 0 to about 10 mole percent ethylene glycol residues,
wherein the total of the diacid residues is equal to 100 mole percent and the total of the diol residues also is equal to 100 mole percent.

30. The composition of claim 26 wherein the polyester of component (A) has an inherent viscosity of about 0.4 to 0.8 dL/g measured at 25° C. in a 60/40 ratio by weight of phenol/tetrachloroethane and comprises:
(1) diacid residues comprising about 80 to 100 mole percent terephthalic acid residues and about 0 to 20 mole percent isophthalic acid residues; and
(2) diol residues comprising about 80 to 100 mole percent 1,4-cyclohexanedimethanol residues and 0 to about 20 mole percent ethylene glycol residues,
wherein the total of the diacid residues is equal to 100 mole percent and the total of the diol residues also is equal to 100 mole percent.

31. The composition of claim 30 wherein the polyester of component (A) has an inherent viscosity of about 0.4 to 0.8 dL/g measured at 25° C. in a 60/40 ratio by weight of phenol/tetrachloroethane and comprises:
(1) diacid residues comprising about 90 to 100 mole percent terephthalic acid residues and about 0 to 10 mole percent isophthalic acid residues; and (2) diol residues comprising about 90 to 100 mole percent 1,4-cyclohexanedimethanol residues and 0 to about 10 mole percent ethylene glycol residues, wherein the total of the diacid residues is equal to 100 mole percent and the total of the diol residues also is equal to 100 mole percent.

32. A polymer composition comprising:

(A) at least one polyester having an inherent viscosity of about 0.4 to 1.2 dL/g measured at 25° C. in a 60/40 ratio by weight of phenol/tetrachloroethane and comprises (1) diacid residues comprising at least 50 mole percent terephthalic acid residues; and (2) diol residues comprising at least 50 mole percent of ethylene glycol residues, cyclohexanedimethanol residues, or a mixture thereof; and contains from about 10 to about 200 ppmw of at least one of Ti, Co or Mn residues, wherein the total of the diacid residues is equal to 100 mole percent and the total of the diol residues also is equal to 100 mole percent; and (B) about 0.01 to about 0.25 weight percent based on the total weight of the composition of at least one salt prepared by the reaction of phosphorous acid with one or more basic organic compounds which contain nitrogen, wherein said one or more basic organic compounds are hindered light amine stabilizers (HALS) having one of the following formulas:

(12)

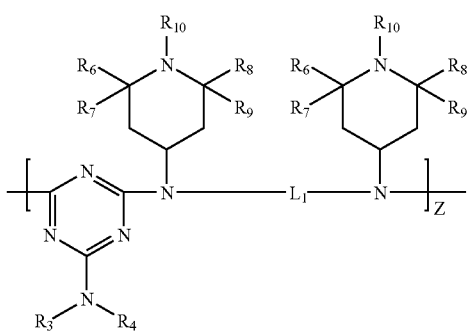

(13)

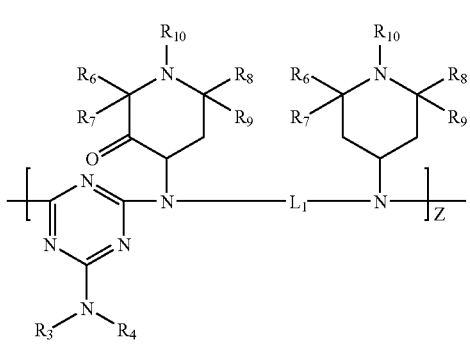

-continued (14)

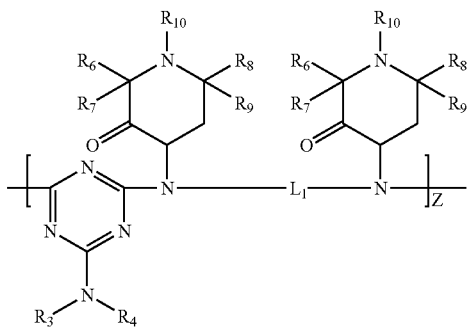

(16)

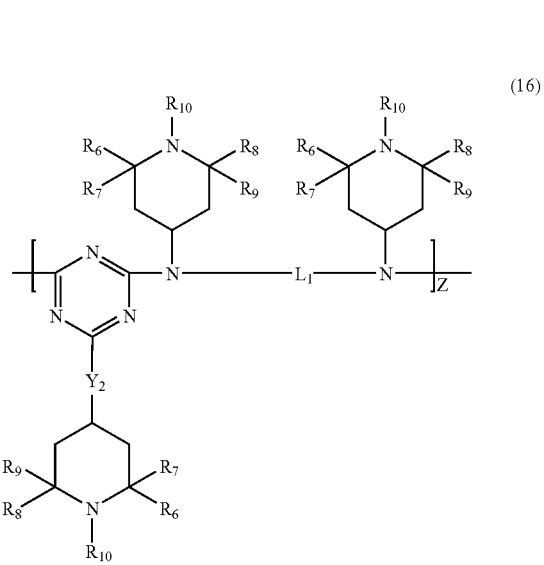

(17)

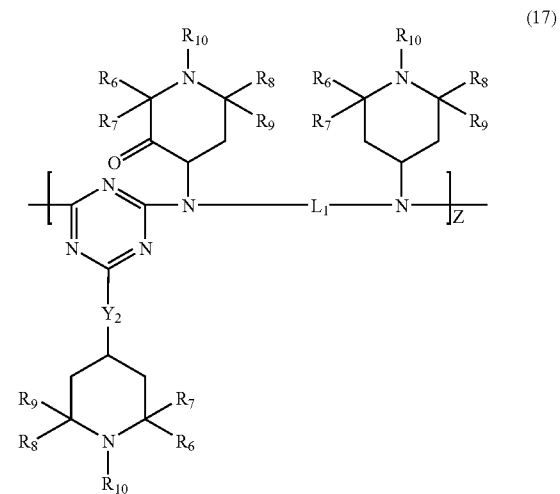

-continued

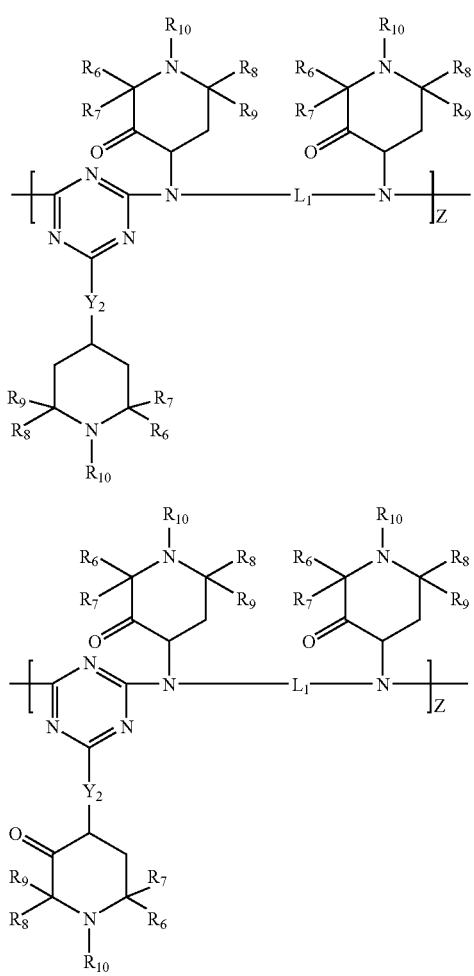

wherein
- R$_1$ and R$_2$ are independently selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;
- R$_3$ and R$_4$ are independently selected from the group consisting of hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl wherein at least one of R$_3$ and R$_4$ is a substituent other than hydrogen; R$_3$ and R$_4$ may collectively may represent a divalent group forming a ring with the nitrogen atom to which they are attached;
- R$_6$, R$_7$, R$_8$, and R$_9$ are independently selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;
- R$_{10}$ is selected from the group consisting of hydrogen, -OR$_6$, C$_1$-C$_{22}$-alkyl, substituted C$_1$-C$_{22}$-alkyl, C$_3$-C$_8$-cycloalkyl, and substituted C$_3$-C$_8$-cycloalkyl;
- L$_1$ is a divalent linking group selected from the group consisting of C$_2$-C$_{22}$-alkylene, —(CH$_2$CH$_2$—Y$_1$)$_{1-3}$—CH$_2$CH$_2$—, C$_3$-C$_8$-cycloalkylene, arylene, and —CO-L$_2$-OC—;
- L$_2$ is selected from the group consisting of C$_1$-C$_{22}$-alkylene, arylene, —(CH$_2$CH$_2$—Y$_1$)$_{1-3}$—CH$_2$CH$_2$— and C$_3$-C$_8$-cycloalkylene;
- Y$_1$ is selected from the group consisting of —OC(O)—, —NHC(O)—, —O—, —S—, and —N(R$_1$)—;
- Y$_2$ is —O— or —N(R$_1$)—;
- Z is a positive integer of up to about 20;
- m1 is an integer from 0 to about 10;
- n$_1$ is a positive integer from 2 to about 12;

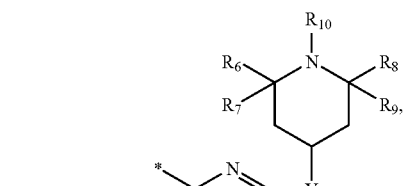

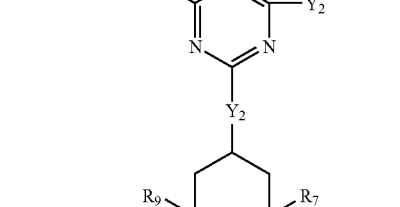

and

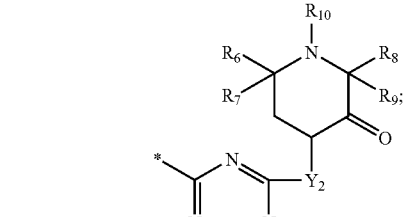

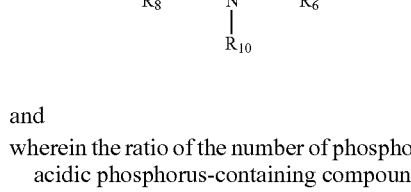

and
wherein the ratio of the number of phosphorus atoms in the acidic phosphorus-containing compound to the number of basic nitrogen atoms in the basic organic compound is about 0.25 to about 1.1; and (C) at least one ultraviolet light absorber selected from the group consisting of compounds having the formulas:

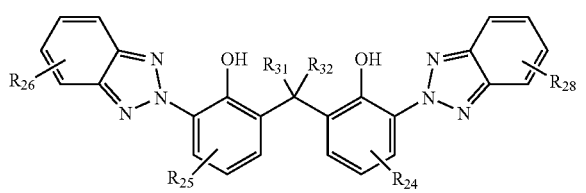

(24)

(25)

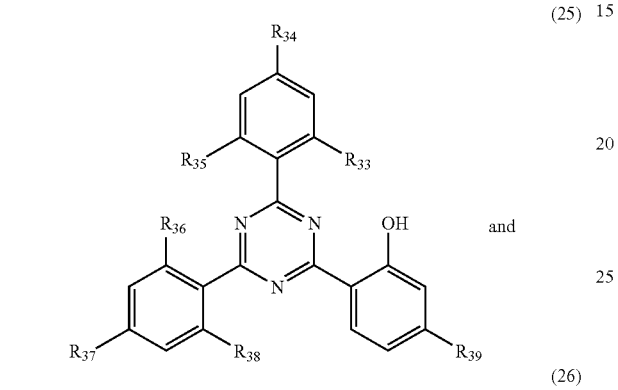

(26)

wherein

R$_{24}$ and R$_{25}$ are independently selected from the group consisting of hydrogen, C$_1$-C$_{22}$-alkyl, substituted C$_1$-C$_{22}$-alkyl, C$_3$-C$_8$-cycloalkyl and substituted C$_3$-C$_8$-cycloalkyl;

R$_{26}$ and R$_{28}$ are independently selected from the group consisting of hydrogen, halogen, C$_1$-C$_{22}$-alkyl, substituted C$_1$-C$_{22}$-alkyl, C$_3$-C$_8$-cycloalkyl and substituted C$_3$-C$_8$-cycloalkyl;

R$_{30}$ is selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, aryl, and heteroaryl;

R$_{31}$ and R$_{32}$ are independently selected from the group consisting of hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{33}$, R$_{34}$, R$_{35}$, R$_{36}$, R$_{37}$, and R$_{38}$ are independently selected from the group consisting of hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{39}$ is selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl and —OR$_{30}$;

R$_{40}$ and R$_{41}$ are independently selected from the group consisting of hydrogen, C$_1$-C$_{22}$-alkyl, substituted C$_1$-C$_{22}$-alkyl, C$_3$-C$_8$-cycloalkyl and substituted C$_3$-C$_8$-cycloalkyl; and (D) at least one polycarbonate.

33. A composition of claim 32 wherein the polyester of component (A) has an inherent viscosity of about 0.4 to 0.8 dL/g measured at measured at 25° C. in a 60/40 ratio by weight of phenol/tetrachloroethane and comprises:

(1) diacid residues comprising about 80 to 100 mole percent terephthalic acid residues and about 0 to 20 mole percent isophthalic acid residues; and (2) diol residues comprising about 55 to 80 mole percent 1,4-cyclohexanedimethanol residues and 20 to about 45 mole percent ethylene glycol residues, wherein the total of the diacid residues is equal to 100 mole percent and the total of the diol residues also is equal to 100 mole percent; and wherein the composition comprises about 0.05 to about 0.15 weight percent based on the total weight of the composition of the at least one salt wherein R$_{10}$ is hydrogen or alkyl and the ratio of the number of phosphorus atoms in the phosphorous acid to number of basic nitrogen atoms in the basic organic compound is about 0.25 to about 1.1.

34. A composition of claim 32 wherein the polyester of component (A) has an inherent viscosity of about 0.4 to 0.8 dL/g measured at measured at 25° C. in a 60/40 ratio by weight of phenol/tetrachloroethane and comprises:

(1) diacid residues comprising about 70 to 80 mole percent terephthalic acid residues and about 30 to 20 mole percent isophthalic acid residues; and (2) diol residues comprising about 90 to 100 mole percent 1,4-cyclohexanedimethanol residues and 0 to about 10 mole percent ethylene glycol residues, wherein the total of the diacid residues is equal to 100 mole percent and the total of the diol residues also is equal to 100 mole percent; and wherein the composition comprises about 0.05 to about 0.15 weight percent based on the total weight of the composition of the at least one salt where R$_{10}$ is hydrogen or alkyl and the ratio of the number of phosphorus atoms in the phosphorous acid to number of basic nitrogen atoms in the basic organic compound is about 0.25 to about 1.1.

35. A composition of claim 32 wherein the polyester of component (A) has an inherent viscosity of about 0.4 to 0.8 dL/g measured at measured at 25° C. in a 60/40 ratio by weight of phenol/tetrachloroethane and comprises:

(1) diacid residues comprising about 90 to 100 mole percent terephthalic acid residues and about 0 to 10 mole percent isophthalic acid residues; and (2) diol residues comprising about 90 to 100 mole percent 1,4-cyclohexanedimethanol residues and 0 to about 10 mole percent ethylene glycol residues, wherein the total of the diacid residues is equal to 100 mole percent and the total of the diol residues also is equal to 100 mole percent; and wherein the composition comprises about 0.05 to about 0.15 weight percent based on the total weight of the composition of the at least one salt where R$_{10}$ is hydrogen or alkyl and the ratio of the number of phosphorus atoms in the phosphorous acid to number of basic nitrogen atoms in the basic organic compounds is about 0.25 to about 1.1.

36. A polymer composition comprising:

(A) at least one polyester having an inherent viscosity of about 0.4 to 1.2 dL/g measured at 25° C. in a 60/40 ratio by weight of phenol/tetrachloroethane and comprises
  (1) diacid residues comprising at least 50 mole percent terephthalic acid residues; and
  (2) diol residues comprising at least 50 mole percent of ethylene glycol residues, cyclohexanedimethanol residues, or a mixture thereof; and contains from about 10 to about 200 ppmw of at least one of Ti, Co or Mn residues, wherein the total of the diacid residues is equal to 100 mole percent and the total of the diol residues also is equal to 100 mole percent; and (B) about 0.05 to about 0.15 weight percent based on the total weight of the composition of at least one salt prepared by the reaction of phosphorous acid with one or more basic organic compounds which contain nitrogen, wherein said one or more basic organic compounds are hindered amine light stabilizers (HALS) having the formula:

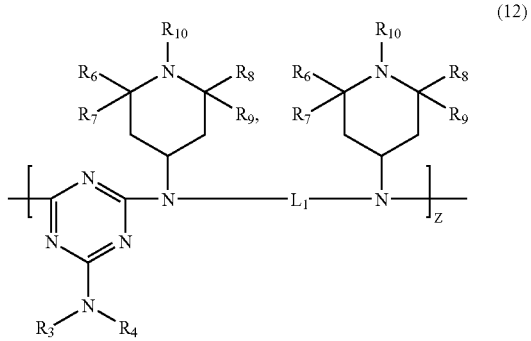

(12)

wherein
  $R_3$ and $R_4$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$ and $R_4$ is a substituent other than hydrogen; $R_3$ and $R_4$ collectively represent a divalent group forming a ring with the nitrogen atom to which they are attached;
  $R_6$, $R_7$, $R_8$, and $R_9$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
  $R_{10}$ is hydrogen or $C_1$-$C_{22}$-alkyl;
  $L_1$ is a divalent linking group selected from the group consisting of $C_2$-$C_{22}$-alkylene, —(CH$_2$CH$_2$—Y$_1$)$_{1-3}$—CH$_2$CH$_2$—, $C_3$-$C_8$-cycloalkylene, arylene, and —CO-L$_2$-OC—; and
  Z is a positive integer of up to about 20;
  $L_2$ is selected from the group consisting of $C_1$-$C_{22}$-alkylene, arylene, —(CH$_2$CH$_2$—Y$_1$)$_{1-3}$—CH$_2$CH$_2$— and $C_3$-$C_8$-cycloalkylene; and $Y_1$ is selected from the group consisting of —OC(O)—, —NHC(O)—, —O—, —S—, and —N(R$_1$)—;

(C) at least one ultraviolet light absorber having the formula:

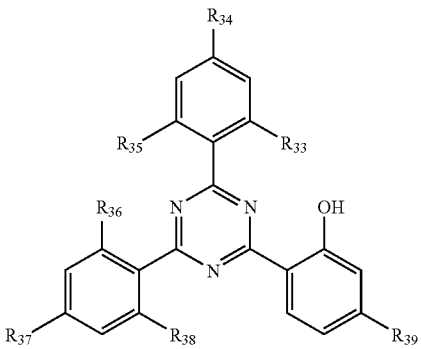

(25)

wherein
  $R_{33}$, $R_{34}$, $R_{35}$, $R_{36}$, $R_{37}$, and $R_{38}$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;
  $R_{39}$ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —OR$_{30}$; and
  wherein the number of phosphorus atoms in the phosphorous acid to the number of nitrogen atoms in the basic organic compound is about 0.2 to about 0.6; and (D) at least one polycarbonate.

37. A composition of claim 36 wherein the polyester of component (A) has an inherent viscosity of about 0.4 to 0.8 dL/g measured at measured at 25° C. in a 60/40 ratio by weight of phenol/tetrachloroethane and comprises:
  (1) diacid residues comprising about 80 to 100 mole percent terephthalic acid residues and about 0 to 20 mole percent isophthalic acid residues; and (2) diol residues comprising about 55 to 80 mole percent 1,4-cyclohexanedimethanol residues and 20 to about 45 mole percent ethylene glycol residues, wherein the total of the diacid residues is equal to 100 mole percent and the total of the diol residues also is equal to 100 mole percent; and wherein the composition comprises about 0.05 to about 0.15 weight percent based on the total weight of the composition of the at least one salt wherein $R_6$=$R_7$=$R_8$=$R_9$=$R_{10}$=methyl; $L_1$ is hexamethylene; and ($R_3$)($R_4$)N— collectively represent a morpholino group.

38. A composition of claim 36 wherein the polyester of component (A) has an inherent viscosity of about 0.4 to 0.8 dL/g measured at 25° C. in a 60/40 ratio by weight of phenol/tetrachloroethane and comprises:
  (1) diacid residues comprising about 70 to 80 mole percent terephthalic acid residues and about 30 to 20 mole percent isophthalic acid residues; and
  (2) diol residues comprising about 90 to 100 mole percent 1,4-cyclohexanedimethanol residues and 0 to about 10 mole percent ethylene glycol residues, wherein the total of the diacid residues is equal to 100 mole percent and the total of the diol residues also is equal to 100 mole percent; and wherein the composition comprises about 0.05 to about 0.15 weight percent based on the total weight of the composition of the at least one salt wherein $R_6$=$R_7$=$R_8$=$R_9$=$R_{10}$=methyl; $L_1$ is hexamethylene; and ($R_3$)($R_4$)N— collectively represent a morpholino group.

39. A composition of claim 36 wherein the polyester of component (A) has an inherent viscosity of about 0.4 to 0.8 dL/g measured at measured at 25° C. in a 60/40 ratio by weight of phenol/tetrachloroethane and comprises:
(1) diacid residues comprising about 90 to 100 mole percent terephthalic acid residues and about 0 to 10 mole percent isophthalic acid residues; and
(2) diol residues comprising about 90 to 100 mole percent 1,4-cyclohexanedimethanol residues and 0 to about 10 mole percent ethylene glycol residues,
wherein the total of the diacid residues is equal to 100 mole percent and the total of the diol residues also is equal to 100 mole percent.

40. The polymer composition of claims 36, 37, 38 or 39 wherein the ultraviolet light absorbing compound of formula (25) is defined by: $R_{17}=R_{18}=R_{19}=R_{20}=$hydrogen, and $R_{19}=$—$OC_8H_{17}$.

41. The polymer composition according to claim 22 wherein the polyester of component (A) comprises:
(1) diacid residues comprising the residues of one or more aliphatic dicarboxylic acids, alicyclic dicarboxylic acids, or a combination thereof; and
(2) diol residues comprising the residues of one or more diols selected from 2,6-decahydronaphthalenedimethanol; ethylene glycol; 1,4-cyclohexanedimethanol; 1,2-propanediol; 1,3-propanediol; 1,4-butanediol; 2,2-dimethyl-1,3-propanediol; 1,6-hexanediol; 1,2-cyclohexanediol; 1,4-cyclohexanediol; 1,2-cyclohexanedimethanol; 1,3-cyclo-hexanedimethanol; 2,2,4,4-tetramethyl-1,3-cyclobutanediol; bis [4-(2-hydroxyethoxy)phenyl]sulfone; 1,4:3,6-dianhydrosorbitol; 4,4'-isopropylidenedicyclohexanol; Z-8-bis(hydroxymethyl)-tricyclo-[5.2.1.0]-decane wherein Z represents 3,4, or 5; diethylene glycol; triethylene glycol; dipropylene glycol; and tripropylene glycol.

42. The polymer composition according to claim 41 wherein the diacid residues comprise the residues of one or more dicarboxylic acids selected from 2,6-decahydronaphthalenedicarboxylic acid, 1,4-cyclohexanedicarboxylic acid, 1,3-cyclohexanedicarboxylic acid, succinic acid, glutaric acid, adipic acid, sebacic acid, and 1,12-dodecanedioic acid.

43. The polymer composition according to claim 42 wherein the one or more basic organic compounds are selected from group consisting of compounds represented by formulas (2), (3), (7), (8), (9), (10), (11), (12), (13), (14), (16), (17), (18), (19), and (20) and the at least one ultraviolet light absorber is selected from group consisting of compounds represented by formulas (22), (23), (24), and (25).

44. The polymer composition according to claim 43 wherein the ultraviolet light absorber comprises at least one compound represented by formula (25) and at least one compound represented by formulas (22), (23), or (24).

45. The polymer composition according to claim 43 wherein the diacid residues comprise at least 50 mole percent 1,4-cyclohexanedicarboxylic acid and the diol residues comprise at least 50 mole percent ethylene glycol residues, 1,4-cyclohexanedimethanol residues, or a combination thereof, wherein the total of the diacid residues is equal to 100 mole percent and the total of the diol residues is equal to 100 mole percent.

46. The polymer composition according to claim 43 wherein the diacid residues comprise about 80 to 100 mole percent 1,4-cyclohexanedicarboxylic acid and the diol residues comprise about 80 to 100 mole percent 1,4-cyclohexanedimethanol residues, wherein the total of the diacid residues is equal to 100 mole percent and the total of the diol residues is equal to 100 mole percent.

47. The polymer composition according to claim 46 wherein the diacid residues comprise 100 mole percent 1,4-cyclohexanedicarboxylic acid residues and the diol residues comprise 100 mole percent 1,4-cyclohexanedimethanol residues.

48. The polymer composition according to claim 45 wherein the at least one ultraviolet light absorber is represented by formula (25) wherein $R_{33}$, $R_{34}$, $R_{35}$, $R_{36}$, $R_{37}$, and $R_{38}$ each are hydrogen; and $R_{39}$ is —$OC_6H_{13}$ or —$OC_8H_{17}$.

49. The polymer composition according to claim 48 wherein the ultraviolet light absorber further comprises least one compound represented by formulas (22), (23), or (24).

50. A polymer composition comprising:
(A) at least one polyester comprising:
(1) diacid residues comprising the residues of one or more dicarboxylic acids selected from 2,6-decahydronaphthalenedicarboxylic acid, 1,4-cyclohexanedicarboxylic acid, 1,3-cyclohexanedicarboxylic acid; and
(2) diol residues comprising the residues of one or more diols selected from 2,6-decahydronaphthalenedimethanol; ethylene glycol; 1,4-cyclohexanedimethanol; 1,3-propanediol; 1,4-butanediol; 2,2-dimethyl-1,3-propanediol; 1,6-hexanediol; 2,2,4,4-tetramethyl-1,3-cyclobutanediol; and diethylene glycol;
(B) at least one salt prepared by the reaction of one or more phosphorus-containing compounds selected from the group consisting of phosphorus acid, phosphoric acid and polyphosphoric acid with one or more basic organic compounds which contain nitrogen,
wherein said one or more basic organic compounds are hindered amine light stabilizers (HALS) having one of the following formulas:

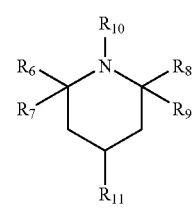

(2)

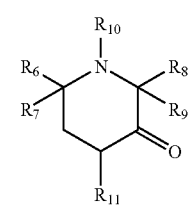

(3)

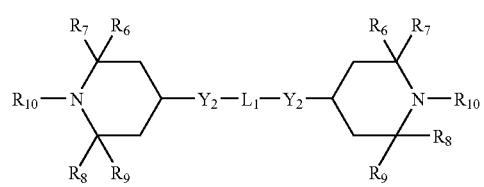

(7)

-continued
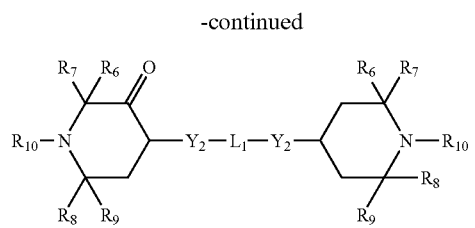
(8)
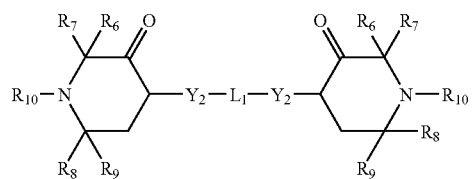
(9)
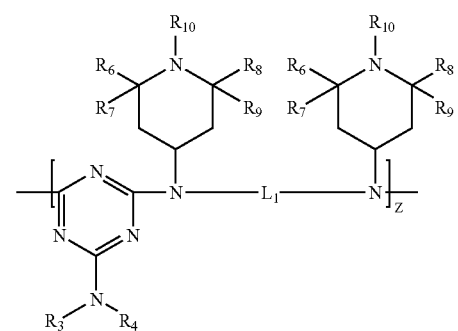
(12)
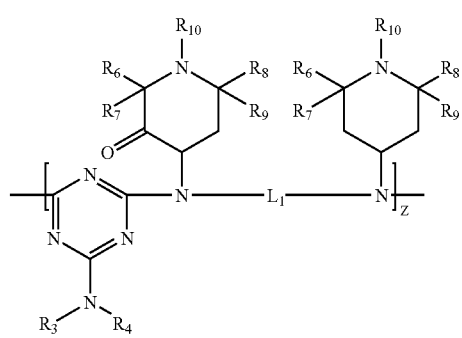
(13)
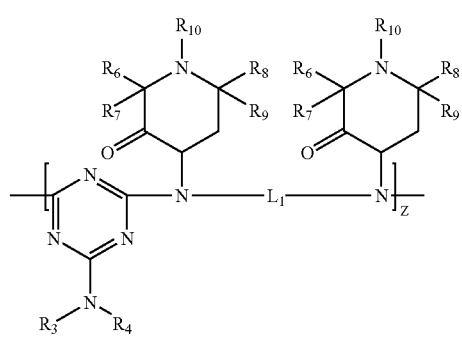
(14)
-continued
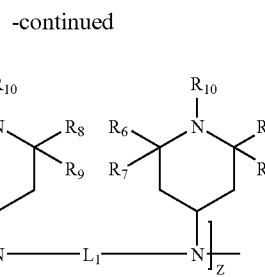
(16)
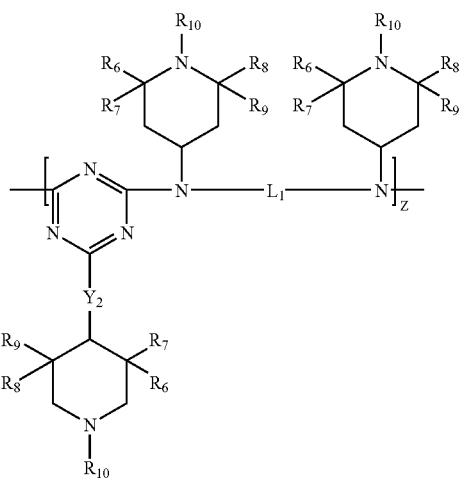
(17)
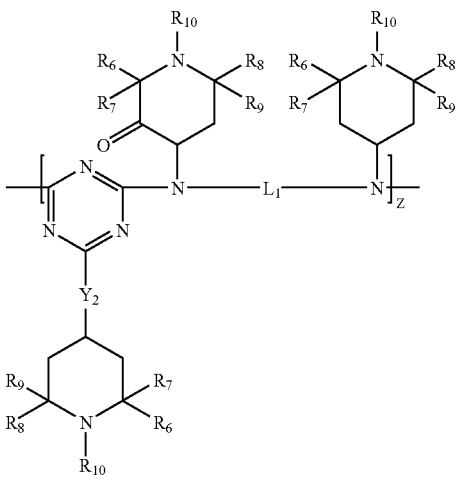
(18)
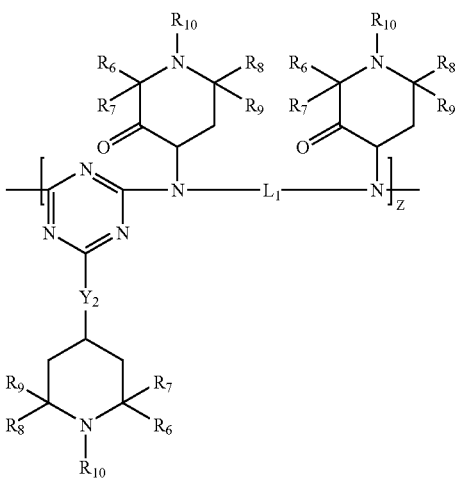

-continued

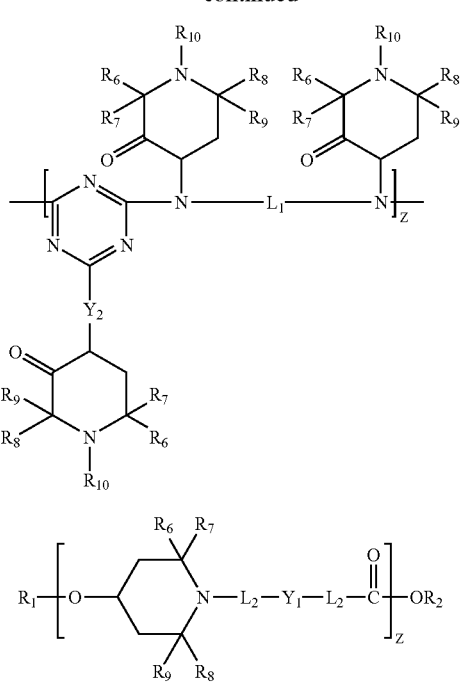

(19)

(20)

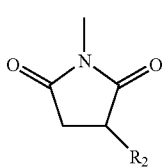

Z is a positive integer of up to about 20;
L$_1$ is a divalent linking group selected from the group consisting of C$_2$-C$_{22}$-alkylene, —(CH$_2$CH$_2$—Y$_1$)$_{1-3}$—CH$_2$CH$_2$—, C$_3$-C$_8$-cycloalkylene, arylene, and —CO-L$_2$-OC—;

L$_2$ is selected from the group consisting of C$_1$-C$_{22}$-alkylene, arylene, —(CH$_2$CH$_2$—Y$_1$)$_{1-3}$—CH$_2$CH$_2$— and C$_3$-C$_8$-cycloalkylene;

Y$_1$ is selected from the group consisting of —OC(O)—, —NHC(O)—, —O—, —S—, and —N(R$_1$)—; and Y$_2$ is —O— or —N(R$_1$)—;

(C) at least one ultraviolet light absorber selected from compounds having the formula:

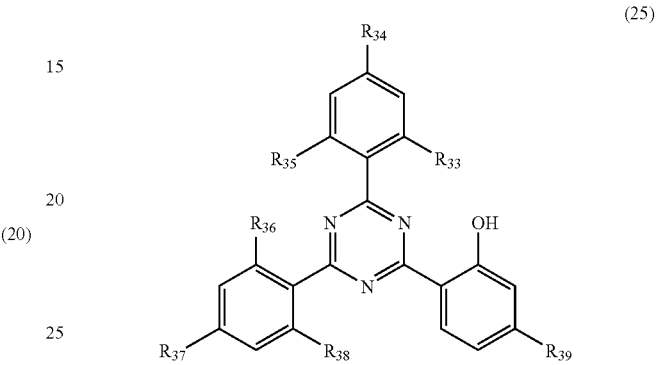

(25)

wherein

R$_{33}$, R$_{34}$, R$_{35}$, R$_{36}$, R$_{37}$, and R$_{38}$ are independently selected from the group consisting of hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl; and R$_{39}$ is selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl and —OR$_{30}$; and (D) at least one polycarbonate.

51. The polymer composition according to claim 50 wherein the diacid residues comprise at least 50 mole percent 1,4-cyclohexanedicarboxylic acid and the diol residues comprise at least 50 mole percent ethylene glycol residues, 1,4-cyclohexanedimethanol residues, or a combination thereof, wherein the total of the diacid residues is equal to 100 mole percent and the total of the diol residues is equal to 100 mole percent.

52. The polymer composition according to claim 50 wherein the diacid residues comprise about 80 to 100 mole percent 1,4-cyclohexanedicarboxylic acid and the diol residues comprise about 80 to 100 mole percent 1,4-cyclohexanedimethanol residues, wherein the total of the diacid residues is equal to 100 mole percent and the total of the diol residues is equal to 100 mole percent.

53. The polymer composition according to claim 52 wherein the diacid residues comprise 100 mole percent 1,4-cyclohexanedicarboxylic acid residues and the diol residues comprise 100 mole percent 1,4-cyclohexanedimethanol residues.

54. The polymer composition according to claim 53 wherein R$_{33}$, R$_{34}$, R$_{35}$, R$_{36}$, R$_{37}$, and R$_{38}$ each are hydrogen; and R$_{39}$ is —OC$_6$H$_{13}$ or —OC$_8$H$_{17}$.

wherein
R$_1$ and R$_2$ are independently selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;

R$_3$ and R$_4$ are independently selected from the group consisting of hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl wherein at least one of R$_3$ and R$_4$ is a substituent other than hydrogen; R$_3$ and R$_4$ may collectively may represent a divalent group forming a ring with the nitrogen atom to which they are attached;

R$_6$, R$_7$, R$_8$, and R$_9$ are independently selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;

R$_{10}$ is selected from the group consisting of hydrogen, —OR$_6$, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{11}$ is selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, aryl, —Y$_1$—R$_3$ and a succinimido group having the formula 55. The polymer composition according to claim 50 wherein the at least one ultraviolet light absorber further comprises at least one compound selected from:

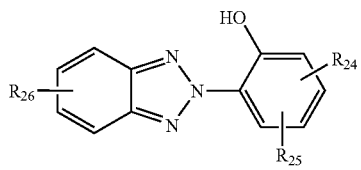
(22)

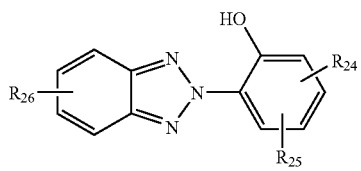
(23)

and

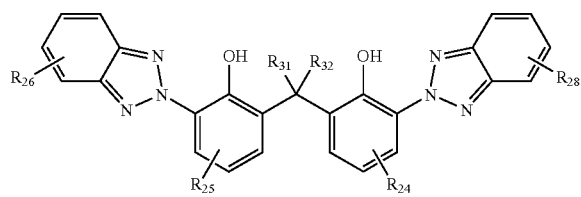
(24)

wherein $R_{24}$ and $R_{25}$ are independently selected from the group consisting of hydrogen, $C_1$-$C_{22}$-alkyl, substituted $C_1$-$C_{22}$-alkyl, $C_3$-$C_8$-cycloalkyl and substituted $C_3$-$C_8$-cycloalkyl;

$R_{26}$ and $R_{28}$ are independently selected from the group consisting of hydrogen, halogen, $C_1$-$C_{22}$-alkyl, substituted $C_1$-$C_{22}$-alkyl, $C_3$-$C_8$-cycloalkyl and substituted $C_3$-$C_8$-cycloalkyl;

$R_{27}$ is —$(CH_2CH_2$—$Y_1)_{N2}$—$CH_2CH_2$—$R_{29}$ or a group having one of the following formulas

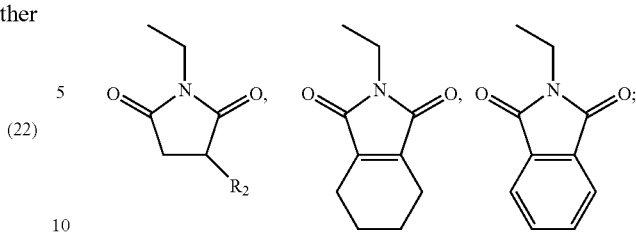

$R_{29}$ is selected from the group consisting of hydrogen, hydroxy and —$CO_2R_{30}$;

$R_{30}$ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, aryl, and heteroaryl; and $R_{31}$ and $R_{32}$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl.

56. The polymer composition according to claim 55 wherein the diacid residues comprise at least 50 mole percent 1,4-cyclohexanedicarboxylic acid and the diol residues comprise at least 50 mole percent ethylene glycol residues, 1,4-cyclohexanedimethanol residues, or a combination thereof, wherein the total of the diacid residues is equal to 100 mole percent and the total of the diol residues is equal to 100 mole percent.

57. The polymer composition according to claim 55 wherein the diacid residues comprise about 80 to 100 mole percent 1,4-cyclohexanedicarboxylic acid and the diol residues comprise about 80 to 100 mole percent 1,4-cyclohexanedimethanol residues, wherein the total of the diacid residues is equal to 100 mole percent and the total of the diol residues is equal to 100 mole percent.

58. The polymer composition according to claim 57 wherein the diacid residues comprise 100 mole percent 1,4-cyclohexanedicarboxylic acid residues and the diol residues comprise 100 mole percent 1,4-cyclohexanedimethanol residues.

59. The polymer composition according to claim 58 wherein $R_{33}$, $R_{34}$, $R_{35}$, $R_{36}$, $R_{37}$, and $R_{38}$ of formula (25) each are hydrogen; and $R_{39}$ is —$OC_6H_{13}$ or —$OC_8H_{17}$.

* * * * *